(12) United States Patent
Luttwak

(10) Patent No.: US 11,752,737 B2
(45) Date of Patent: Sep. 12, 2023

(54) AESTHETICALLY-ENHANCED STRUCTURES USING NATURAL FIBER COMPOSITES

(71) Applicant: Lingrove Inc., San Francisco, CA (US)

(72) Inventor: Joseph E. Luttwak, San Francisco, CA (US)

(73) Assignee: Lingrove Inc., San Francisco, CA (US)

( * ) Notice: Subject to any disclaimer, the term of this patent is extended or adjusted under 35 U.S.C. 154(b) by 197 days.

(21) Appl. No.: 16/872,293

(22) Filed: May 11, 2020

(65) Prior Publication Data

US 2020/0338867 A1 Oct. 29, 2020

Related U.S. Application Data

(63) Continuation-in-part of application No. 15/788,767, filed on Oct. 19, 2017, now abandoned, which is a continuation-in-part of application No. 14/546,518, filed on Nov. 18, 2014, now Pat. No. 9,818,380.

(60) Provisional application No. 62/865,112, filed on Jun. 21, 2019, provisional application No. 62/446,809, filed on Jan. 16, 2017, provisional application No. 61/905,752, filed on Nov. 18, 2013.

(51) Int. Cl.
| | |
|---|---|
| B32B 21/14 | (2006.01) |
| B32B 5/02 | (2006.01) |
| B32B 7/12 | (2006.01) |
| B32B 5/18 | (2006.01) |
| B32B 3/12 | (2006.01) |
| G10D 3/22 | (2020.01) |

(52) U.S. Cl.
CPC ............... *B32B 21/14* (2013.01); *B32B 3/12* (2013.01); *B32B 5/022* (2013.01); *B32B 5/18* (2013.01); *B32B 7/12* (2013.01); *B32B 2255/26* (2013.01); *B32B 2260/021* (2013.01); *B32B 2260/046* (2013.01); *B32B 2262/062* (2013.01); *B32B 2266/0264* (2013.01); *B32B 2307/414* (2013.01); *G10D 3/22* (2020.02)

(58) Field of Classification Search
None
See application file for complete search history.

(56) References Cited

U.S. PATENT DOCUMENTS

| | | |
|---|---|---|
| 3,477,330 A | 11/1969 | Bert |
| 5,738,924 A | 4/1998 | Sing |
| 5,918,930 A | 7/1999 | Kawai et al. |
| 6,107,552 A | 8/2000 | Coomar et al. |
| 2001/0031594 A1* | 10/2001 | Perez .................. B32B 27/36 442/339 |
| 2008/0110318 A1 | 5/2008 | Fox |

(Continued)

OTHER PUBLICATIONS

Obataya, E., et al. "Vibrational properties of wood along the grain," Journal of Materials Science, Jun. 2000, vol. 35, Issue 12, pp. 2993-2994.

*Primary Examiner* — Anthony J Frost
(74) *Attorney, Agent, or Firm* — Banner & Witcoft, Ltd.

(57) ABSTRACT

An aesthetically-enhanced structure is formed by fusing a translucent layer with an aesthetic-enhancing layer. The translucent layer includes natural fibers impregnated by a thermoplastic. The translucent layer or the aesthetic-enhancing layer provide one or more aesthetic properties visible through the translucent layer, for example, a pattern, a color, a texture, a pigment, a dye, a design, an image or a relief.

28 Claims, 51 Drawing Sheets

(56) References Cited

U.S. PATENT DOCUMENTS

| | | |
|---|---|---|
| 2009/0123706 A1* | 5/2009 | Takahashi .............. D21F 7/083 |
| | | 442/326 |
| 2009/0155522 A1* | 6/2009 | Raghavendran .......... B32B 7/12 |
| | | 428/113 |
| 2010/0282407 A1* | 11/2010 | van der Zwan et al. .................... |
| | | D21H 27/26 |
| | | 156/277 |
| 2014/0205820 A1 | 7/2014 | Savonuzzi |
| 2015/0101473 A1 | 4/2015 | Seal |
| 2015/0118436 A1 | 4/2015 | Fink |
| 2018/0002932 A1 | 1/2018 | Van Giel |

\* cited by examiner

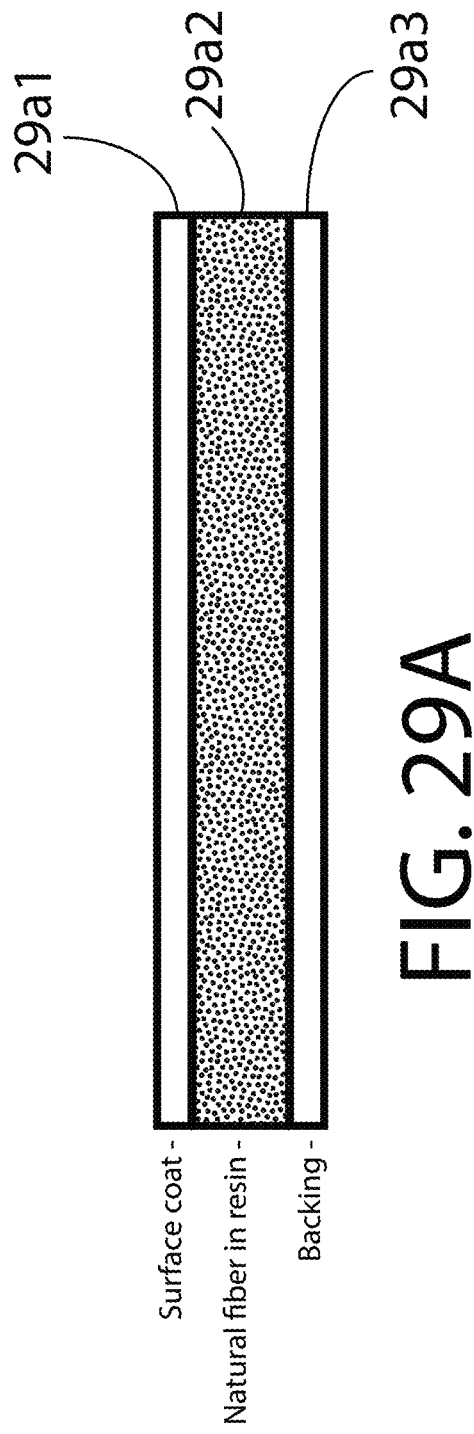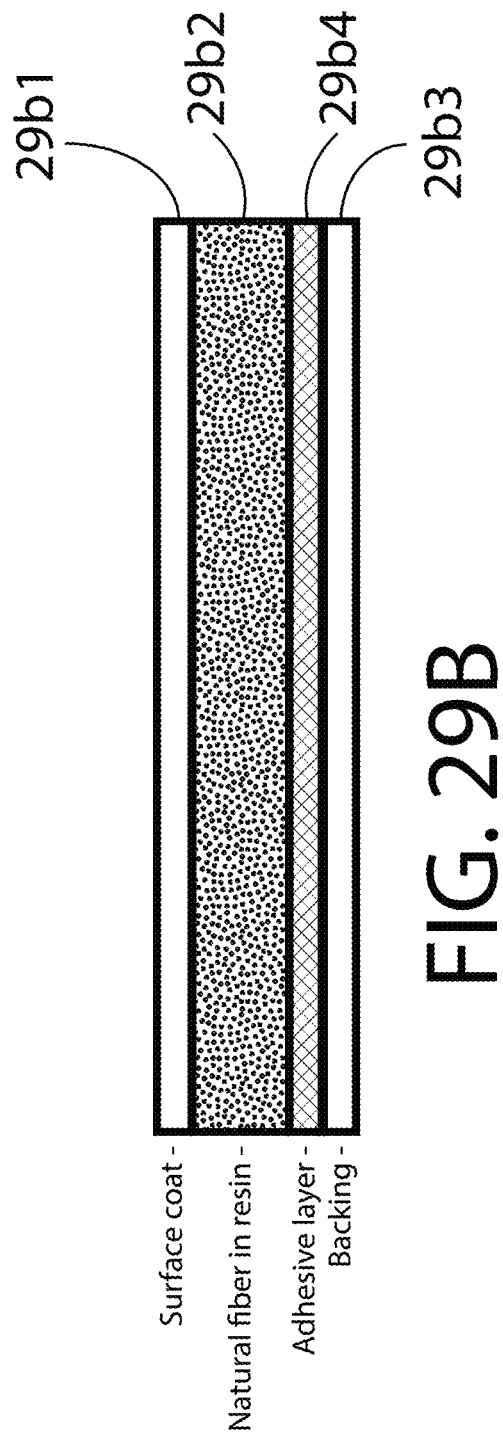

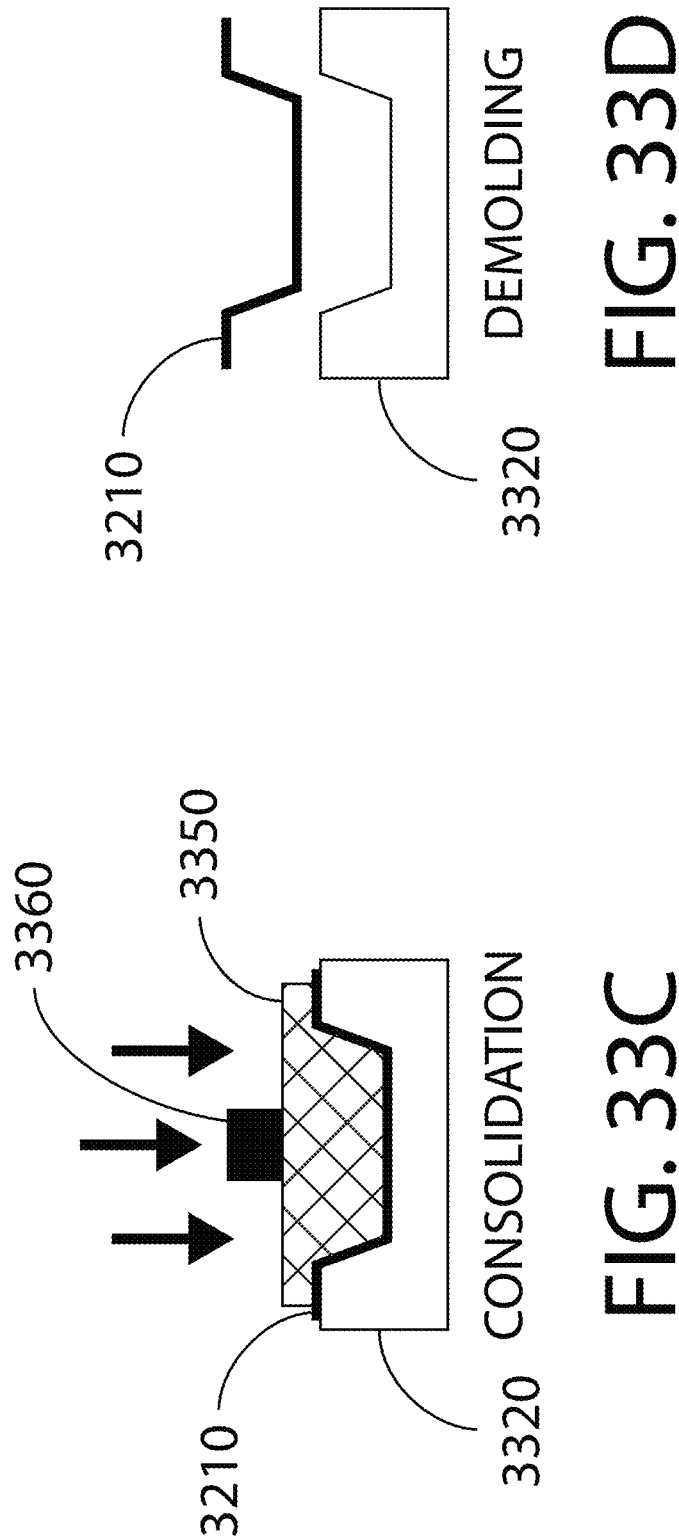

AESTHETICALLY-ENHANCED STRUCTURES USING NATURAL FIBER COMPOSITES

CROSS REFERENCE TO RELATED APPLICATIONS

This non-provisional application claims the benefit of U.S. provisional application No. 62/865,112, filed Jun. 21, 2019, which application is incorporated herein in its entirety by this reference.

This non-provisional application also is a continuation-in-part and claims the benefit of U.S. application Ser. No. 15/788,767 filed, Oct. 19, 2017, which claims the benefit of U.S. provisional application No. 62/446,809, filed Jan. 16, 2017, which applications are incorporated herein in their entirety by this reference.

Application Ser. No. 15/788,767 additional is a continuation-in-part and claims priority of U.S. application Ser. No. 14/546,518, filed Nov. 18, 2014, now U.S. Pat. No. 9,818,380, which claims the benefit of U.S. provisional application No. 61/905,752, filed Nov. 18, 2013, which applications are incorporated herein in their entirety by this reference.

BACKGROUND

The present invention relates to aesthetically-enhanced structures with high strength to weight products are substantially made from bio-composite materials and methods for manufacturing thereof are provided. Such products are sturdy, highly humidity resistant and without the many disadvantages of traditional articles of manufacture. Applications for these aesthetically-enhanced structures include furniture, storage containers, utensils, tools, displays, building interiors or exteriors, sporting equipment and transportation vehicles.

Traditional building materials used in construction, manufacturing, transportation and interiors (hence forth: materials) come in a dizzying array of options. In turn, these allow for a variety of solutions depending on price, performance and aesthetic considerations. For example, in North America, wood products, in all their forms, make up a majority of the building material market including: boards (e.g. 2×4 s), plywood, veneers, cross laminated timber, oriented-strand board (OSB), particle board, fiberboard (e.g. MDF) and laminated wood. These products are expected to have various attributes including taking hardware, mechanical strength and weather resistance to name a few. Exotic hardwoods and old growth wood are particularly prized as high performance and beautiful materials for interiors and exteriors used in commercial, residential and transportation applications.

Large materials and timber companies produce billions of square feet annually. Hugely consolidated industrial giants such as Georgia Pacific, Dupont/Dow, often operate at thin margins with massive economies of scale in a fiercely competitive market. They produce boards, panels, veneers, films, and insulation among others. Applying decorative finishes to these materials means more aesthetic choices, higher margin offerings as well as functional benefits such as additional protection from weathering, UV, fire, moisture, scratch and mar. Methods for applying finishes include spraying, in-mold coating, laminates such as those made by Formica Corporation and as known to those familiar with the art.

Accordingly, to be competitive, new entries into the market must have benefits above and beyond while keeping costs competitive. One way to achieve cost savings and therefore competitive pricing is to save on finishing costs, which often represent 20% of the over the cost for materials with high aesthetic requirements.

It is therefore apparent that an urgent need exists for light and stiff natural composite panels with aesthetically enhancing properties. These improved strength-to-weight material and structure improves the longevity, utility, weather-resistance, as well as quality consistency in production.

SUMMARY

To achieve the foregoing and in accordance with the present invention, high strength to weight products are substantially made from bio-composite materials and methods for manufacturing thereof are provided. Such products are sturdy, highly humidity resistant and without the many disadvantages of traditional articles of manufacture, such as furniture, storage containers, utensils, tools, displays, building interiors or exteriors, sporting equipment or transportation vehicles.

In one embodiment, an aesthetically-enhanced structure is formed by fusing a translucent layer with an aesthetic-enhancing layer, wherein the translucent layer includes natural fibers impregnated by a thermoplastic. The translucent layer and/or the aesthetic-enhancing layer provide one or more aesthetic properties visible through the translucent layer, for example, a pattern, a color, a texture, a pigment, a dye, a design, an image and/or a relief.

In some embodiments, the structure is a panel and includes a core layer made from materials such as foam, balsa, cork, plywood, gypsum, cardboard, paperboard, laminate bulker, aluminum honeycomb, aramid honeycomb, thermoplastic honeycomb, mineral fiber, straw filled board, felt, nonwoven, fleece, low density fiberboard (LDF), medium density fiberboard (MDF), high density fiberboard (HDL) particle board and/or oriented strand board (OSB).

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 29A-29H and 29K are cross-sectional views illustrating exemplary embodiments of aesthetically-enhanced structures in accordance with the present invention;

FIGS. 33A-33D are cross-sectional views depicting an exemplary reshaping process for the aesthetically-enhanced three-dimensional structure of FIG. 32A.

DETAILED DESCRIPTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well-known process steps and/or structures have not been described in detail in order to not unnecessarily obscure the present invention. The features and advantages of the present invention may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
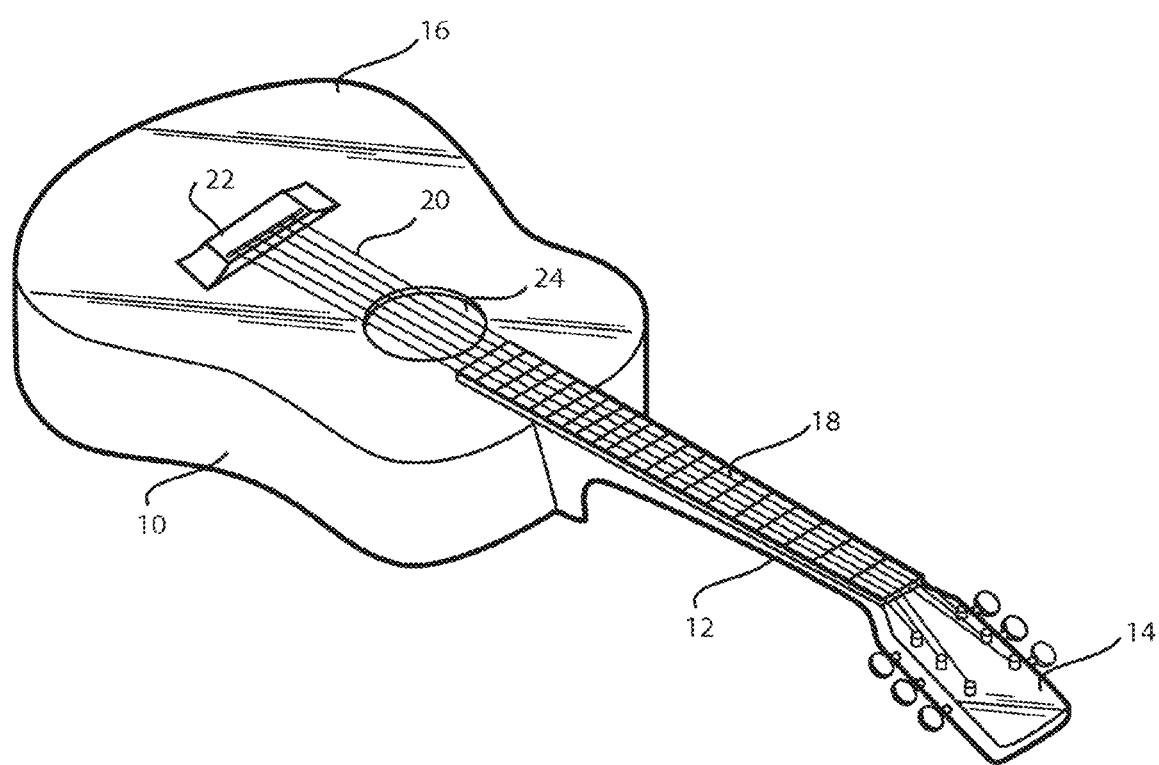
FIG. 1 is perspective view of a conventional stringed instrument.
Figure 2:
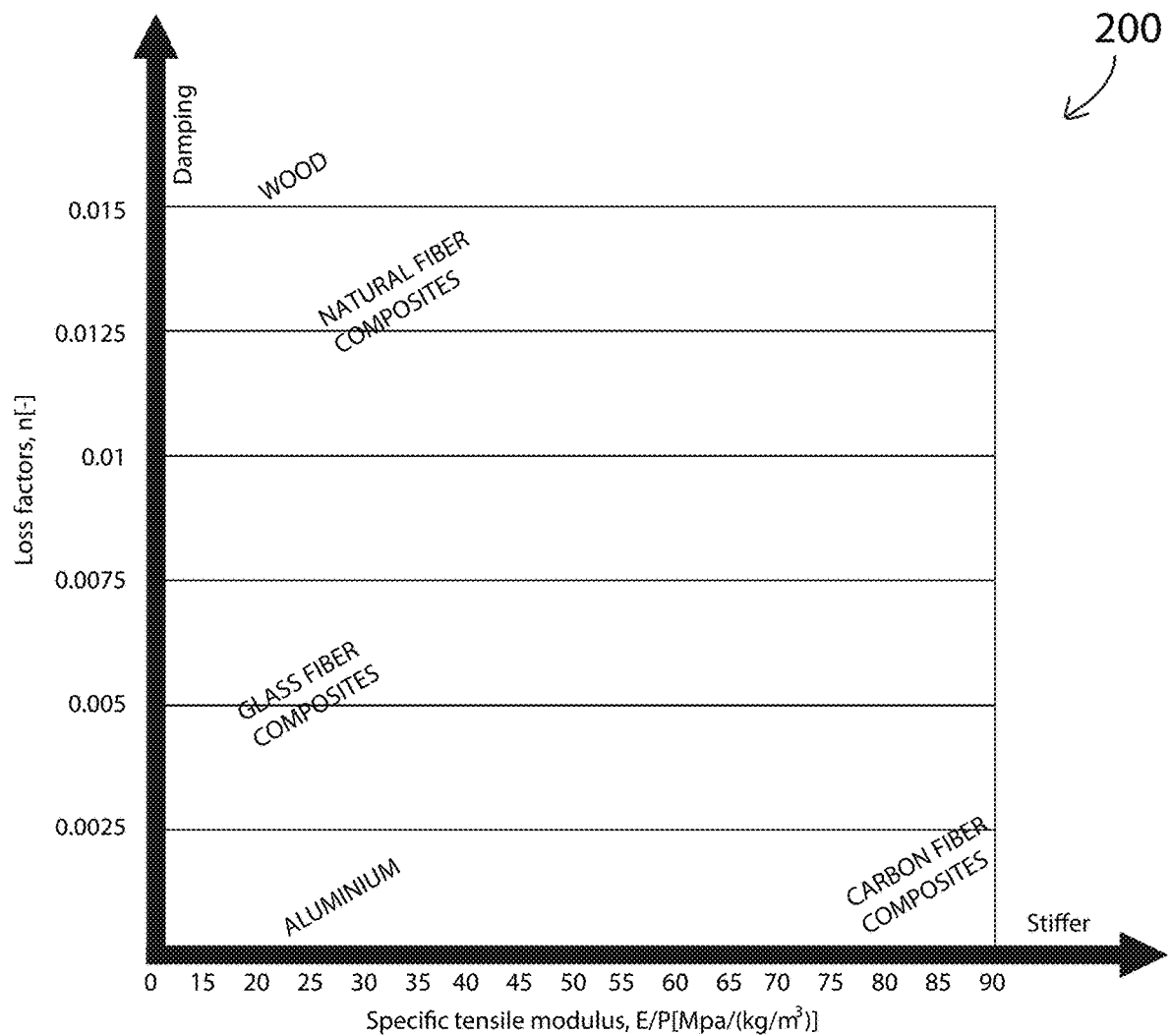
FIG. 2 is a chart showing dampening on the x axis and stiffness on they axis.

FIG. 1 is perspective view of a conventional stringed instrument. Referring to FIG. 2, this chart illustrates notably, the high dampening qualities of both wood and natural fiber composites on one dimension and the relatively high tensile modulus of natural fiber composites as compared with wood. Carbon fiber composites have relatively low dampening and exceptionally high tensile modulus. Combined with a core material such as middle layer 530, the thickness becomes too thin to be practical in manufacturing.

Figure 3:
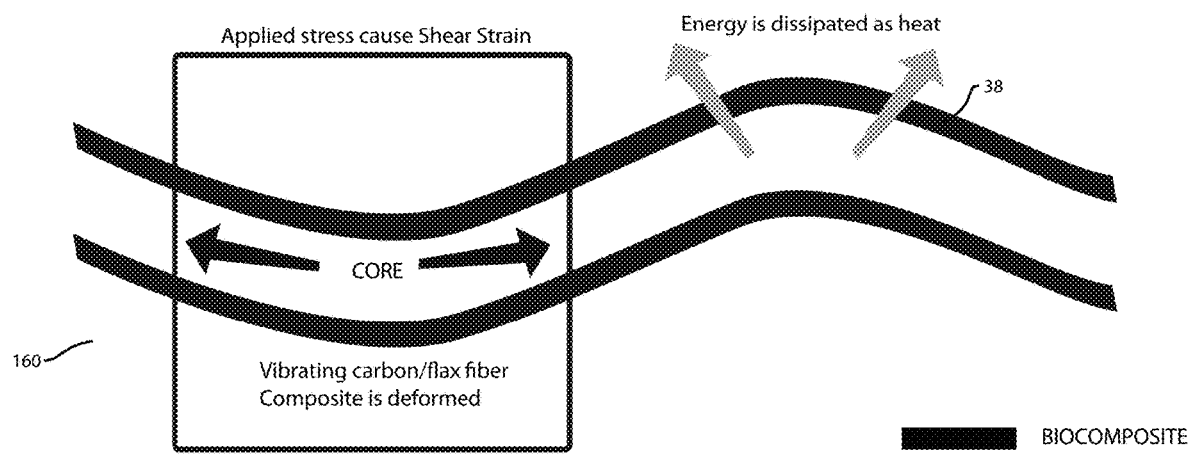
FIG. 3 is an illustration showing the effect of string vibration on the soundboard of one embodiment of the present invention.

FIG. 3, is a graphical representation of vibration damping and illustrates the effect of string vibration on soundboards of some embodiments of the present invention.

Figure 4:
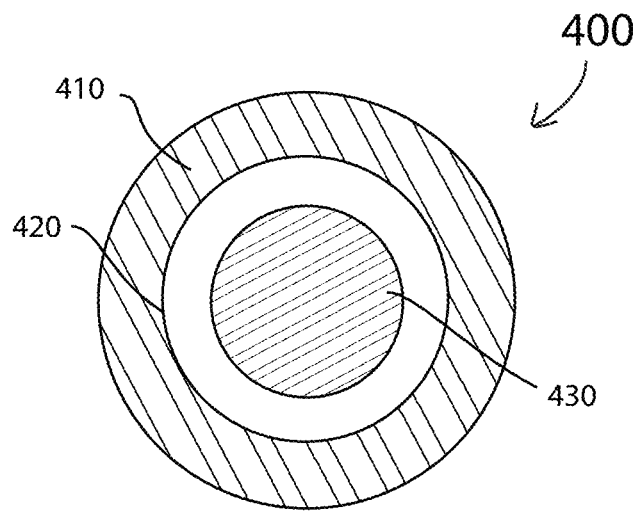
FIG. 4 is a cross-sectional view of a cylindrical structure in accordance with some embodiments of this invention.

Referring to the cross-sectional view of FIG. 4, in some embodiments, a cylindrical structure such as tube 400 includes top layer 410, middle layer 420, and bottom layer 430. Top layer 410 is made of one or more layers of unidirectional or bi-directional continuous natural fiber such as cotton, flax, cellulose, sisal, ramie, hemp, and Jute, approximately 0.05 mm-0.3 mm approximately 50-250 gsm. Middle layer 420 is made of a core material such as foam, balsa, cork, birch plywood, cardboard, laminate bulker, aluminum and composite honeycomb such as Nomex manufactured by DuPont of Wilmington, Del. These cores can range in thickness from approximately 2-10 mm. Tube 400 is useful for constructing the soundboard of string instruments such as guitars, ukuleles, and violins. Bottom layer 430 is made of at least one layer of unidirectional and/or bi-directional bast-based fiber such as flax, hemp, and Jute, approximately 0.1 mm-0.5 mm approximately 50-250 gsm. Tube 400 can also be used to construct the shells of acoustic instruments such as drums. Other suitable natural fiber materials include recycled paper products, recycled wood products, and other suitable biomaterials known to one skilled in the art.

Figure 5:
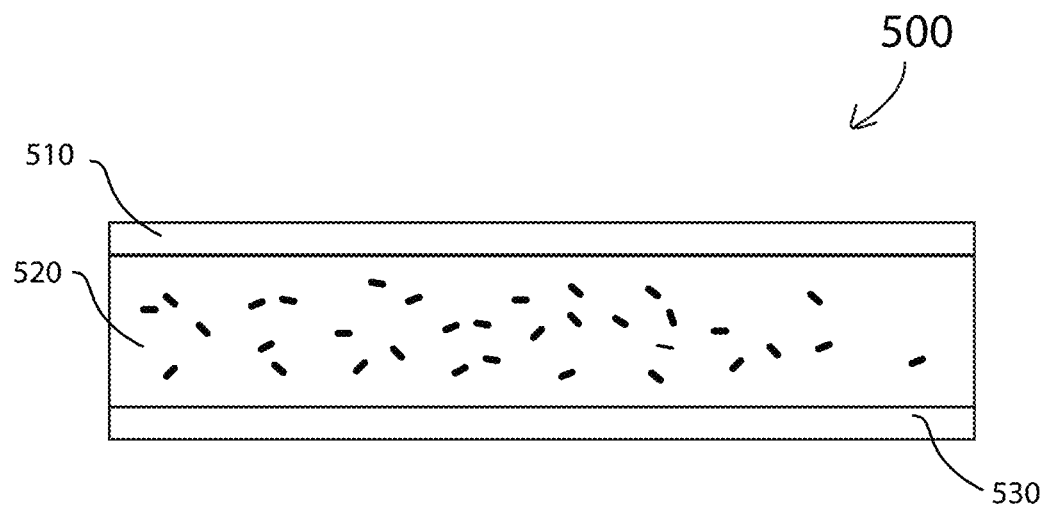
FIG. 5 is a cross-sectional view of an exemplary soundboard in accordance with some embodiments of this invention.

Referring to the cross-sectional view of FIG. 5, an exemplary embodiment of a soundboard includes a sandwich 500 includes top layer 510, middle layer 520, and bottom layer 530. Top layer 510 is made of one or more layers of unidirectional or bi-directional continuous natural fiber such as flax, cellulose, sisal, ramie, hemp, and Jute, approximately 0.05 mm-0.3 mm approximately 50-250 gsm. Middle layer 520 is made of a core material such as foam, balsa, cork, birch plywood, aluminum and composite honeycomb in a range of thickness approximately 1.5 mm-5 mm. Sandwich 500 is useful for constructing the soundboard of string instruments such as guitars, ukuleles, and violins. Bottom layer 530 is made of at least one layer of unidirectional and/or bi-directional bast-based fiber such as flax, hemp, kenaf, sisal, ramie and Jute, approximately 0.1 mm-0.5 mm approximately 50-250 gsm. Sandwich 500 can also be used to construct the shells of acoustic instruments such as drums. In some embodiments, top layer 510 includes two unidirectional layers each about 50-250 gsm in thickness.

In some embodiments, top layer and bottom layer 510 and 530 can be made of preimpregnated composite with suitable adhesive such as epoxy, bio-based epoxy, polyester, vinylester, hemicellulose, sap, sugar resin and phenolic and/or any other natural and/or synthetic compounds known.

In another embodiment, top layer and bottom layer 510 and 530 can be made using suitable liquid adhesive applied directly to the dry fabric by brush injection and/or vacuum infused.

In yet another embodiment, top layer and bottom layer 510 and 530 can be made using a sheet molding compound and/or film adhesive applied directly to the dry fabric. It is also possible for a top layer 510 to be prepreg and a bottom layer 530 to be a dry fabric layer with suitable adhesive.

Top layer and bottom layer 510 and 530 can be adhered with the middle layer(s) 520 under compression at approximately 10-100 psi using for example a vacuum, compression press, autoclave and/or continuous lamination as well processing at a temperature range of approximately 70-250 degrees Fahrenheit ("F").

Middle core layer 520, as is known to people familiar in the art of composites, adds exponential specific tensile modulus proportional to thickness.

Smaller Instruments and/or Lower String Tension

In some smaller instruments such as ukuleles and classical guitars with lower tension nylon strings, thinner middle layer 520 may be used with a range in thickness of approximately 1 mm-2 mm and top layer and bottom layer 510 and 530 with a range of thickness from approximately 0.05 mm-0.2 mm.

Figure 6:
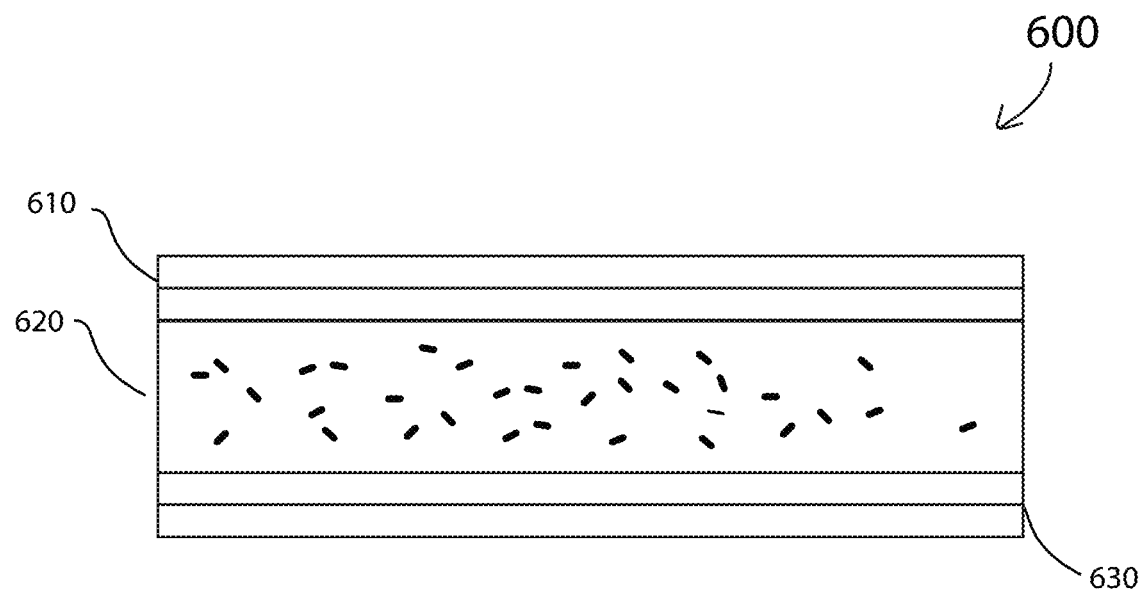
FIG. 6 is a cross-sectional view of an alternative exemplary soundboard in accordance with other embodiments of this invention.

Referring to the cross-sectional view FIG. 6, in yet another embodiment of the invention, a soundboard includes a sandwich 600 includes top layer 610, middle layer 620, and bottom layer 630. Top layer 610 is made of one or more layers of uni-directional, bi-directional, and/or discontinuous and/or continuous natural fiber such as flax, cellulose, sisal, ramie, hemp, and Jute, approximately 0.05 mm-0.3 mm approximately 50-250 gsm laminated with one or more layers of unidirectional and/or bi-directional aramid, Innegra, carbon fiber, or fiberglass, approximately 0.05 mm-0.3 mm approximately 50-250 gsm. Middle layer 620 is made of a core material such as foam, balsa, cork, birch plywood, aluminum and composite honeycomb in a range of thickness approximately 1 mm-7 mm. Sandwich 600 is useful for constructing the soundboard of musical instruments such as guitars, ukuleles, pianos and violins. Bottom layer 630 is made of one layer of unidirectional and/or bi-directional bast-based fiber such as flax, hemp, and Jute, approximately 0.1 mm-0.5 mm approximately 50-250 gsm and one or more layers of unidirectional and/or bi-directional aramid, Innegra, carbon fiber, or fiberglass, approximately 0.05 mm-0.3 mm approximately 50-250 gsm. Sandwich 600 can also be used to construct the shells of acoustic instruments such as drums.

In some embodiments, the soundboard includes a hybrid weave with natural fibers and carbon fiber woven at about 0-90 degrees to each other. It is also possible for the hybrid weave to include natural fibers and/or synthetic fibers arranged in substantially randomized directions.

In some embodiments, top layer and bottom layer 610 and 630 can be made of preimpregnated composite with suitable adhesive such as epoxy, bio-based epoxy, polyester, vinylester, hemicellulose, sugar resin and phenolic.

In other embodiments, top layer and bottom layer 610 and 630 can be made using suitable liquid adhesive applied directly to the dry fabric by brush injection and/or vacuum infusion.

In yet another embodiment, top layer and bottom layer 610 and 630 can be made using a sheet molding compound and/or film adhesive applied directly to the dry fabric. It is also possible for a top layer 610 to be prepreg and a bottom layer 630 to be a dry fabric layer with suitable adhesive.

Top layer and bottom layer 610 and 630 can be adhered with the middle layer(s) 620 under compression at approximately 10-100 psi using for example a vacuum, compression press, autoclave and/or continuous lamination as well processing at a temperature range of approximately 70-250 F.

Middle core layer 620, as is known to people familiar in the art of composites, adds exponential specific tensile modulus proportional to thickness.

Figure 7:
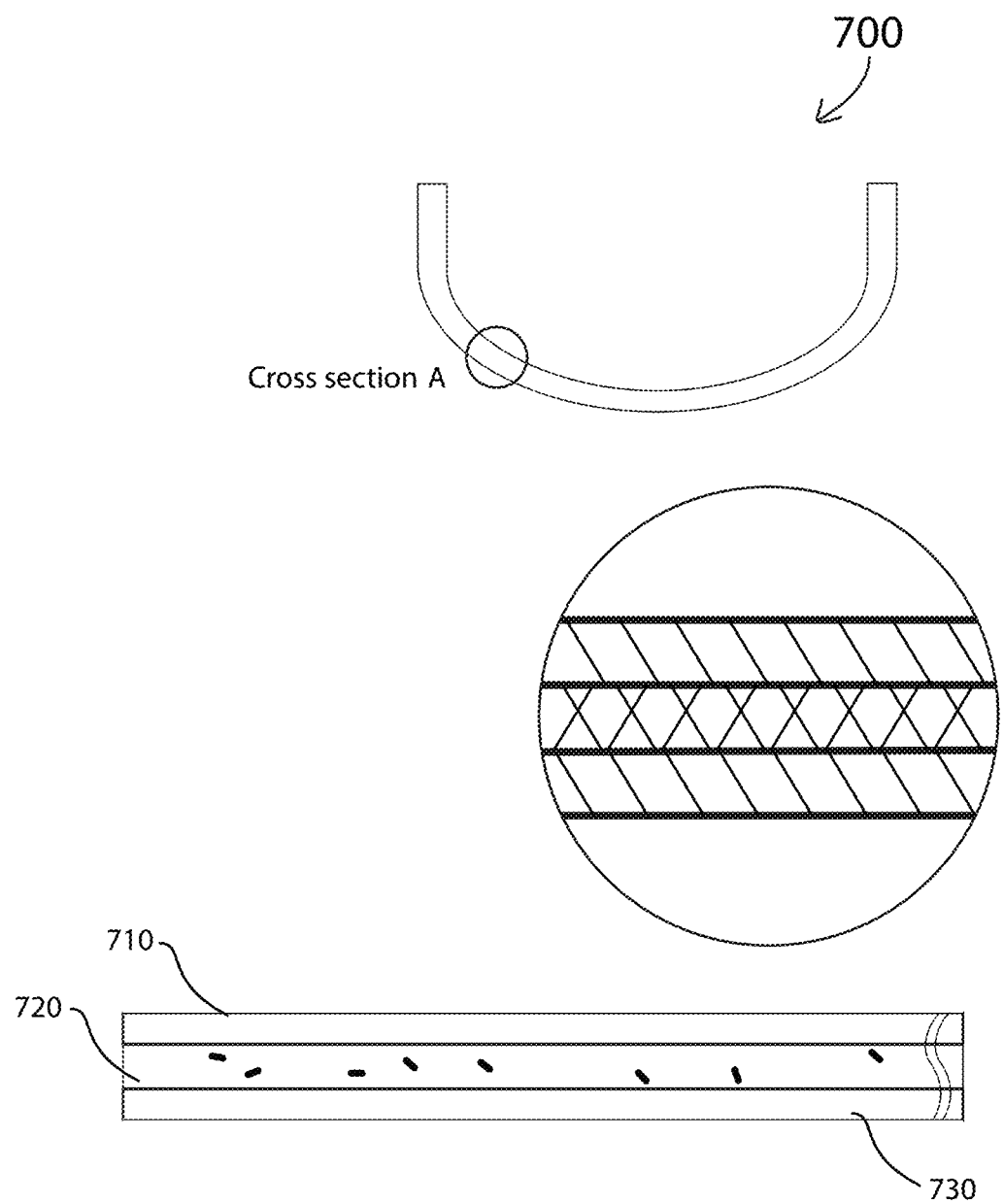
FIG. 7 is a cross-sectional view of an exemplary string instrument body in accordance with some embodiments of this invention.

Referring to FIG. 7 which includes cross-sectional views of an exemplary string instrument of the present invention, cross section of body 700 includes top layer 710, middle layer 720, and bottom layer 730. Top layer 710 is of one or more layers of unidirectional or bi-directional bast-based fiber such as flax, cellulose, sisal, ramie, hemp, and Jute, approximately 0.05 mm-0.3 mm approximately 50-250 gsm. Middle layer 720 is made of a core material such as foam, cork, balsa, honeycomb in a range of thickness approximately 0.3 mm-7 mm. Middle layer 720 can also be made of one of more layers of biocomposite Cross-section of body 700 is useful for construction of the body of string instruments such as guitars, ukuleles, and violins. Bottom layer 730 is made of at least one layer of unidirectional or bi-directional bast-based fiber such as flax, hemp, and Jute, approximately 0.3 mm-2 mm approximately 50-250 gsm.

In some embodiments, top layer and bottom layer 710 and 730 can be made of pre-impregnated composite with suitable adhesive such as epoxy, bio-based epoxy, polyester, vinylester, hemicellulose, sugar resin and phenolic.

In another embodiment, top layer and bottom layer 710 and 730 can be made of liquid resin applied directly to the dry fabric brush injected or infused.

It is also possible for a top layer 710 to be prepreg and a bottom layer 730 to be a dry fabric layer with suitable adhesive.

Top layer and bottom layer 710 and 730 are combined with middle layer(s) 720 under compression at approximately 10-100 psi using for example a vacuum, compression press, and/or continuous lamination as well processing at a temperature range of approximately 70-250 f.

Figure 8:
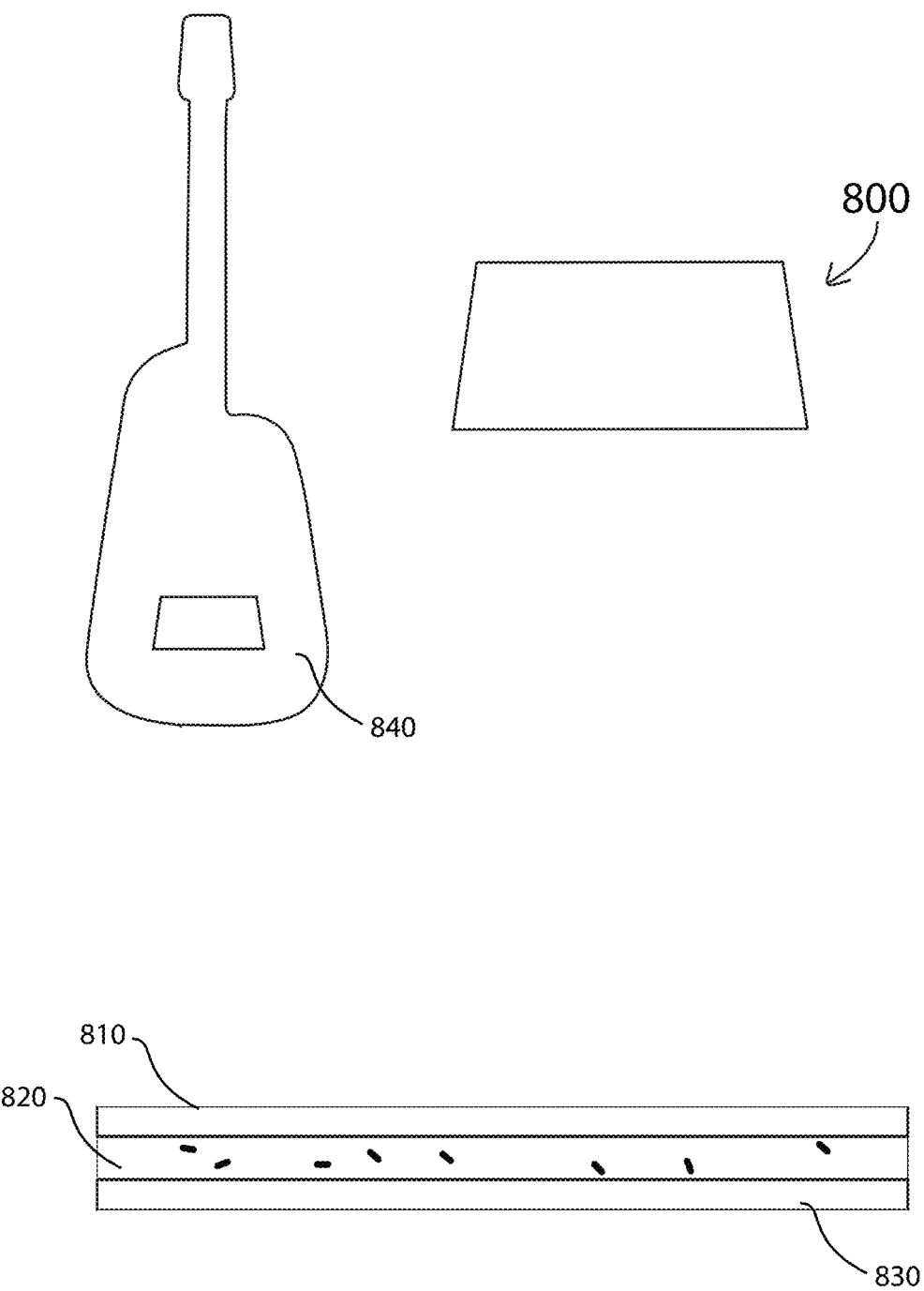
FIG. 8 includes cross-sectional views of an exemplary bridge plate in accordance with some embodiments of this invention.

Referring now to FIG. 8, which includes cross-sectional views of an exemplary bridge plate in accordance with some embodiments of this invention, the bridge plate includes the top layer 810 and bottom layer 830 are comprised one or more layers of unidirectional and/or bi-directional bio-based approximately 40-300 gsm fabric. Wherein middle layer 820 is comprised of core material from approximately 1-10 mm thick.

In another embodiment, the top and bottom layers comprise one or more layers of unidirectional and/or bi-directional aramid and one or more layers of unidirectional and/or bi-directional bio-based fabric.

Similarly, another embodiment, the top and bottom layers comprise one or more layers of unidirectional and/or bi-directional carbon fiber and one or more layers of unidirectional and/or bi-directional bio-based fabric.

The bridge plate 800 can be mounted to the underside of the soundboard 840 where the strings are mounted via the bridge.

This arrangement adds stiffness to the structure proportional to the geometry and thickness of the bridge plate.

The density of the bridge plate has an impact on the timber and warmth of the acoustic tone. Biocomposite enables very low mass bridge plates and thus warm eq.

Figure 9:
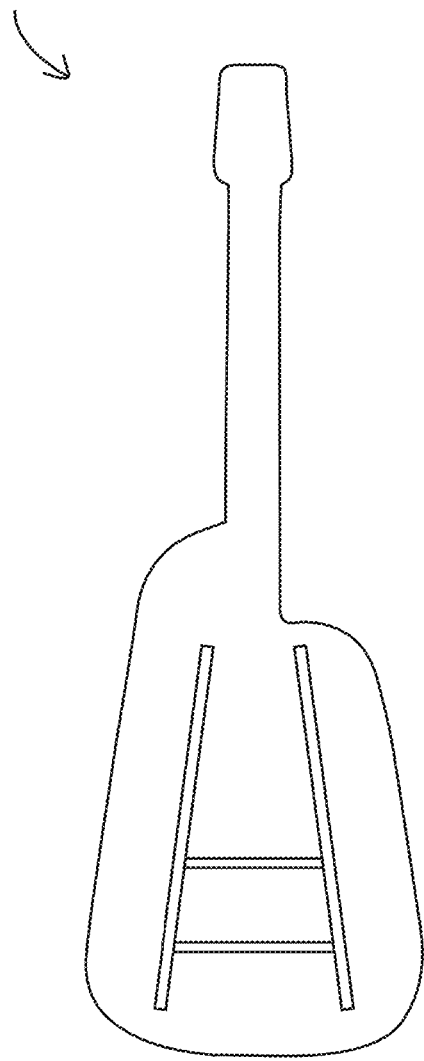
FIG. 9 includes cross-sectional views of alternative exemplary bracing profiles in accordance with various embodiments of this invention.
Figure 9:
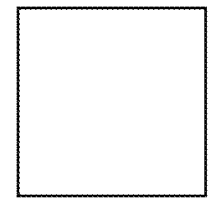
Figure 9:
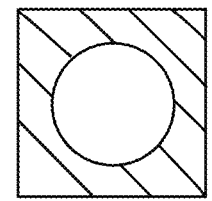
Figure 9:
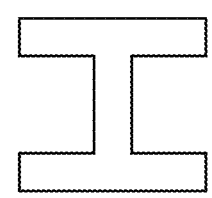
Figure 9:
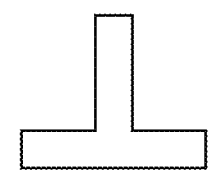

FIG. 9 includes cross-sectional views of alternative exemplary bracing profiles for additional embodiments of the present invention. Referring to bracing assembly 900a, two longitudinally oriented biocomposite tubes and/or rods and/or molded and/or tube/rod subassemblies running the length of the sound box and/or entire length of body including the neck and head. Also shown are two tubes and/or rods and/or molded components and/or tube/rod subassemblies latitudinal oriented. In other embodiments, bracing assembly 900a utilizes a single to a multitude of biocomposite tubes and/or rods and/or molded bracing components and/or tube/rod subassemblies.

Bracing profile cross section 900b, can be a rod made of one or more layers of biocomposite approximately 100 gsm-500 gsm and ranging in size from approximately 2-10 mm square. In another embodiment the rod is rectangular wherein length is approximately 2 mm-8 mm and width approximately 3-12 mm. Other bracing profiles would also be effective including Trianglar, T-bracket, L-bracket, half-moon, elliptical, polygonal, or any other suitable profile designs known to one skilled in the mechanical arts. In addition, these bracing profiles may be perforated to further increase their strength to weight ratio. Perforations may be molded, punched, drilled, laser-cut, or otherwise created using methods known to one skilled in the art.

Bracing profile cross section 900c, is a tube made of one or more layers of biocomposite approximately 100 gsm-500 gsm and ranging in size from approximately 2-10 mm square. In another embodiment the tube is rectangular wherein length is approximately 2 mm-8 mm and width approximately 3-12 mm.

Bracing profile cross section 900d, is a I-beam made of one or more layers of biocomposite approximately 100 gsm-500 gsm and ranging in size from approximately 2-12 mm.

Bracing profile cross section 900e, is a tube made of one or more layers of biocomposite approximately 100 gsm-500 gsm and ranging in size from approximately 2-10 mm square. In another embodiment the tube is rectangular wherein length is approximately 2 mm-8 mm and width approximately 3-12 mm.

In some embodiments, cross sections 900a-900e may be tapered wherein the outer edges are substantially thinner than the center. The taper distance ranges from approximately 0-50 mm.

There are various methods to manufacture these tubes, rods and assemblies including compression molding, wrap-rolling, bladder-molding, filament winding and pultrusion.

In other embodiments the bracing can be molded as a substantially hollow 3D form. For example an x-brace for a steel string acoustic guitar—thereby eliminating joints, reducing weight and production complexity.

Bracing profiles as shown in 900b-900c and as oriented in assembly 900a, can add substantial stiffness to the structure depending on geometry and thickness.

In some embodiments, the density of each composite skin layer is reduced in order to match or supersede the desired mechanical properties of choice spruce—by using unidirectional natural composites ranging from 5 oz/sq/ft-1.5 oz/sq/ft weight versus 5.9 oz/sq/ft carbon fiber. These 44% lower density skins are bonded to a higher surface area core using approximately 5 oz/sq/ft-1.5 oz/sq/ft of resin without the addition of additional film adhesive. This reduction in resin usage is achieved by a relatively high resin-to-fiber ratio of the pre-impregnated epoxy in the fiber. The extra resin helps bond the fiber to the core by maximizing bonding area.

An example of a suitable pre-impregnated natural composite is manufactured by Lingrove under the brand name Ekoa. A core with higher surface area is also used to help bond the composite skins to the core. One exemplary core is made of acrylic foam, manufactured by Evonik under the brand name Rohacell, which has more surface area for bonding than honeycomb. Another is low-density, high surface area core option is end-grain balsa such as made by Baltec. These cores are selected because they can resist the heat and pressure of the molding process, which in combination can help achieve strong interstitial adhesion. The laminating process can be accomplished using compression molding, autoclave, vacuum-bagging, bladder molding to name a few exemplary composite processes.

In some embodiments, carbon fiber bracing and bridge plate are used to reinforce the soundboard made using Ekoa. The resulting composite sound board is tonally superior. High load areas can be reinforced with carbon fiber including the neck, neck-to-body junction, bracing and bridge plate. Reinforcement is preferred because natural fibers such as wood are low density and therefore prone to absorbing moisture. Further natural fibers are visco-elastic causing positive vibration damping qualities for sound quality but negative creep when subject to extreme changes in humidity.

Although Nomex has been promoted as the ideal core material because of its lower density, intended to offset the higher density of the typical carbon fiber skins. Unfortunately, the result is not pleasing tonally due in part to the ultra-low density of the Nomex core which is too vibration-damping. In addition, the relative low surface area of the honeycomb requires an adhesive layer which adds considerable density.

In contrast, the use of foam or balsa as a core results in a tonally superior soundboard when compared with a synthetic soundboard made with a nomex/aramid honeycomb core. Relatively higher density foam and balsa cores offer both reduced vibration damping and substantially increased surface area removing the need for an adhesive layer when composited with linen.

Unidirectional linen fiber can be used for lower tension instruments such as nylon-stringed ukuleles. In order to achieve the aesthetic and look of koa wood which is commonly used for ukuleles, a multidirectional mix of unidirectional linen fiber can be used. For example, a bidirectional mix can include 50-200 gsm of unidirectional fiber oriented in the same direction as the strings, and 50-110 gsm of unidirectional natural fiber oriented perpendicular to the strings.

Unidirectional linen fiber can also be used for higher tension instruments such as acoustic steel-stringed guitars. However, to attain the ideal combination of soundboard stiffness-to-weight and thickness for use in higher tension acoustic guitars, most of the fibers can be oriented in one-direction parallel to the strings thereby counteracting string tension. This is similar to the grain found in natural soft wood which coincidentally runs in one-direction. This also has the benefit of matching the aesthetic of natural wood. This is more efficient than using woven fibers of the same weight due to a higher specific modulus.

Additional Embodiments and Applications

While the above described structures and methods have been exemplified using the construction of stringed musical instruments, many of these structures and methods can be also used for the manufacture of other acoustical musical instruments such as drums. In addition, these structures and methods can also be adapted for manufacturing of other products such as furniture, hand tools, kitchen utensils and storage containers.

For example, with respect to furniture, pieces can be made using the materials and methods described above including: surfaces such as tables, seating, space divider panels, lighting, and built-in interior and exterior architecture. The translucency of the material as well as the ability to mold in three-dimensional forms, makes this particularly useful above and beyond the wood-esque aesthetic. The high stiffness-to-weight substantially improves furniture performance.

Light and stiff panels, either entirely planar or rendered into three-dimensional shapes and made as described above, also have applications in the various sports and leisure applications including, surf boards, snowboards, skate boards, wakeboards, skis, scooters, kit boards, stand-up paddle boards and the like. These applications tend to favor high stiffness-to-weight ratios. Other suitable sporting/leisure equipment applications include rackets, paddles, fishing rods, hiking/ski poles, bicycles, trikes, which can also benefit from use of above described methods for manufacturing superior high stiffness-to-weight panels.

Many other applications are also possible. For example, various transportation and/or vehicular applications include automobiles, trains, aircraft, hovercraft, and/or boats/ships. Interior/exterior parts such as dashboards, floor panels, door panels, seat backs, body panels can all benefit from stiff and light panels which can be manufactured using the methods described above.

Figure 10:
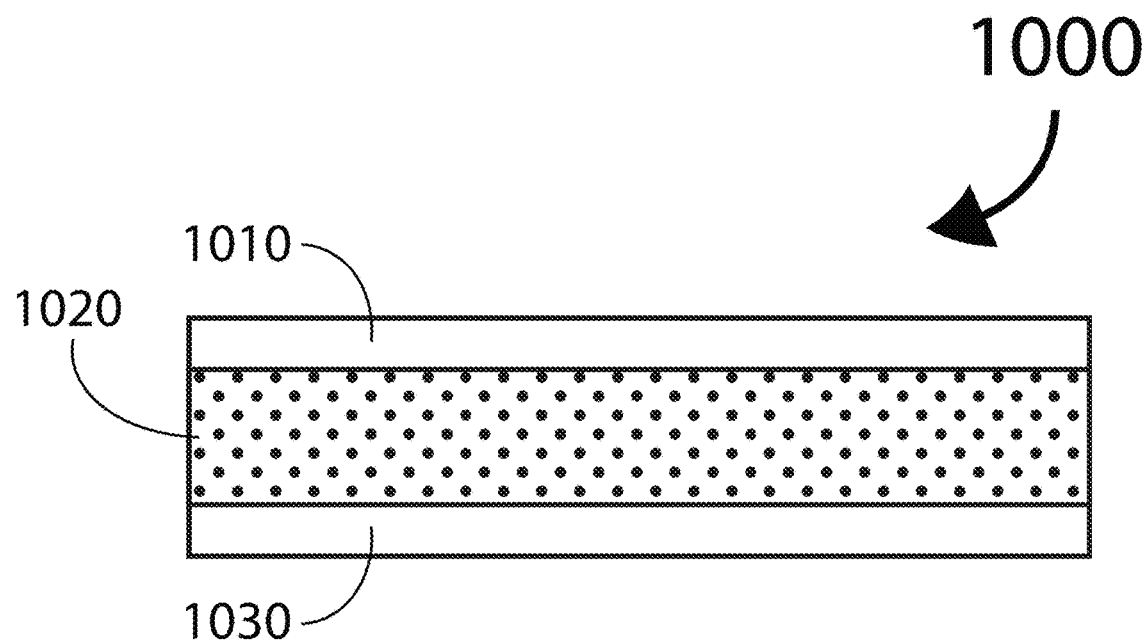
FIGS. 10-12 are cross-sectional views of several embodiments of exemplary panels in accordance with the present invention.

In yet another embodiment, as illustrated by the cross-section view of FIG. 10, cost savings without compromising aesthetics and/or structural integrity is accomplished by including an intrinsic finish layer 1010 in the panel 1000.

There are two major classes of plastics: thermoset and thermoplastic. Thermoset resins harden as a result a chemical reaction whereas thermoplastics as a result of elevated temperature. Thermoplastic resins melt with elevated temperature which is called the glass transition temperature. Note that the specific glass transition temperature varies by plastic type. Once the glass transition is reached the viscosity typically starts dropping and continues to lower as the temperature increases. It is possible to utilize a thermoplastic matrix or binder to both impregnate the natural fibers as well as bond to a core. This may occur in a single step or as a multi-step process. It is possible to produce a sandwich panel with the skins made of natural fibers in a polypropylene thermoplastic matrix where the skin may have a thickness from 0.1-2 mm and fiber to resin ratio varies from 30-70 fiber to resin ratio or vice versa. Alternatively the panel may be made using natural fibers with various thermoplastic resins such as polyethylene terephthalate (PET), polyethylene terephthalate polyethylene glycol-modified (PET-G), acrylic (PMMA), polyamide (PA), polyurethane (PU), Polyethylene (PE), polylactic acid (PLA), Polyethylene Furanoate (PEF), Polyhydroxyalkanoates (PHA), Polybutylene succinate (PBS) and polycarbonate (PC). These same thermoplastic resins may be comprised in part or entirely of bio-based resins such as those derived from plants such as corn, cassava, sugar, soy, cellulose and switchgrass.

A natural fiber sandwich panel may be produced in a single, two or more step process. The first step is to substantially impregnate the fiber with resin and create the skin component as taught previously. These skins are then bonded to the core in a secondary or tertiary operation. A natural fiber composite skin as described, has utility as a finished product for furniture, walls, floors, and ceiling applications.

In one embodiment, the top layer of the skin comprises a thin layer of resin that replaces the need for a secondary finishing process such as painting on a clear coat made of polyurethane, polyester or other commonly used finish paints to protect the fibers from moisture. This saves on the laborious process of finishing. In addition, the chemicals used for finishing are often made with 'chemicals of concern' that are listed in, for example, California Proposition 65. Having a short components list of as little as two and as many as five components, means fewer chemicals and therefore chemicals of concern than many existing finishing products. The components used in this embodiment of the skin included flax fibers reinforcing a PLA resin matrix. This combination has been tested to a clean air gold level certification which means better indoor air compared with incumbent materials such as wood which often requires an added layer of urethane to protect it.

Another advantage of this embodiment is one or more of the components are $CO_2$ negative as they are made of rapidly renewable plants and sequester carbon through the process of photosynthesis. This is compared with high pressure laminate such as sold under the brand name 'Formica' which is made with phenolic among other components—none of which are $CO_2$ negative.

Accordingly, an environmentally friendly and cost-effective natural fiber composite formulation for panel 1000 can include intrinsic finish layer 1010 in the material production. To achieve this, a consistent quantity of resin-to-fiber with a ratio equal to or greater than approximately 50 resin to 50 fiber ratio achieves a consistently smooth finish on panel 1000. A topcoat, also called a surface coat or hard coat, can be applied in a continuous fashion in a double belt press 2600 or 'daylight' static press process as shown on FIG. 33. The particular quality of finish whether gloss, satin, matte, velvet can be achieved with mold 'release films' and/or via tooling/belt surfaces. Resin can be utilized with a higher melting point than the resin used to impregnate the fibers to ensure the topcoat remains above the fiber layer and does not impregnate them.

Figure 11:
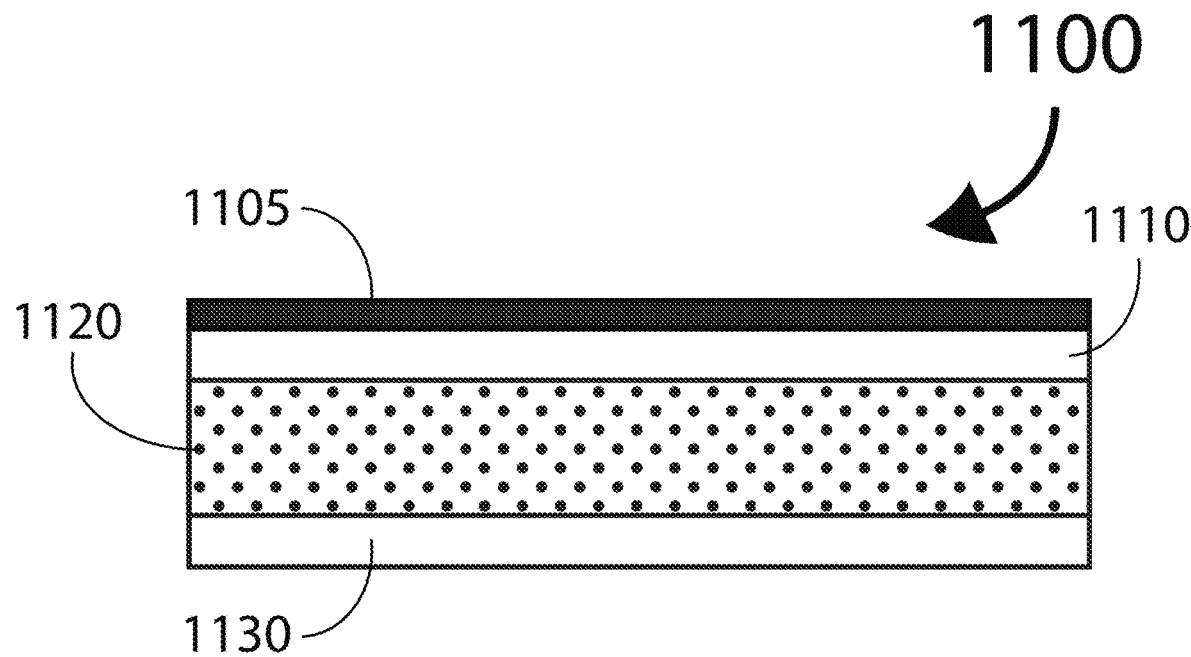

In some embodiments, the finishing or top layer coat can have functional benefits such as semi-permanent ink coating 1105 (dry erase) (see FIG. 11). Due to the relatively high cost of some natural fibers resulting from the many steps needed to make consistent material on rolls, there is a strong case to use thin natural fiber and resin matrix materials using lower cost core materials to make up the bulk of the overall panel thickness. Accordingly, sandwich panel construction with thin skins ranging in thickness from 0.1 mm-2 mm on both sides of a core which can range from 2 mm-300 mm with no limit to thickness of the panel other than what is realistic for manufacturing and handling. Typical panel thickness is approximately 6-20 mm. Given the relatively small amount of material for the skins relative to the thickness of the core, we are able to utilize relatively small amounts of fibers even when multiple layers are used and oriented in different directions.

Panel 1000 is lighter than the norm by using lower density cores than skins to make for lighter panels overall. Many high-quality materials as well as low cost materials are produced with little regard for impact on the natural world and energy use. It is estimated that industrial materials manufacturing such as wood, metal, concrete, and plastics account for more than 20% of global CO2 emissions. In addition, deforestation contributes an estimated 18% of global CO2 emissions. In some applications requiring finished layers on both outer surfaces, such as cubicle dividers, wall dividers partitions and furniture, the inherent advantage of incorporating intrinsic finished layers 1010, 1030 of panel 1000 become more apparent.

It is also possible to manufacture energy-efficient embodiments using core material with the appropriate thickness and insulating properties. Conversely, it is also possible to manufacture thermally conductive panels with the appropriate core material. Some embodiments use a self-adhering resin to reduce manufacturing cost of goods and enable downstream assembly processes.

The core material with acoustic absorption properties can be used for acoustic panels and beams utilizing biomass, agricultural waste, mineral fiber, polyester fiber, and/or post-consumer waste to help reduce energy use as well as CO2 emissions. Using similar resin materials for the core and impregnation of the fibers can enhance end of life recyclability. By impregnating the natural fibers with fire retardants such as phosphorus, it is possible to enhance fire resistant properties and pass flame spread requirements such as ASTM E84.

Figure 30:
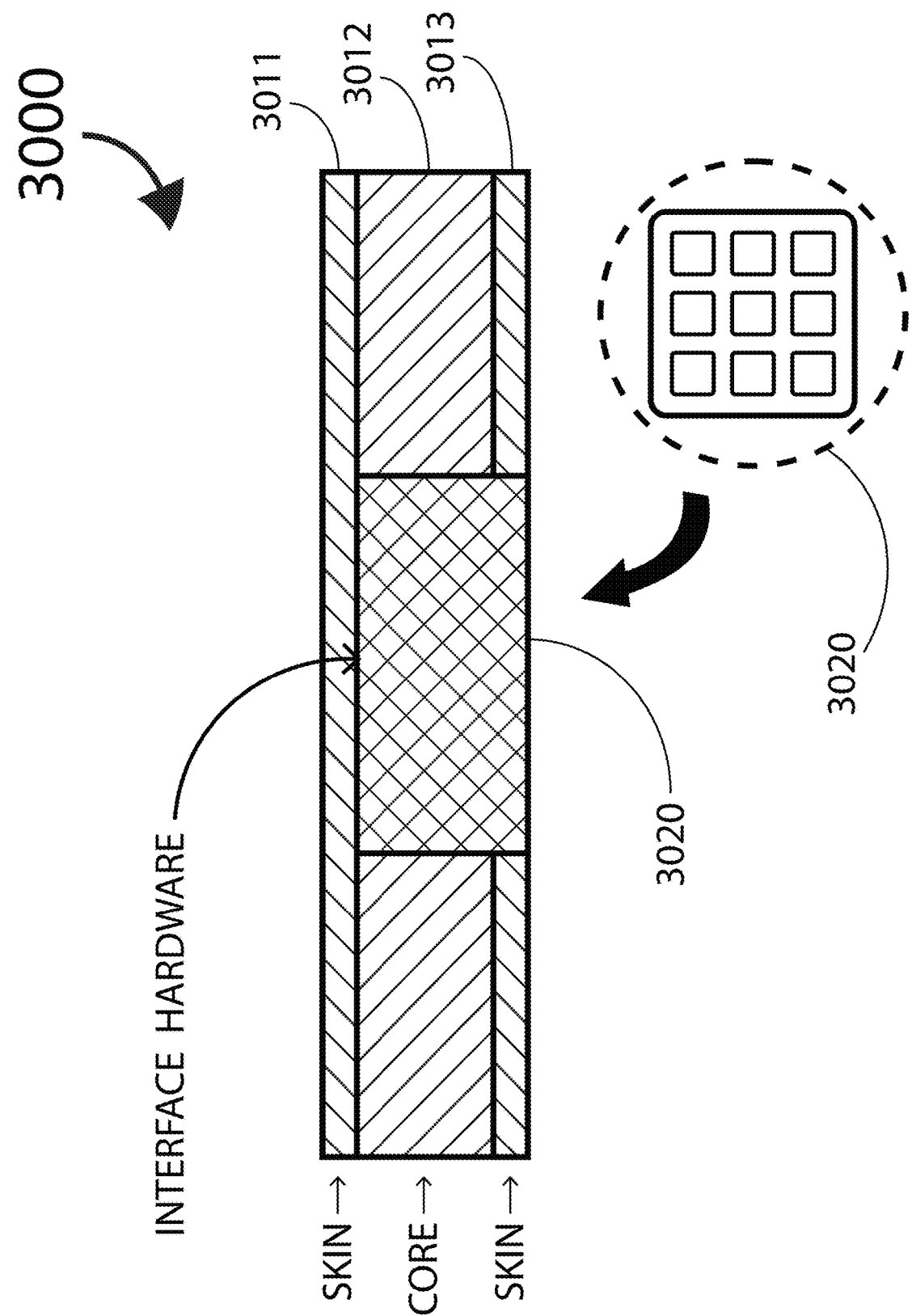
FIGS. 30 and 31 are cross-sectional views of exemplary aesthetically-enhanced structures illustrating the adaptability of these structures for various applications in accordance with the present invention.

In some embodiments, the natural fiber laminates can be translucent for lighting effects for example in ceiling, bathroom, mobility and wall applications. The sandwich panel 3000 In FIG. 30 can be used as a graphical user interface 3020 with the core material being transparent or translucent if needed 3012. The core material may also be substantially removed where needed to accommodate touch interface hardware components.

Figure 12:
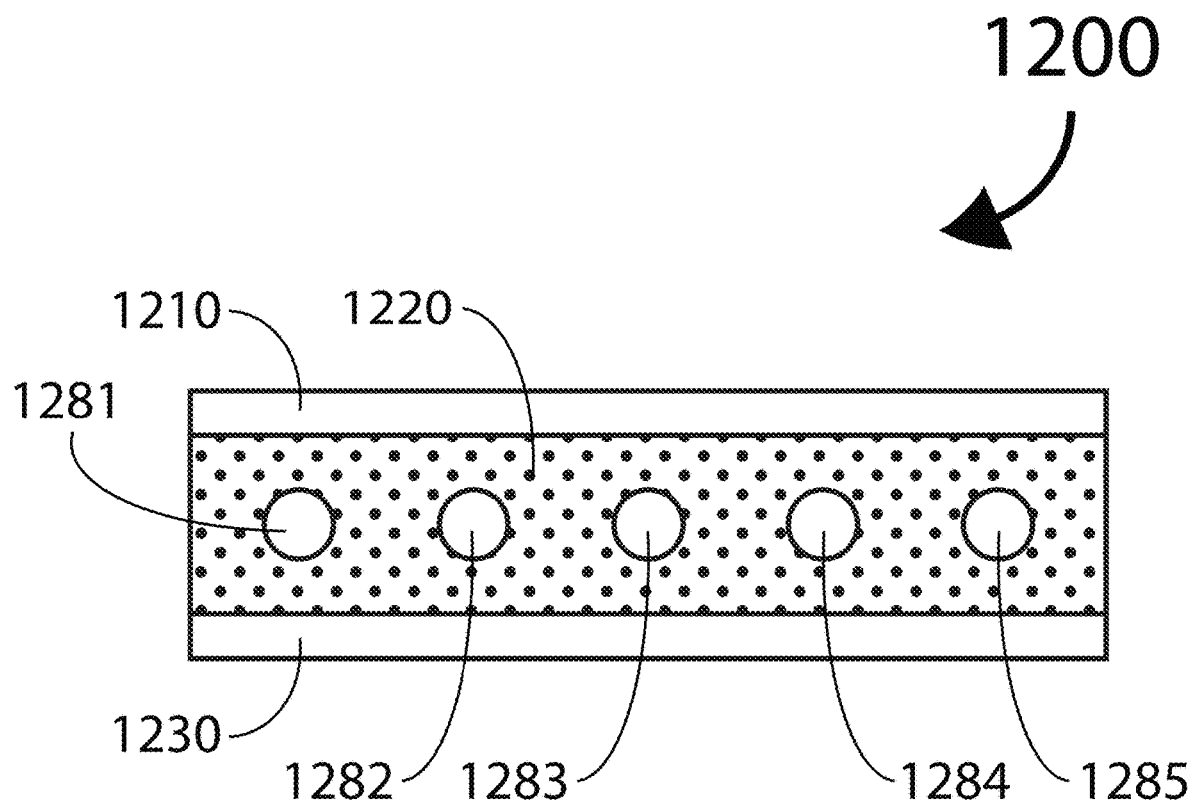

As shown in FIG. 12, exemplary sandwich panel 1200 can be heated and/or cooled via fluid circulating in channels 1281-1285. Climate control can also be accomplished using embedded electrical elements (not shown).

Figure 31:
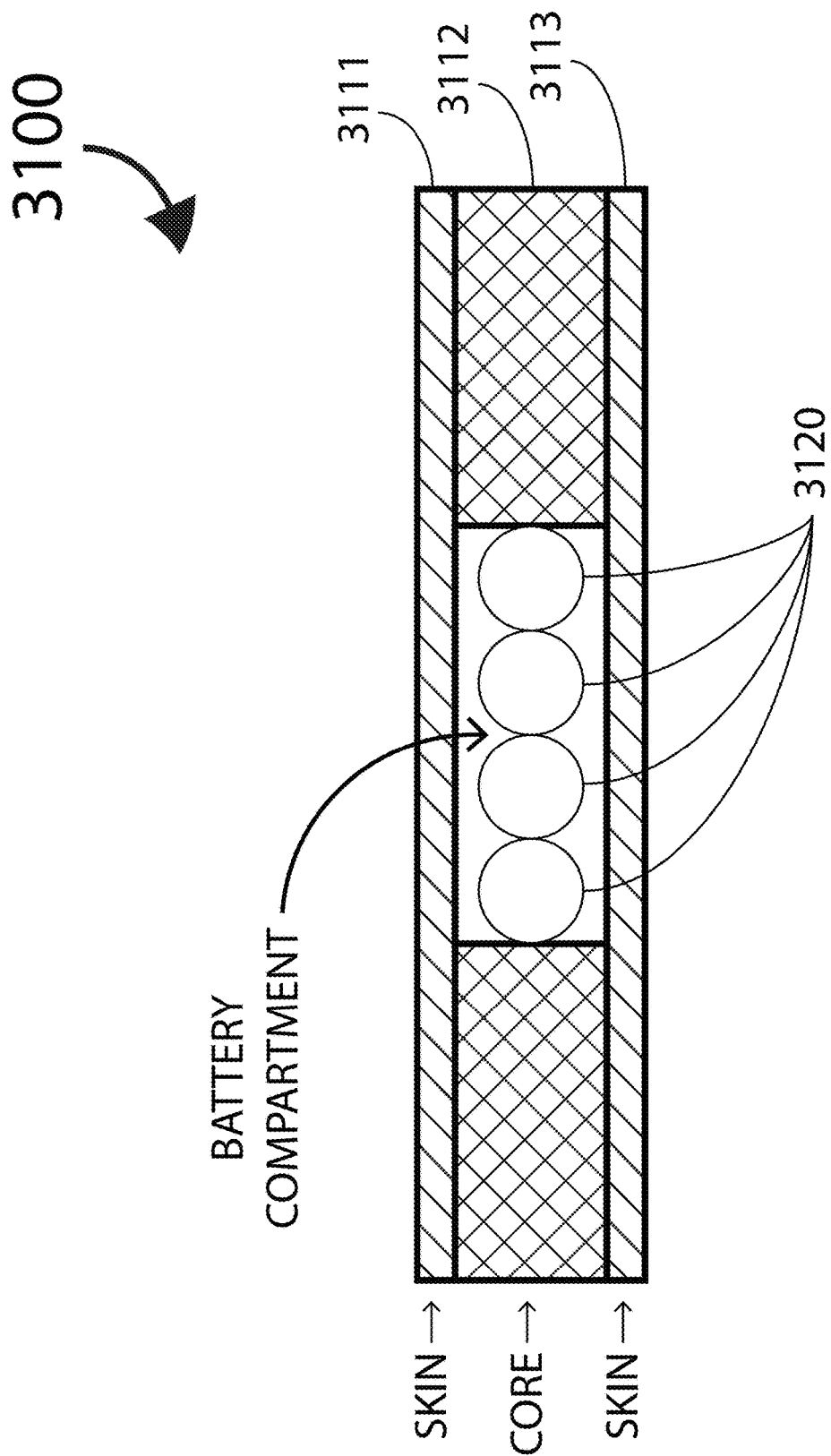

In accordance with the present invention, some embodiments of panels can incorporate solar cells, batteries and/or capacitors for electrical generation and/or storage (see FIG. 31).

In some embodiments, by using the appropriate materials, the sandwich panels allow for transmission of radio frequencies and other forms of wireless data and voice communication. Conversely, the sandwich panels can include, for example, metallic particles or foils within the core and/or resin, to shield electromagnetic radiations, in applications such as dental offices, and medical facilities to protect patients and care-providers from X-rays.

It is also possible to mold texture and/or contours in continuous production lines as illustrated by FIGS. 16-25. For example, curves, both simple and compound, can be molded into chair 1700, chairs 18A-18D, lamp 1900, table 2100 and canopy 2200. These articles of manufacture may be molded or formed into curved and varied three dimensional shapes with cores such as seating applications, e.g., chair 1700. Similarly sinks, cookware (shown in FIGS. 23A-23B), shower stalls, bathtubs, consumer electronics enclosures, bins 1340, and receptacles may all be molded with natural fibers and a core structure (some not shown).

Figure 13:
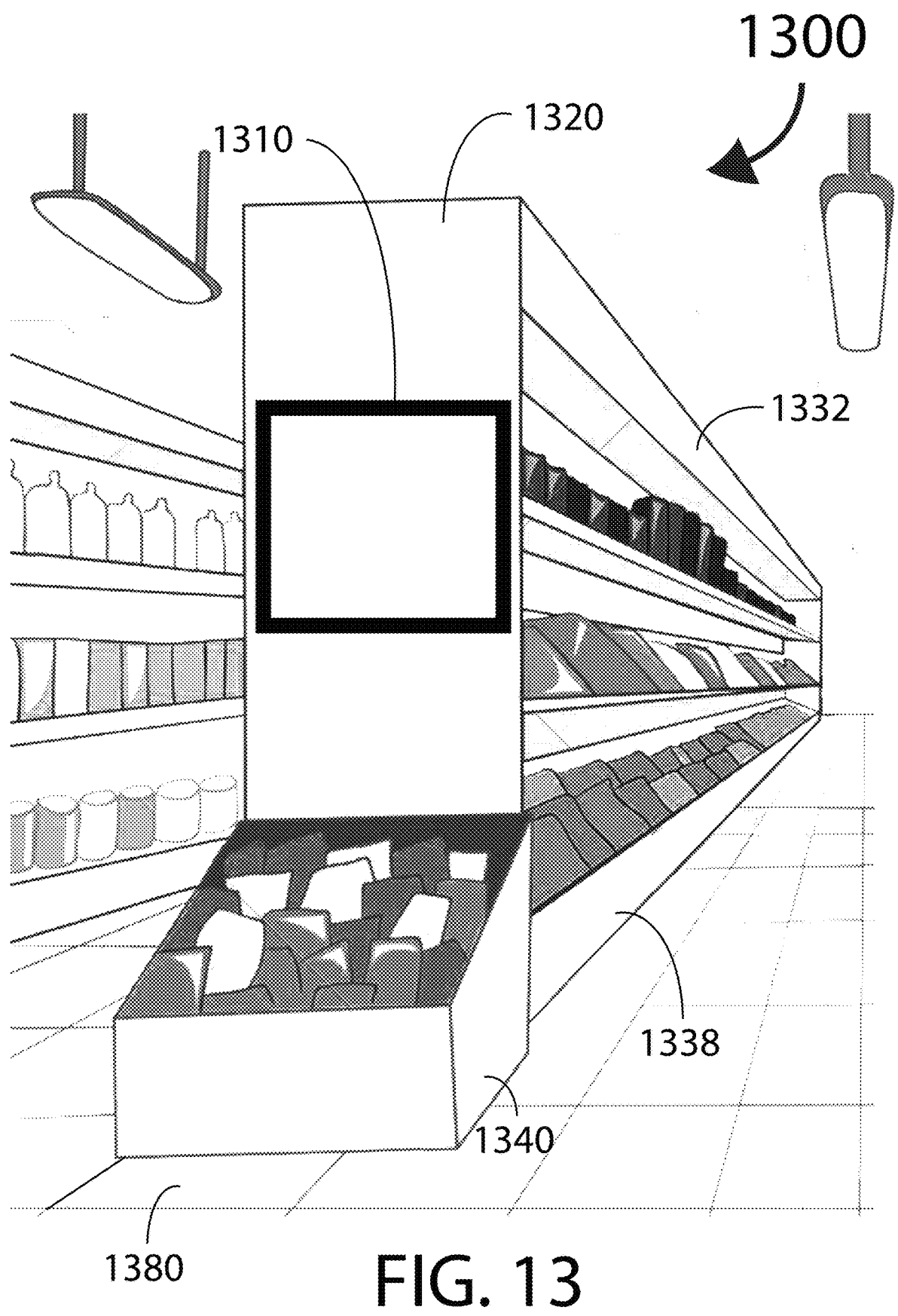
FIG. 13 is a perspective view illustrating display shelving, bins and flooring utilizing the exemplary panels of the present invention.

In some applications, a slip resistant textured surface may be incorporated (see flooring 1380 with tile pattern of FIG. 13).

Referring again to the cross-sectional view of FIG. 10, in some embodiments, a sandwich structure such as panel 1000 includes top layer 1010, middle layer 1020, and bottom layer 1030. Top layer 1010 is made of one or more layers of unidirectional or bi-directional continuous natural fiber such as cotton, flax, cellulose, sisal, ramie, hemp, and Jute, approximately 0.1 mm-6 mm approximately 50-2000 gsm. Middle layer 1020 is made of a core material such as foam, balsa, cork, plywood, gypsum, cardboard, paperboard, laminate bulker, aluminum honeycomb, aramid honeycomb, thermoplastic honeycomb, mineral fiber, straw filled board, felt, nonwoven, fleece, low density fiberboard (LDF), medium density fiberboard (MDF), high density fiberboard (HDL) particle board or oriented strand board (OSB) such as manufactured by the Georgia Pacific Company. Foam cores include, but are not limited to the following plastics: acrylic, polyurethane, polypropylene, polyethylene, polyester, biopolyester, polyamide, Polyethylene terephthalate (PET).

The core middle layer 1020 can range in thickness from approximately 2-500 mm. Panel 1000 is useful for construction tables, desks, room dividers, display cases, bookcases, shelving, doors, walls, and ceiling panels. Bottom layer 1030 is made of at least one layer of unidirectional and/or bi-directional bast-based fiber such as flax, hemp, and Jute, approximately 0.1 mm to 6 mm approximately 50-2000 gsm. Panel 1000 can also be used to construct the walls of structures such as homes.

Figure 25:
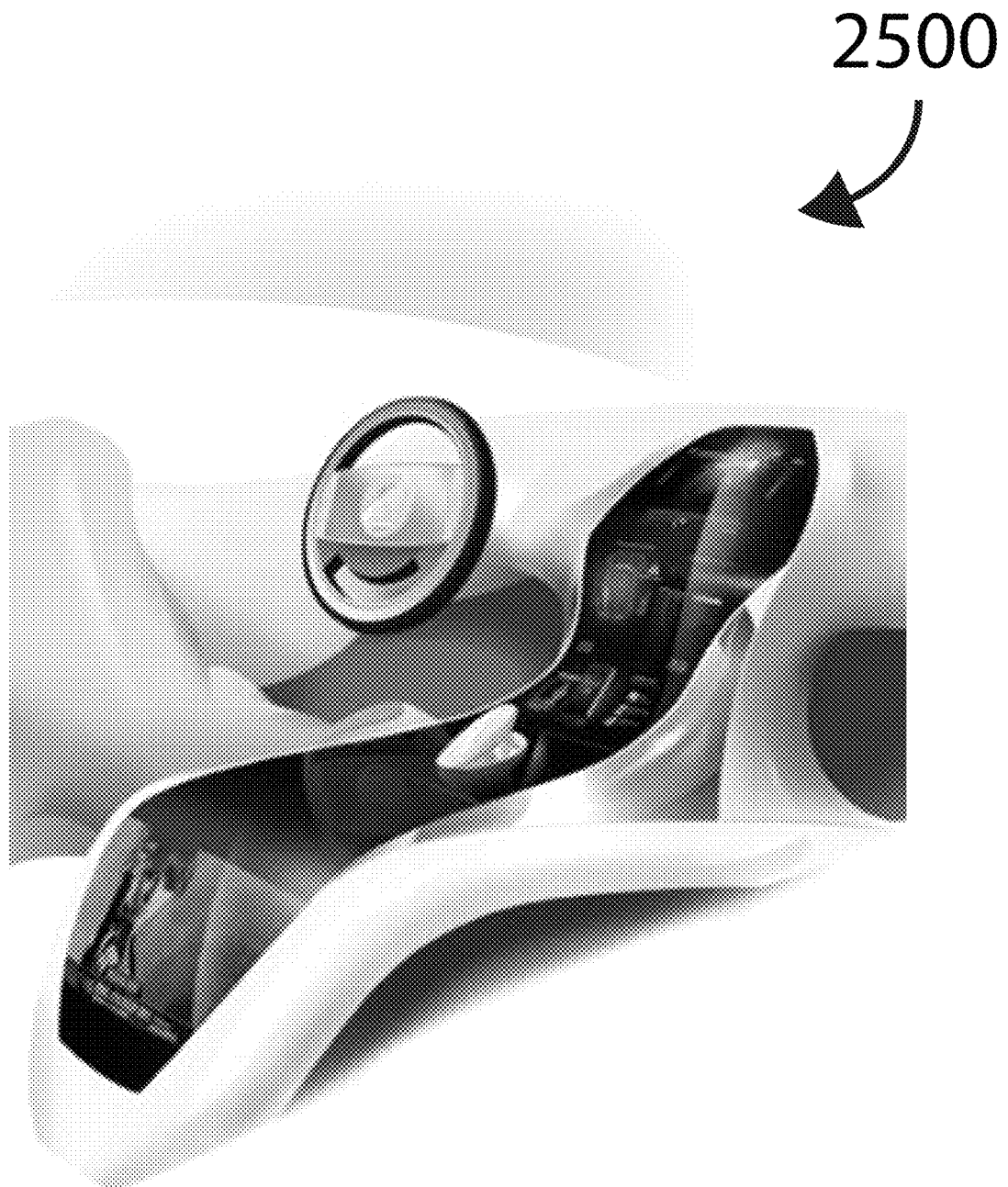
FIG. 25 depicts an exemplary vehicular interior in accordance with the present invention.

Panels, such as panels 1000, 1100 & 1200, may also be used to build walls in transportation applications including vehicles and cargo containers. FIG. 25 depicts exemplary vehicular interior applications such as consoles, door cards, and dashboards. Natural fiber composite panels have 4× the stiffness to weight ratio of steel. This allows for lighter weight vehicles and a reduction of fuel consumption. Applications include recreational vehicles comprising the walls on the side as well as roof as well as the door and window frames. Similar panels can be used on boats for the exterior structure and/or to produce interior parts. Similar panels can be used on trains for the exterior structure and/or to produce interior parts. Similar panels can be used on aircraft for the exterior structure and/or to produce interior parts. Similar panels can be used on cars for exterior structure and/or for interior parts. Similar panels can be used on trucks for the exterior structure of the truck itself and/or the trailer. Similar panels can be used to produce interior parts for cars and trucks. These panels may be molded or formed into curved and varied three-dimensional shapes to achieve design specifications.

In an exemplary sound-damping embodiment, the plastic foam core may be elastomeric in nature and made of natural and/or synthetic rubbers. Panels made with this material can dampen various frequencies to enhance interior acoustics. These panels can help diminish certain frequencies. Natural fiber composite sandwich panels made with rubberized cores have the advantage of being lighter weight than similar parts made of fiberglass. The lower density of the Ekoa material dampens high frequencies compared with fiberglass and various metals. The strength to weight ratio is generally higher than equivalent aluminum skinned panels.

Figure 29C:
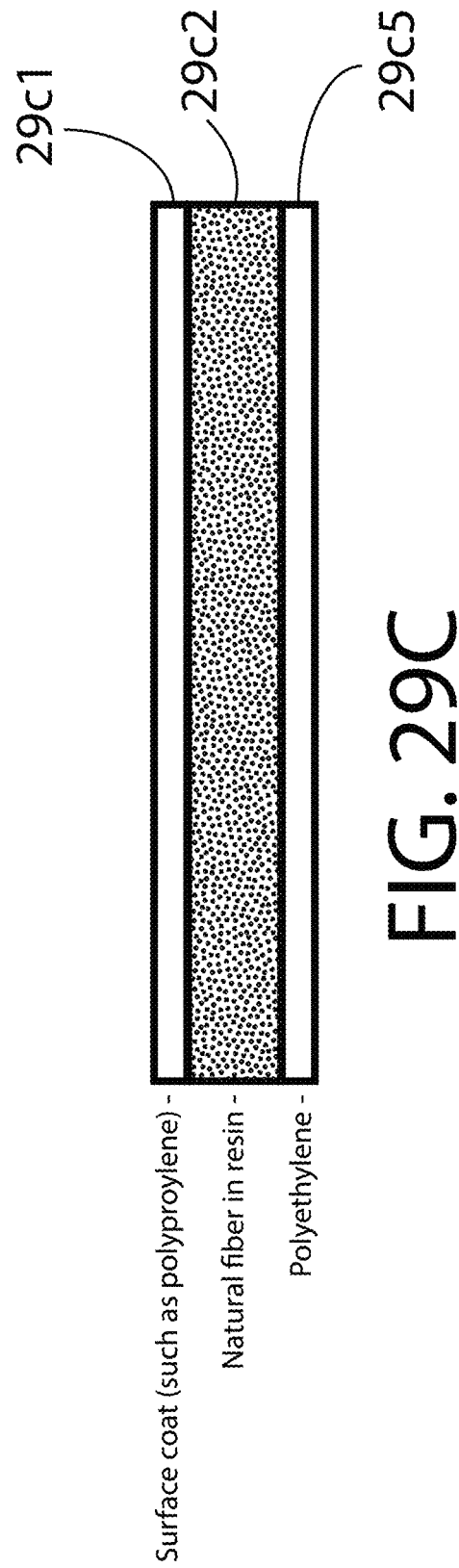
Figure 29D:
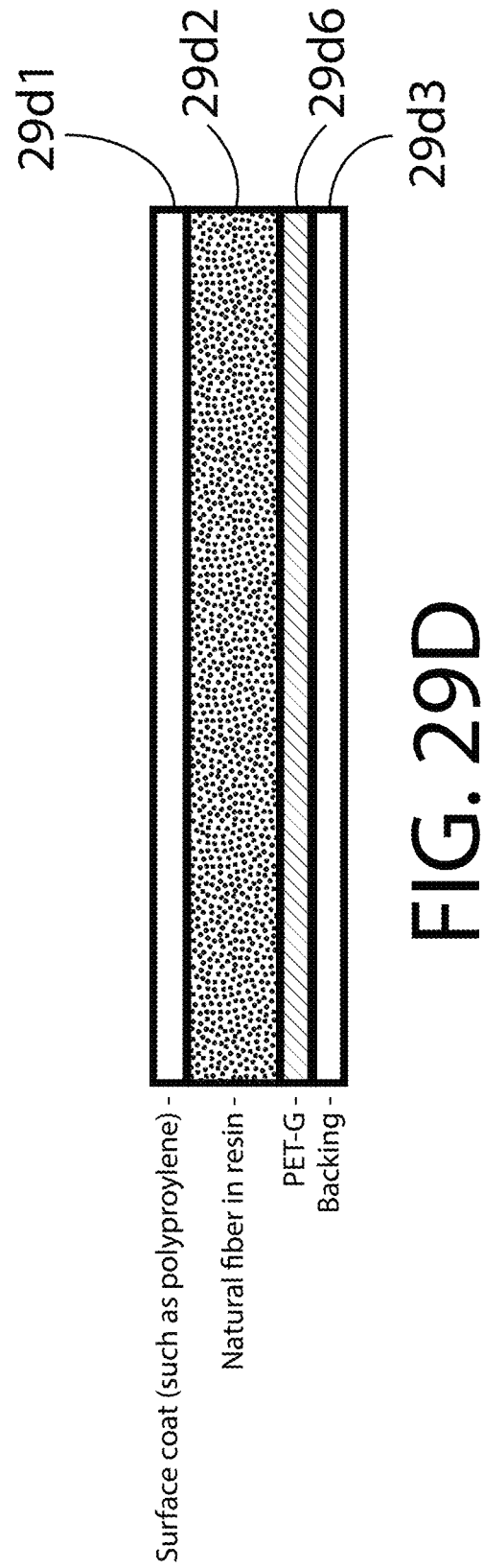
Figure 29E:
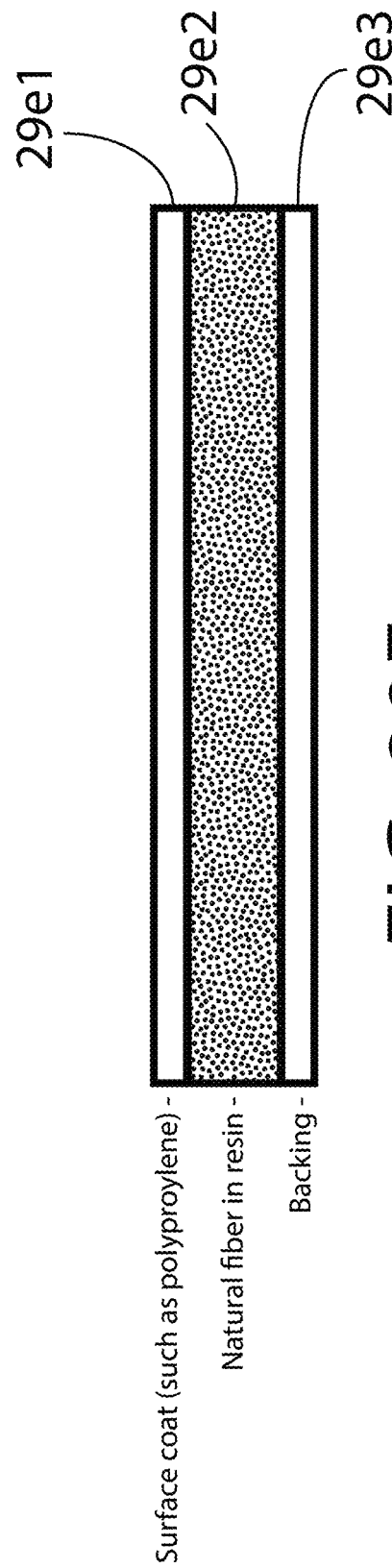
Figure 29F:
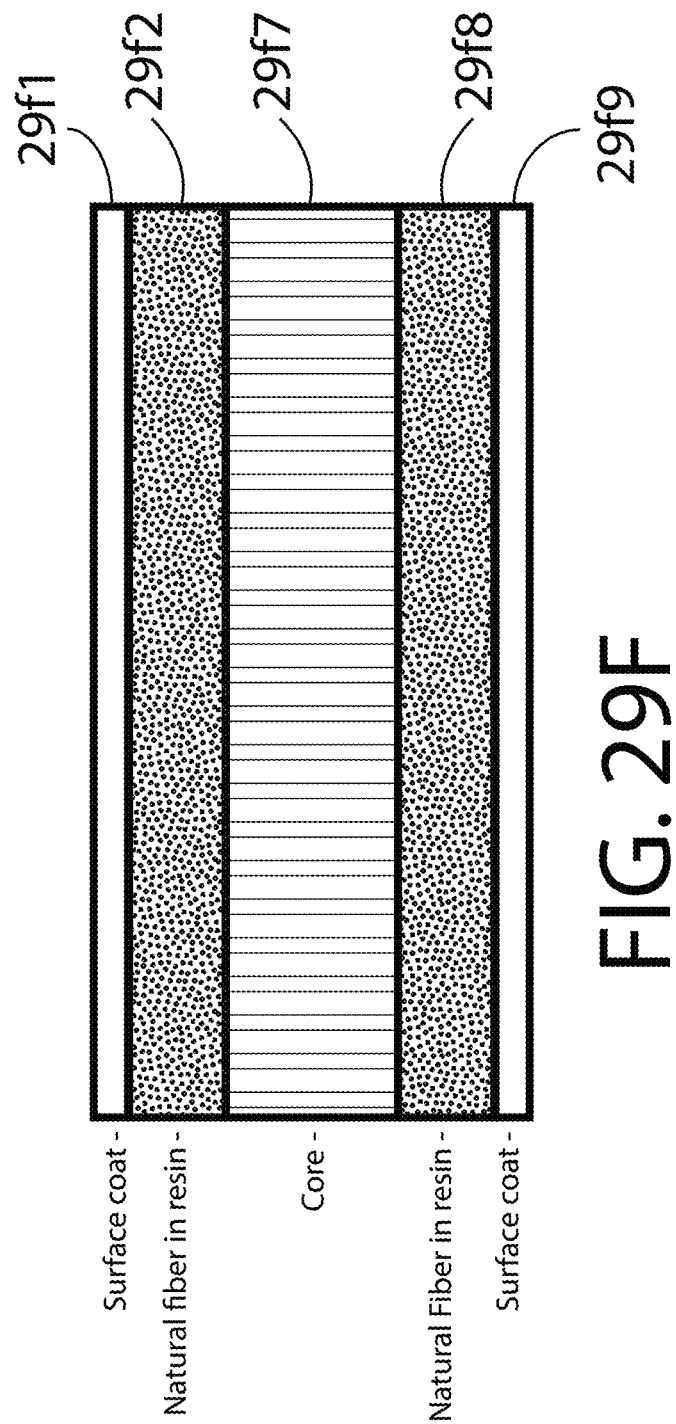
Figure 29G:
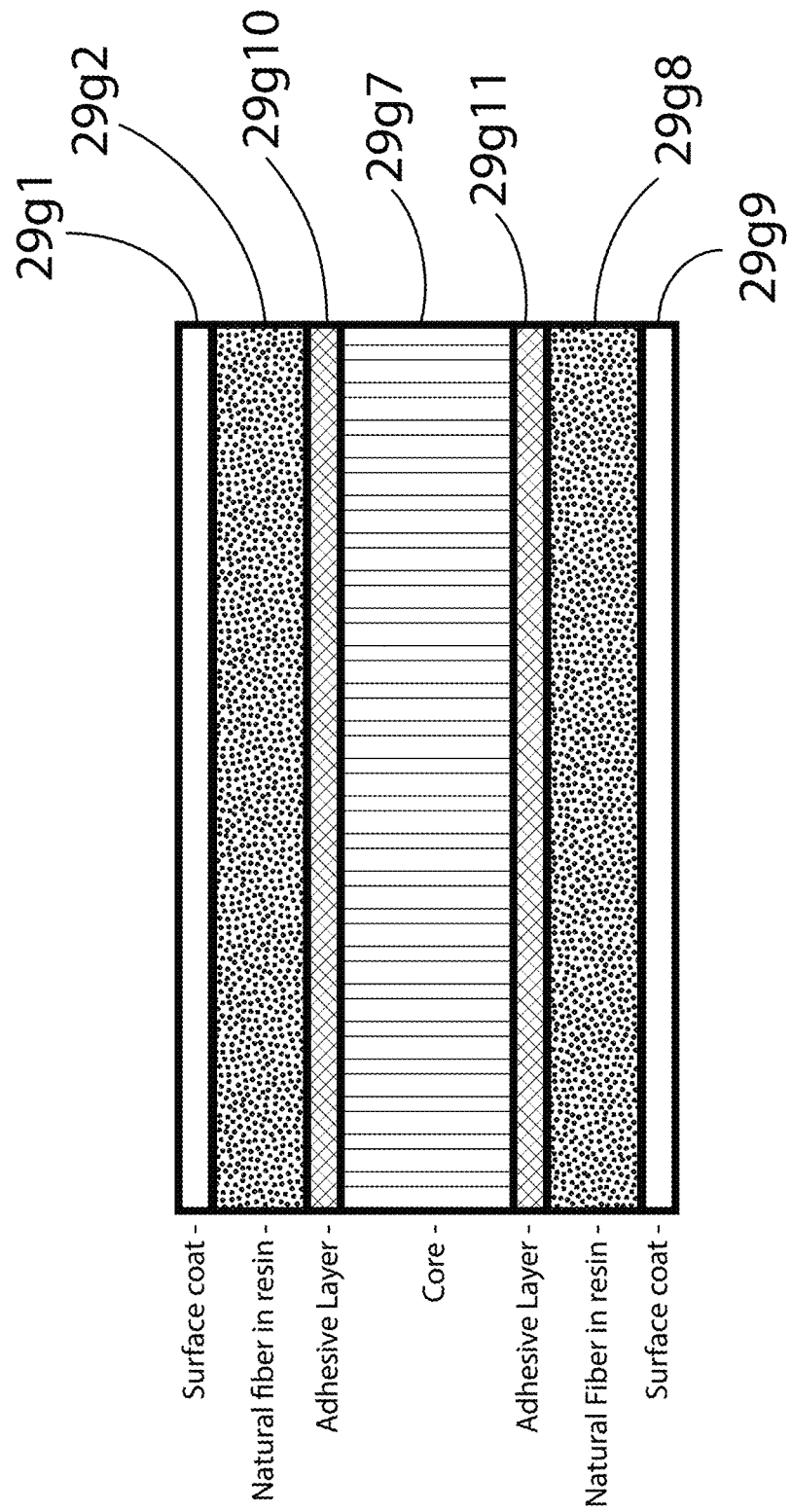
Figure 29H:
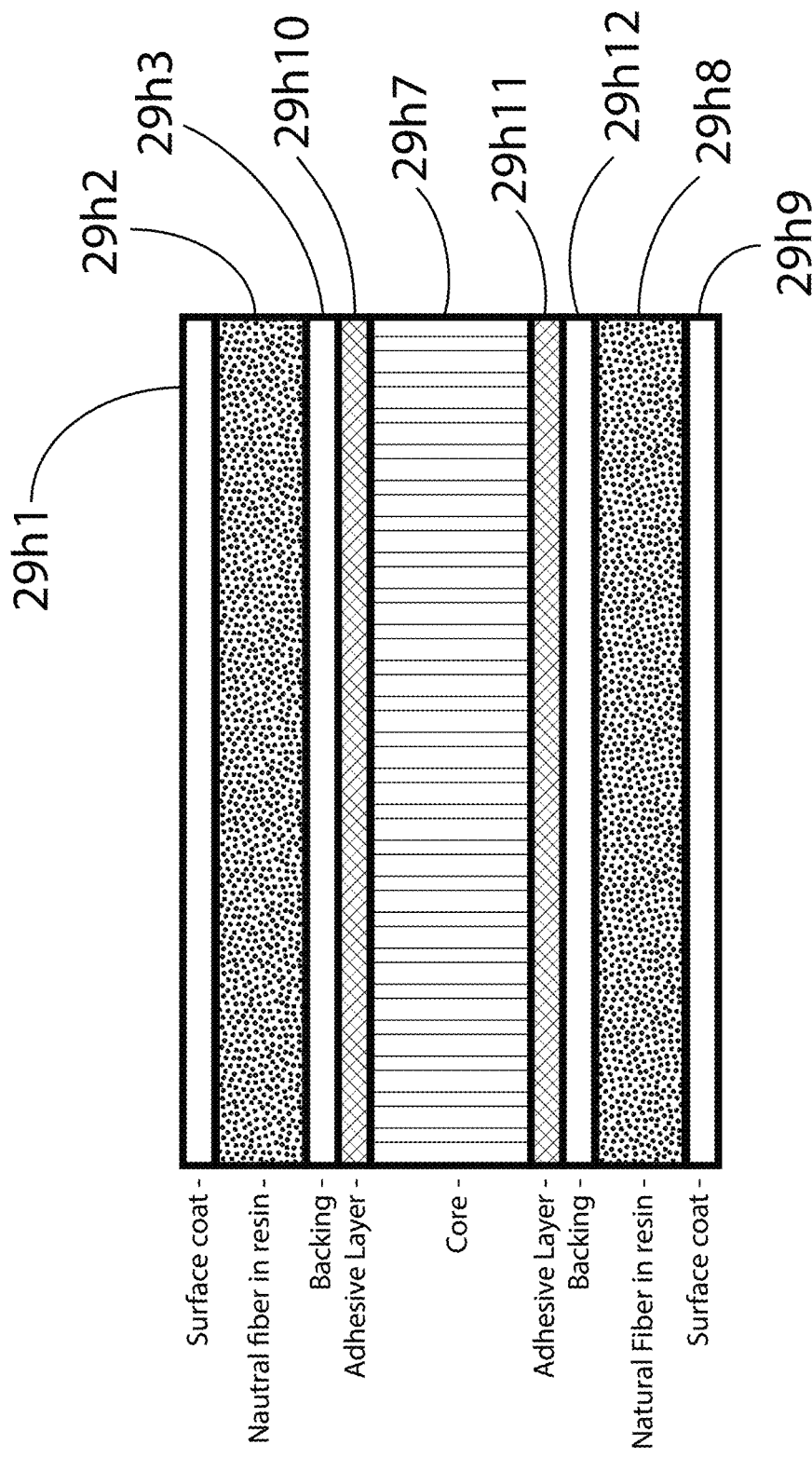
Figure 29J:
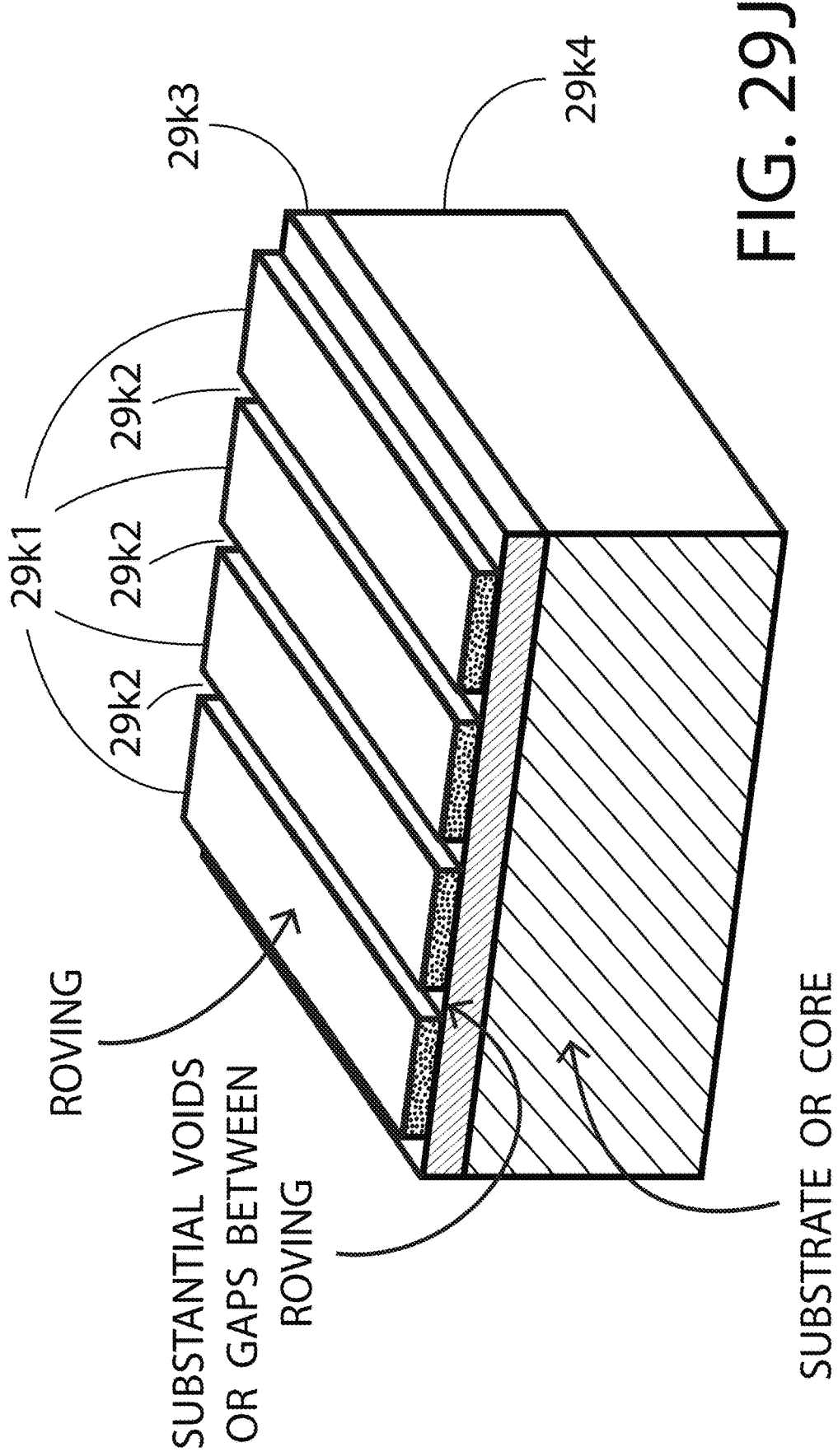
FIG. 29J is a perspective view of the embodiment of FIG. 29K.
Figure 29K:
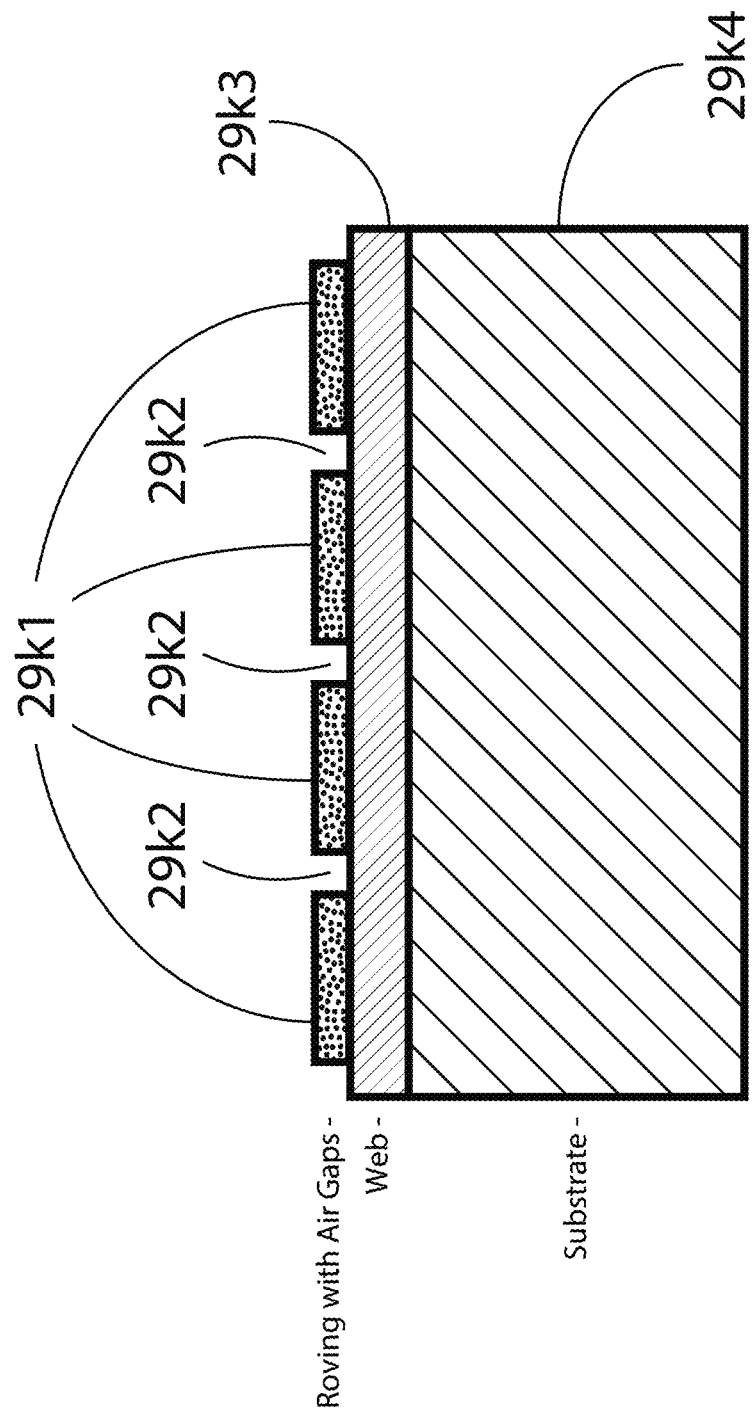
Figure 29M:
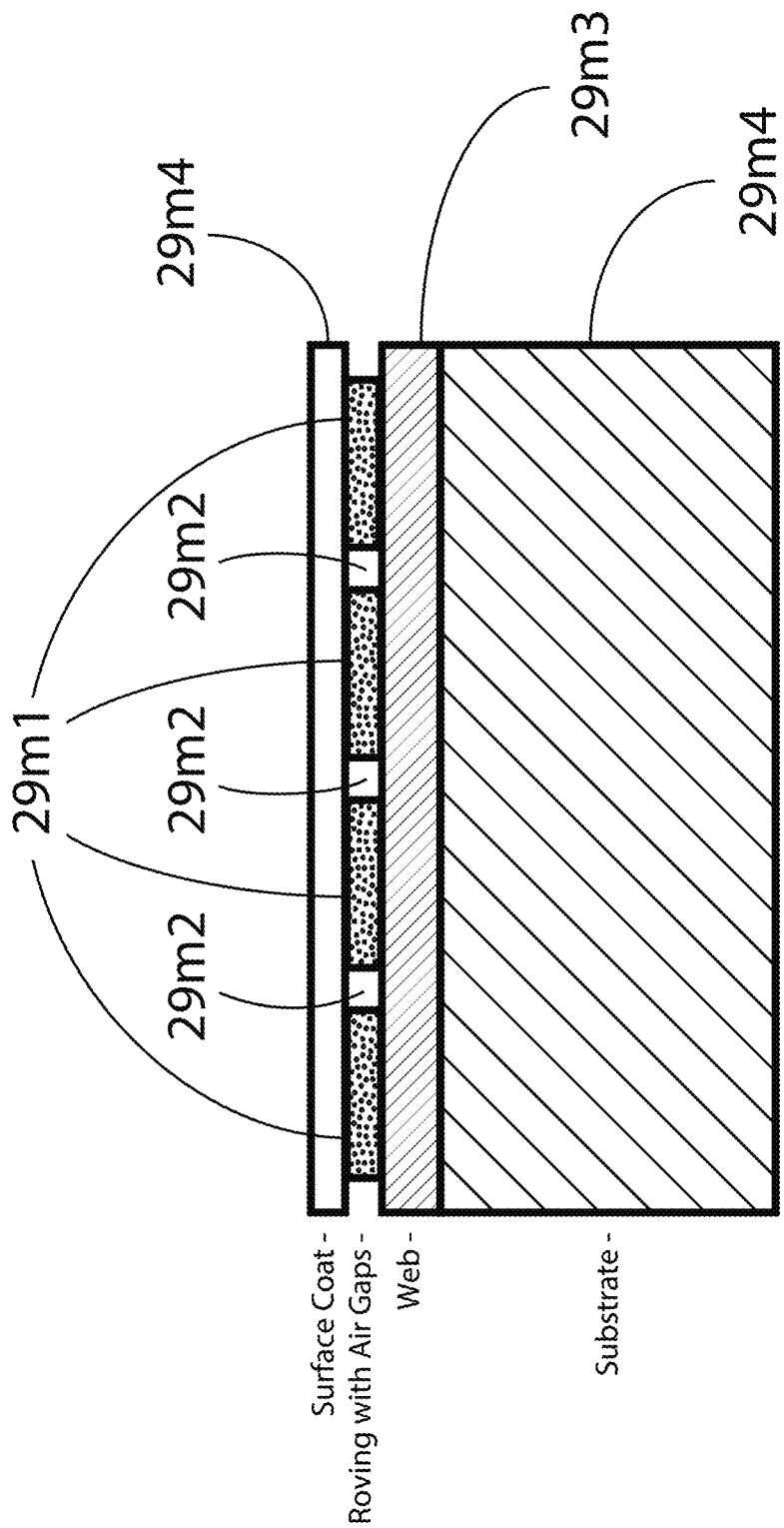
FIGS. 29M, 29P and 29R are cross-sectional views illustrating additional exemplary embodiments of aesthetically-enhanced structures in accordance with the present invention.

Exemplary acoustic panel, as depicted in FIGS. 29J and 29K, includes natural fiber composites may require the surface to allow sound frequencies to pass through the skin in part to the substrate allowing for vibration damping. With current acoustic panels, such as those made with aluminum skins, the skin is substantially perforated to allow the sound waves to pass. Similarly, natural fiber composites are able to be perforated via punching, milling, and laser cutting. In addition, because natural fiber composites are produced in an additive process where rovings $29k2$ may be aligned to each other and bonded via thermoplastic web $29k3$ and introduce voids/gaps $29k2$ between fibrous rovings $29k1$. In this way, there are gaps $29k2$ between the rovings $29k1$ that allows the transmission of sound waves to the subsequent sound absorbing substrates such as mineral wool, fiberglass, polyester, recycled resin, and similar mat board. For instance, each roving, or group of natural fibers, may be spaced between every 0.1 mm-10 mm. with each roving measuring 1-20 mm wide. There are alternative methods to introduce gaps between the rovings such as weaving, stitching, and/or another additive manufacturing process. The rovings may also be bonded to core or substrate $29k4$. The sound damping board may also be made of natural materials such as natural fibers, cork, cellulose or bark. The board can be 5 mm-50 mm thick. See variant of acoustic panel with surface coat in FIG. 29M. The surface coat $29m4$ may be contiguous as shown or coating only the rovings $29m1$ and not the air gaps $29m2$. The roving can be raw natural fiber or substantially co-mingled with thermoplastic resin fibers in the production of the roving itself or subsequent additive manufacturing operation. FIG. 29R teaches of rovings $29r1$ with natural fibers only or co-mingled with thermoplastic resin fibers that are layered on top of each other in subsequent layers. These stacked layers may be substantially aligned in one direction or perpendicular to each other in a so-called 0 degree and opposing 90 degree orientations. They may also be oriented in opposing +45 degree and −45 degree orientations or similarly in a +30 degree and −30 degree orientations or some combination thereof.

Figure 26:
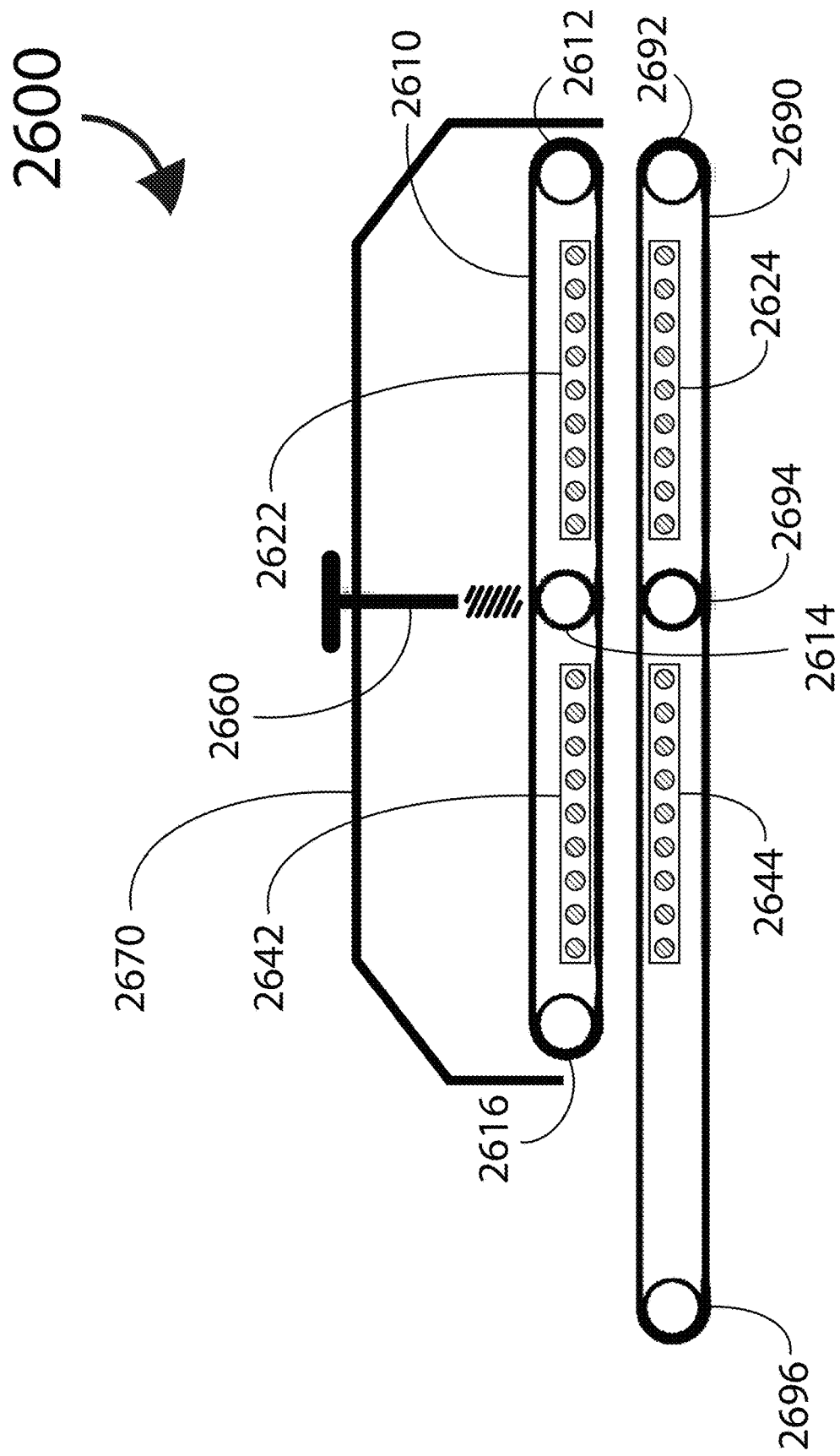
FIGS. 26, 27A-27D and 28A-28B illustrate exemplary processes for manufacturing various embodiments of aesthetically-enhanced structures in accordance with the present invention.
Figure 27A:
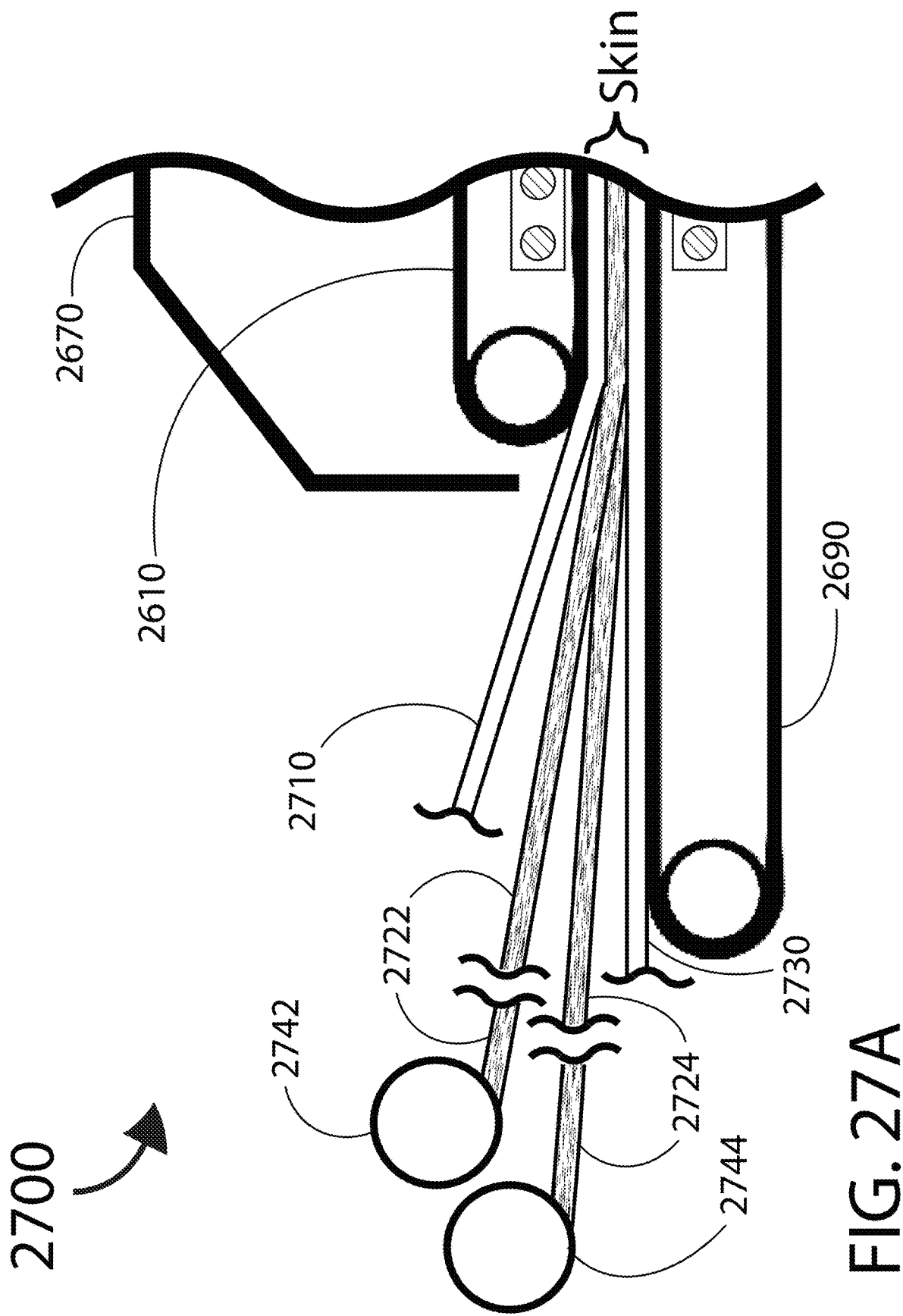
Figure 27B:
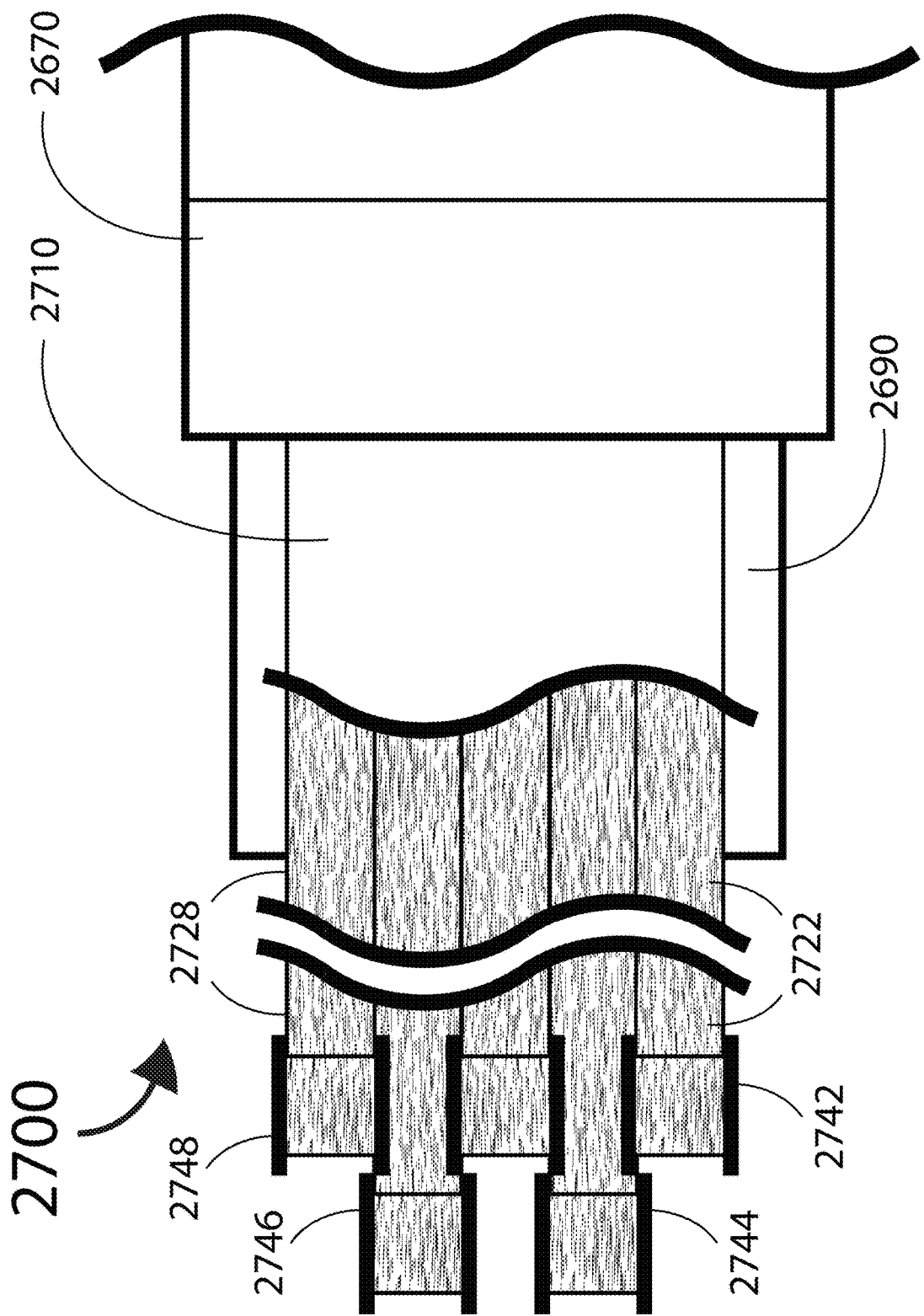
Figure 27C:
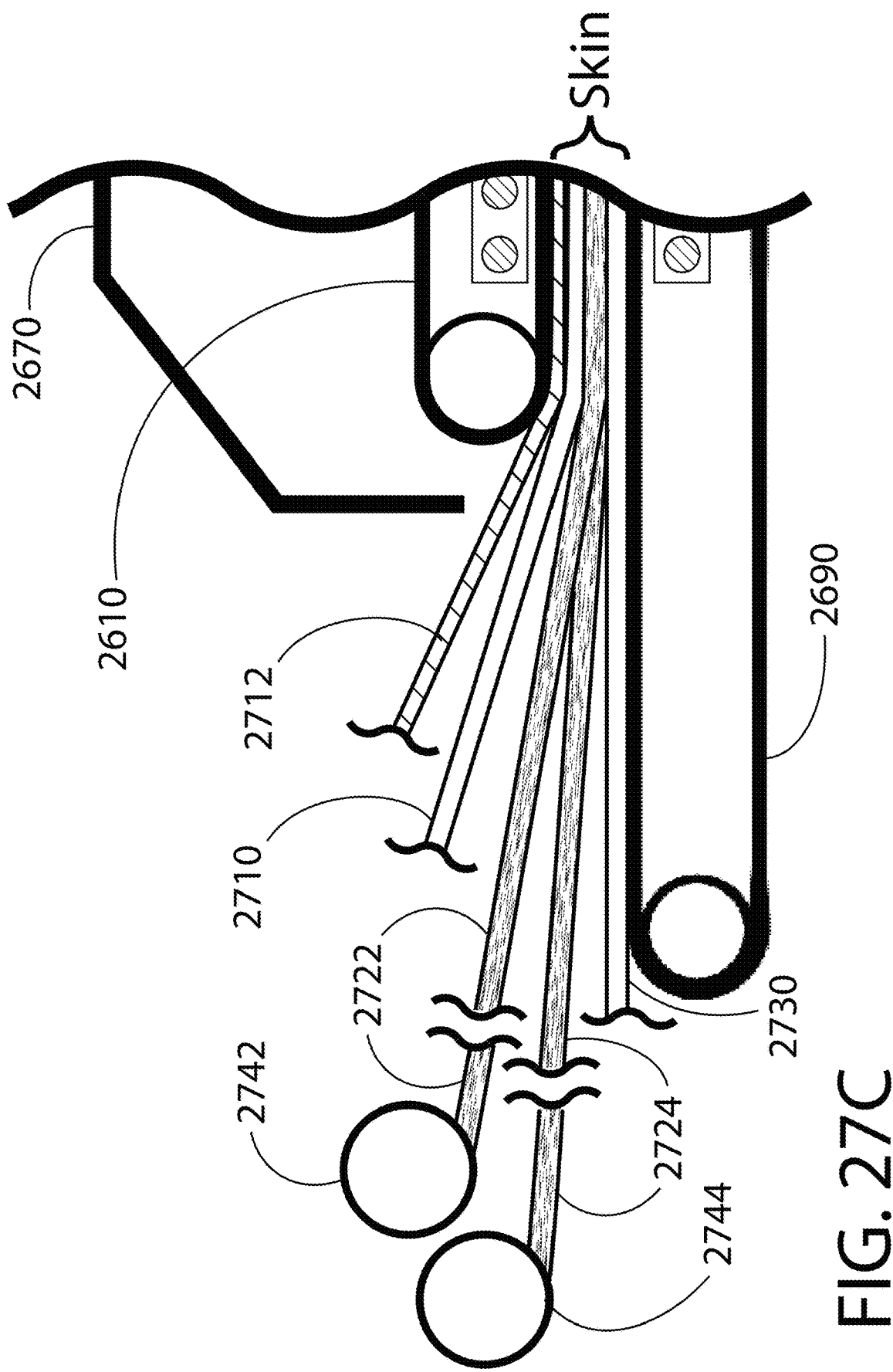
Figure 27D:
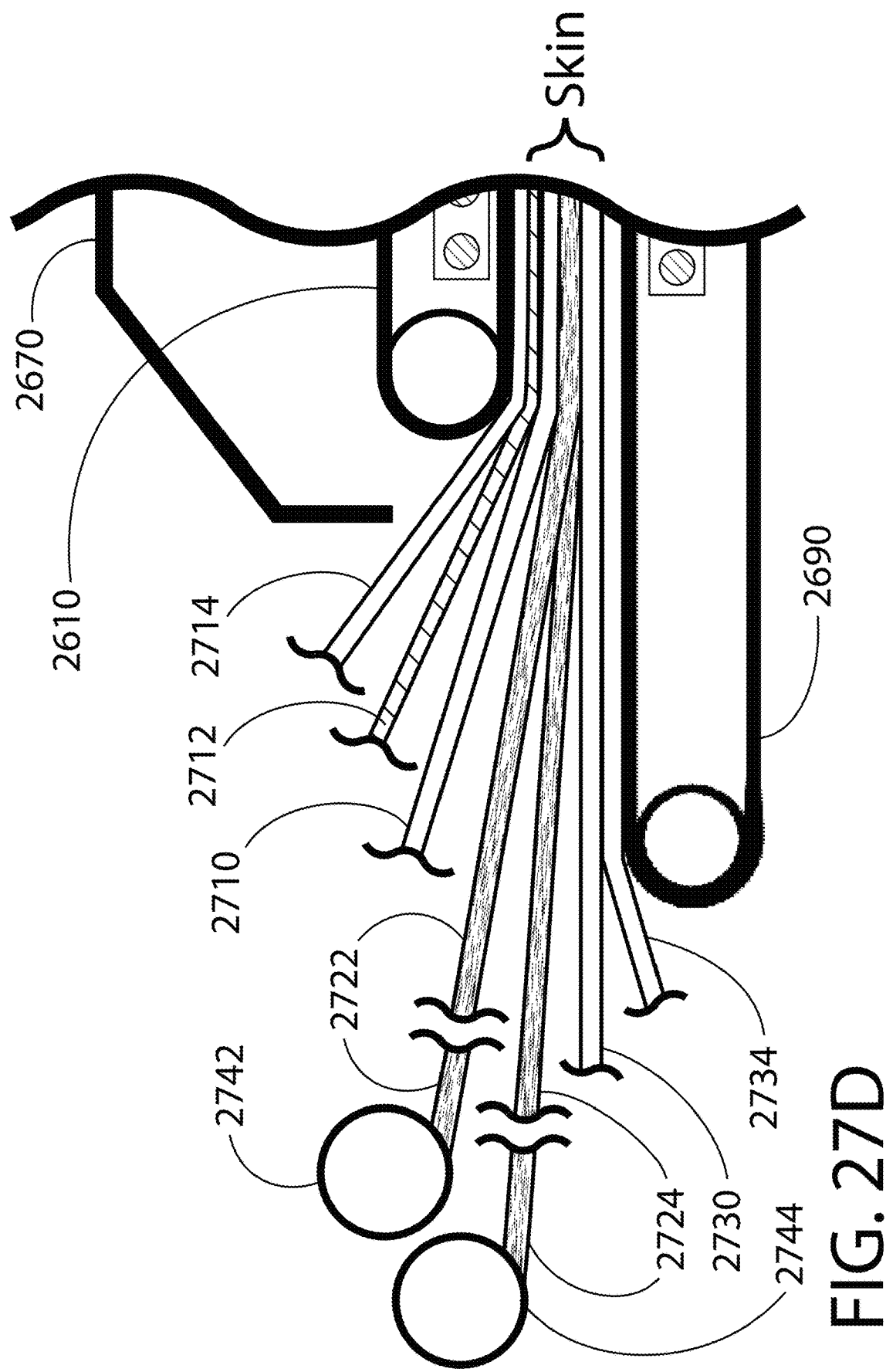

The manufacturing processes to produce the skins include vacuum forming, static press, continuous pressing via a double belt press, pultrusion, roll to roll laminator or similar manufacturing process. One exemplary efficient manufacturing process is continuous pressing of some kind. One example as shown in FIG. 26 is double belt press 2600 which allows materials on rolls of natural fiber in so-called tape form and resin to run continuously under pressure, heating 2642 and 2644 and/or cooling 2622 and 2624 processes to consolidate materials into a skin. As shown in FIGS. 27A-27D & 28A-28B, depicting feeding stage of double belt press 2600, the natural fiber may also be introduced in bundles of fibers known as rovings 2722, 2724, . . . 2728 as they unspool from respective bobbins 2742, 2744, . . . 2748. There are existing machines which can spread the fibers. FIG. 27B show a top layer of added melted thermoplastic resin 2710 in a heated and pressurized process that is then cooled via coolers 2622 and 2624, exits the line and is formed as a roll or flat laminate. The speed through the line and temperature of the heaters determines to amount of heat applied to soften, melt and/or further drop the viscosity of the resin. Resin viscosity generally lowers as the heat applied increases. Temperature ranges from 90 C to 260 C for 0.2-20 mm. Pressures can range from 5 psi-500 psi depending on the material inputs and process requirements.

Figure 28A:
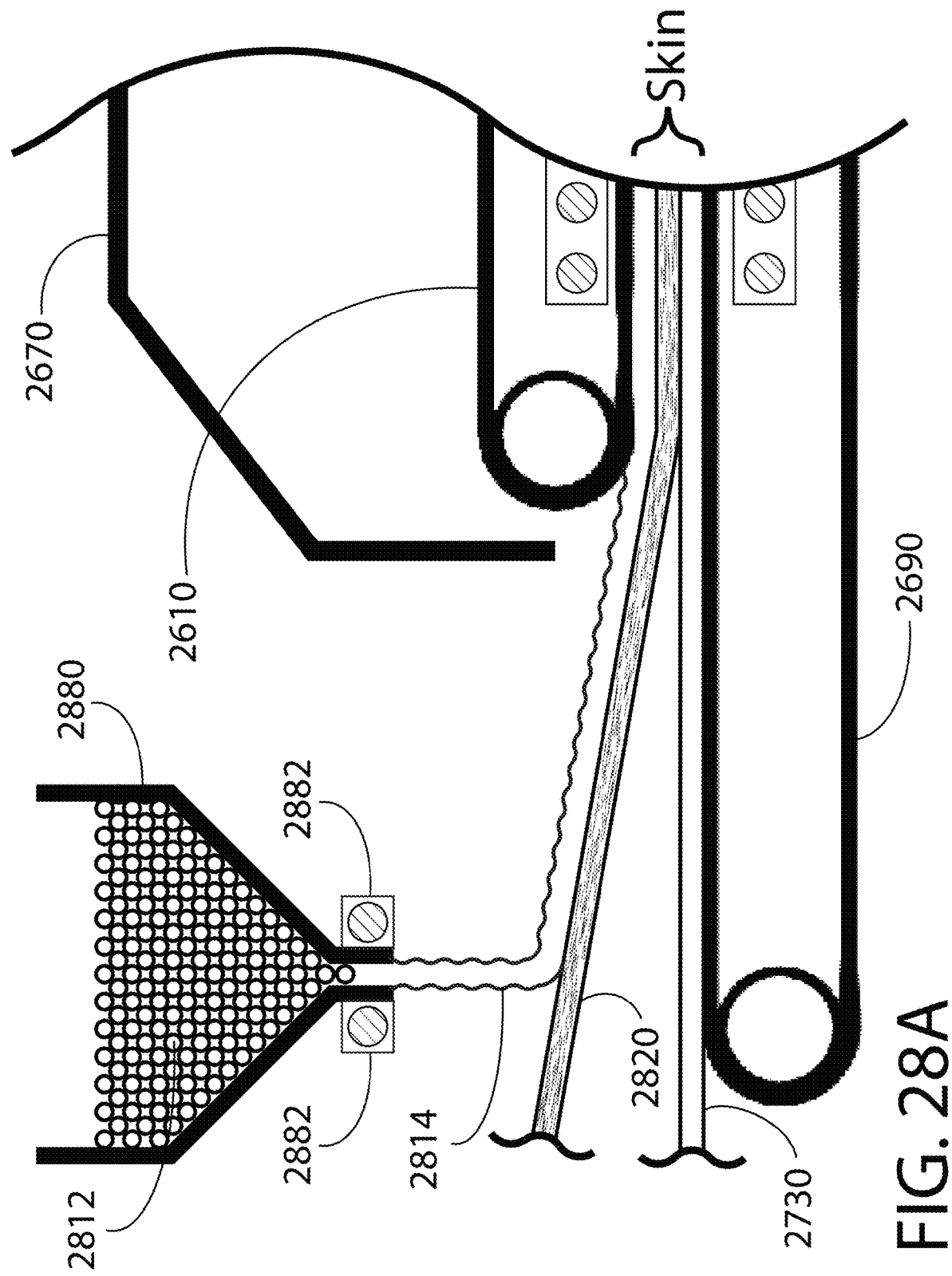
Figure 28B:
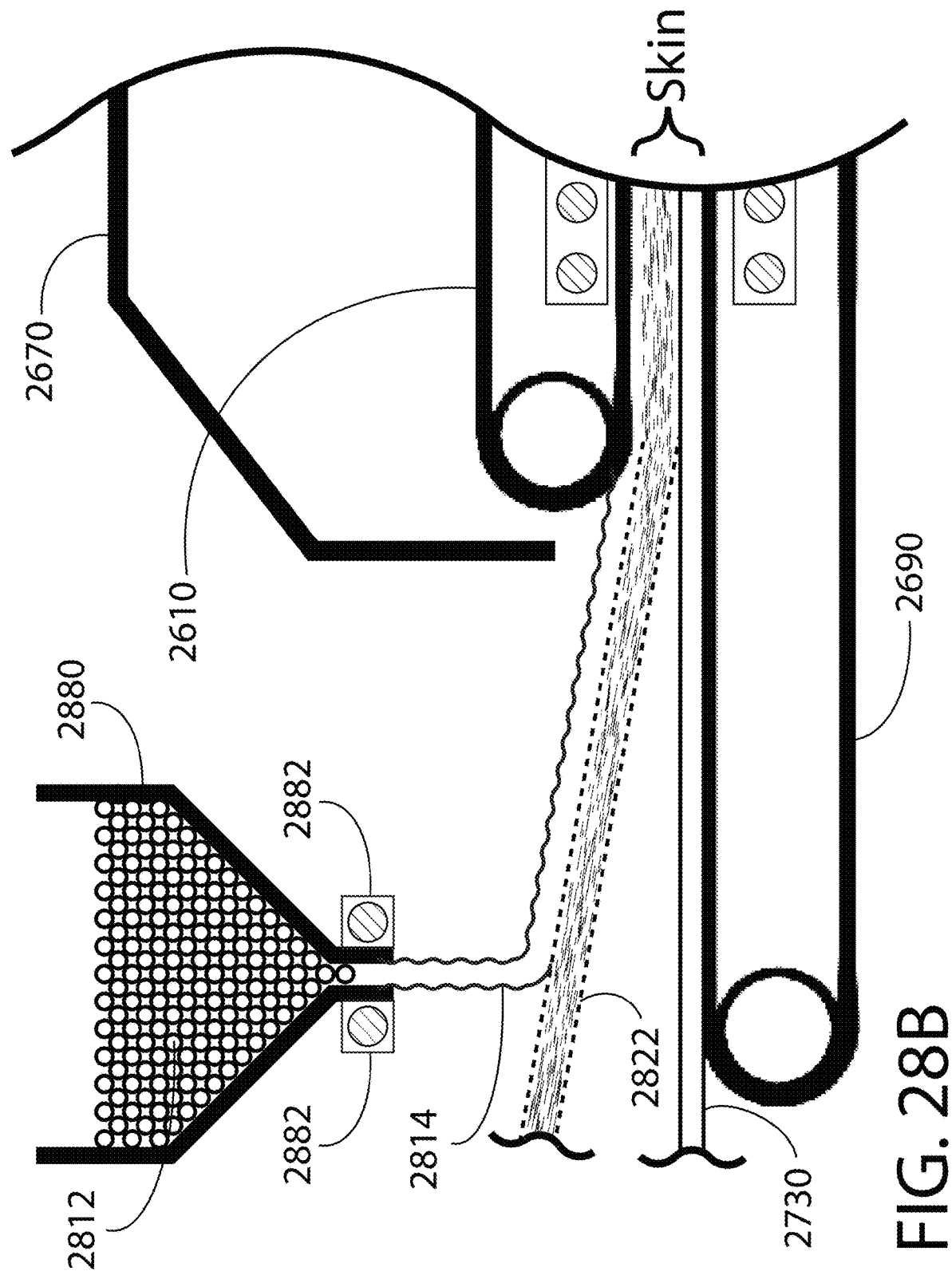
Figure 29P:
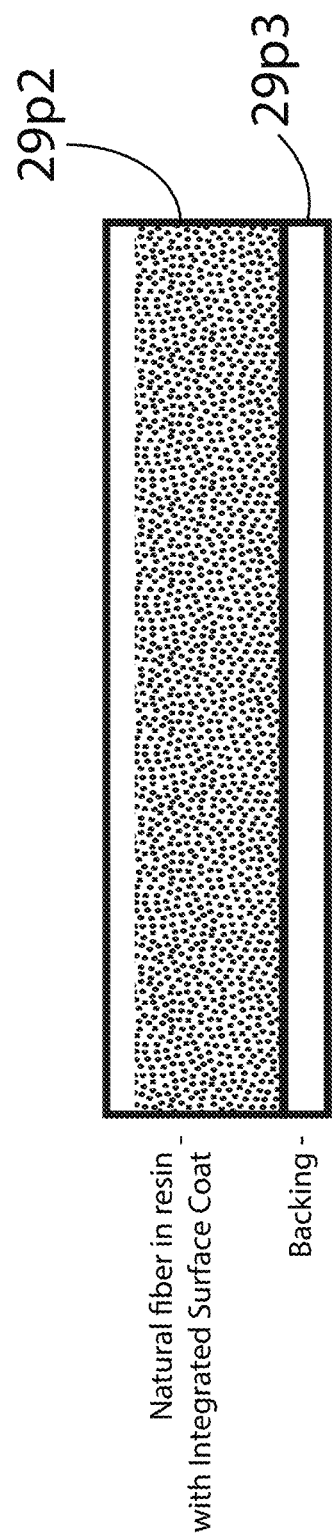
Figure 29R:
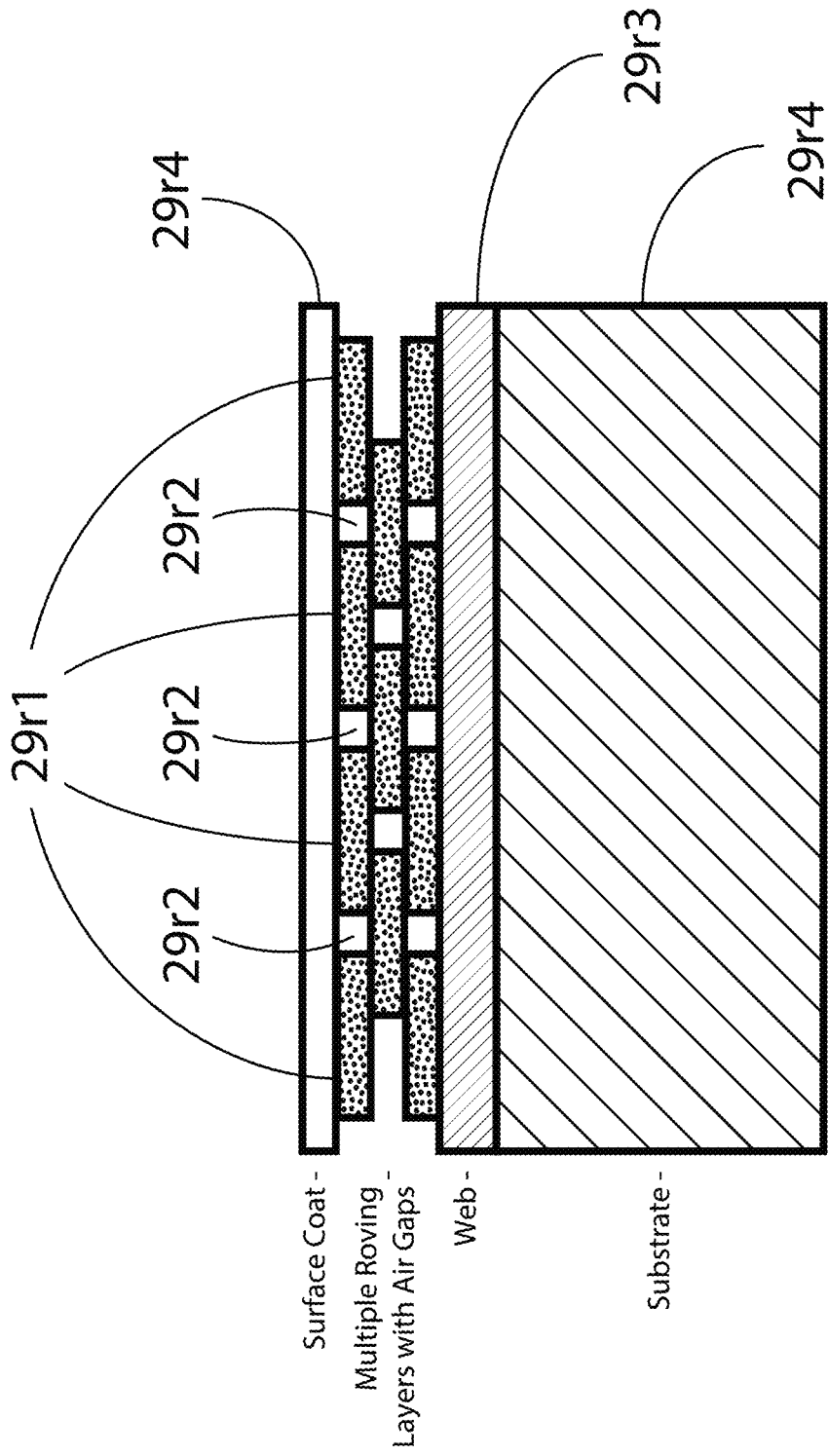

As shown in the embodiment of FIG. 29P, a 0.5 mm natural fiber composite skin comprises of two layers $29p2$ and $29p3$, i.e., a natural fiber layer integrated with a suitable resin such as thermoplastic $29p2$, e.g., PLA integrated with flax fiber, on top of a nonwoven backing $29p3$. To produce this embodiment with press 2600, the temperature of the heating elements 2642 and 2644 is 180 C with a belt 2690 feed rate of 1-15/m per min. The heating element 2642 and 2644 is 1-3 meter length. Cooling elements, 2622 and 2624 are 1-2 meter length and rapidly cool down the thermoplastic to avoid imperfections. This same embodiment may be produced with rollstock inputs such as tapes 2820 as shown in FIGS. 28A-28B or bobbins 2742, 2744, . . . 2746, 2748 of natural fibers as shown in FIG. 27A-27D, or as pellets 2812 (see FIG. 28A-28B) or rolls of resin film 2710, and rolls of backing paper 2730. A substantially three-dimensionally textured release film 2714, 2734 may be used to impart a textured finish on the skin while allowing the belts of the press to remain clean. Once consolidated via double belt press 2600, the resulting skin may take the form of rolls or flat laminate.

Skins may be reintroduced back into the manufacturing process after the fiber and resin consolidation and a core added using the resin in the skins themselves to bond the parts or a separate adhesive.

FIG. 29A structural skin. Top layer $29a1$ is a surface coat, followed by $29a2$ natural fiber in resin, e.g. thermoplastic and finally backing $29a3$. The total composite skin ranges from 0.5 mm to 5 mm thickness wherein the resins are substantially transparent, fibers translucent and so different color finishes can be achieved via usage of different backings, e.g. backing $29a3$. If the backing is lighter in color the skin top surface is accordingly lighter in color. The backing, being on the bottom layer below the encapsulated fiber, further enhances aesthetics due to the three dimensionality of this design.

FIG. 29B shows a cross section of a skin wherein there is a surface coat $29b1$ with a thermoplastic or a surface coat with a higher melt point than the thermoplastic with natural fiber layer $29b2$ and an adhesive layer $29b4$ to help enhance adhesion to backing $29b3$.

After the initial skin in FIG. 29A is produced as a roll or plate, it can be reintroduced into the manufacturing line with a core $29f7$ and an additional skin added on the bottom side in a single or secondary process.

Given that aesthetics are an important part of the skin, a final finish is possible via a release paper which adds a specific texture imprinted onto the resin surface via heat and pressure. This texture can also be added via a texture roller and as shown in any of FIGS. 27A-27D and 28A-28B.

FIG. 29C shows, the skin natural fiber composite is made of two types of polyolefin resin: polyethylene $29c2$ and polypropylene $29c1$ which can be difficult to adhere to one another. The surface coat $29c1$ or show surface is made of 50-200 gsm of polyolefin resin such as polyethylene or polypropylene. The natural fiber also 50-200 gsm is in the core adding rigidity and providing a barrier and bonding surface to the substantially polypropylene side $29c1$ to the substantially polyethylene side $29c5$. In this embodiment, the top surface coat is made of 30-200 gsm of polyolefin resin such as polypropylene. The core is made in this case of unidirectional natural fibers $29c2$ with the polypropylene substantially on one side and polyethylene on the other. Polypropylene used as a surface layer $29c1$ serves to resist marking and attack from cleaning agents from solvents such as acetone as well as cleaners such as sodium hypochlorite which is commonly known as bleach.

In FIG. 29D, the top skin surface 29d1 is made of 30-200 gsm of a resin such as polypropylene. The next layer is Polyethylene with fiber 29d2 as a core followed by PET-G 29d6 and subsequently a backing 29d3.

In FIG. 29E, the top surface coat 29e1 is made of 30-200 gsm of a resin such as polypropylene. The next layer is resin with natural fiber 29e2 as a core followed by a backing 29e3.

In FIG. 29F, the top surface coast 29f1 is made of 30-200 gsm of resin. The next layer is resin with natural fiber 29f2, followed by a thicknessing core layer 29f7. Mirrored on the other side are a natural fiber with resin layer 29f8 and a final bottom surface coat 29f9.

In FIG. 29G, the top surface coat 29g1 is made of 30-200 gsm of resin. The next layer is resin with natural fiber 29g2, followed by an adhesive layer 29g10 that helps bond to a thicknessing core layer 29g7. Mirrored on the other side are an adhesive layer 29g11, natural fiber with resin layer 29g8 and a final bottom surface coat 29g9.

In FIG. 29H, the top surface coat 29h1 is made of 30-200 gsm of resin. The next layer is resin with natural fiber 29h2, followed by a backing layer 29h3, and an adhesive layer 29h10 that helps bond to a thicknessing core layer 29h7. Mirrored on the other side are an adhesive layer 29h11, a backing layer 29h12, a natural fiber with resin layer 29h8 and a final bottom surface coat 29h9.

FIG. 31 shows sandwich panel 3100 with conventional top skin 3111 and bottom skin 3113 wherein batteries 3120 such as lithium ion used in transportation and consumer electronics applications, are embedded in core 3112.

Figure 32A:
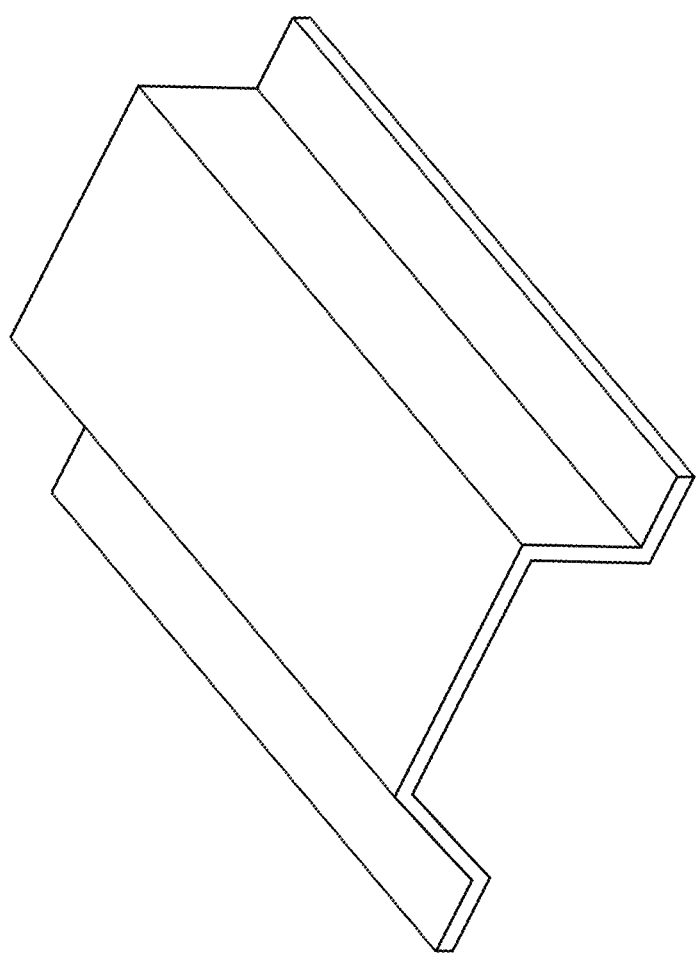
FIGS. 32A and 32B are perspective views depicting examples of three-dimensional reshaped aesthetically-enhanced structures in accordance with the present invention.
Figure 32B:
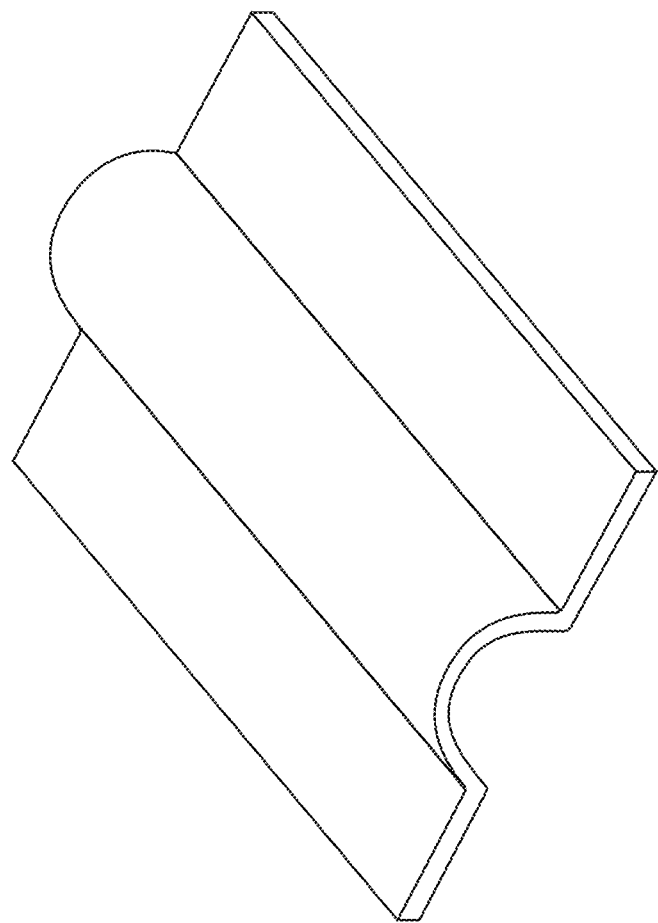
Figure 33B:
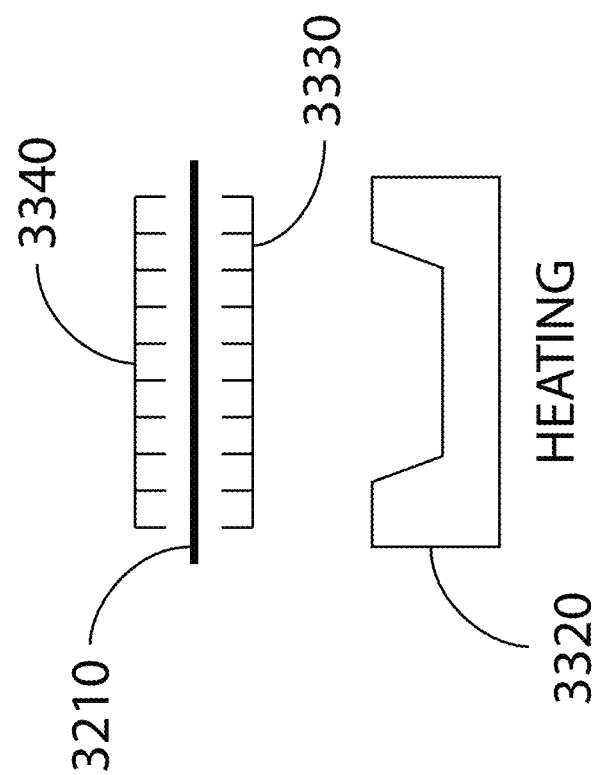
Figure 33A:
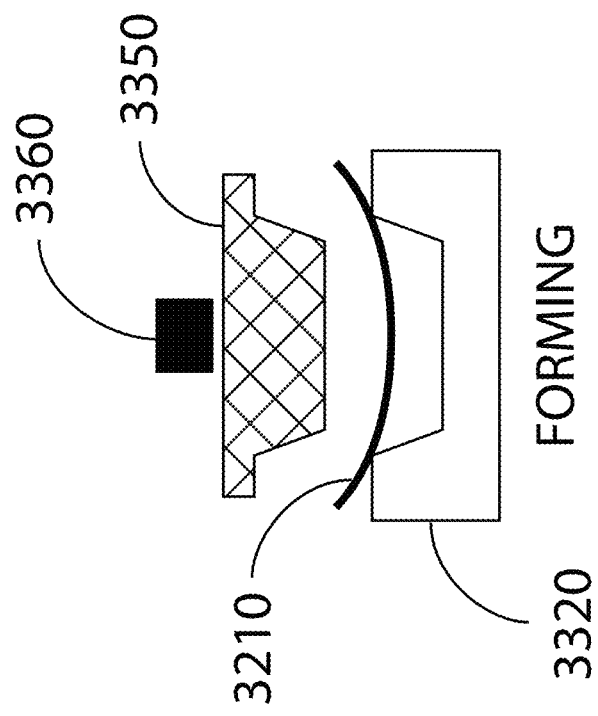

For some applications, the skin can be further molded by a compression process of FIG. 33A-33D into three-dimensional parts of FIGS. 32A and 32B, such as for automotive decorative interior parts. In this embodiment a non-woven material ranging in weight from 50 gsm-300 gsm such available in fiberglass or natural fibers, is the core material to keep substantially unidirectional fibers from splitting apart when molding. FIG. 33A shows the pre-heating of skin 3210 between heating elements 3330 and 3340 and/or in mold or machine heating 3320. FIG. 33B shows skin 3210 being pressed into shape with press 3360. FIG. 33C shows skin 3210 formed in molds 3350 and 3320 under compressive force of a press 3360. FIG. 33D shows demolding of the now three-dimensional skin 3210 from mold 3320.

As shown in FIG. 28A-28B, the hopper 2880 is filled with resin in very small granular form known to those familiar in the art as powder, then is melted and finally added to the fiber.

To make panels that are stiff in more than one direction, what is called a balanced or isotropic layup, in layers with fibers in opposing directions. One typical orientation is two layers in a 0 degree and 90 degree orientation. For ease of manufacture these 0 and 90 degree oriented unidirectional fibers may be pre-stitched before being impregnated with resin. This is commonly called bi-axial or double bias fabrics. These layers may also be three layered unidirectional stitched fabrics with +45 degrees and −45 degrees and another layer in an appointing direction such as 90 degrees or 0 degrees.

Many permutations of the described embodiments are contemplated within the scope of the present invention, as exemplified below:

(a) Two or more layers of unidirectional natural fiber at 50-300 grams per square meter each arranged perpendicularly to each other, with a foam core such as a Polyethylene terephthalate (PET) foam core.

(b) Two or more layers of unidirectional natural fiber at 50-300 grams per square meter each arranged perpendicularly to each other, in combination with an acrylic (PMMA) foam core such as Rohacell IG 50-200 gcm3 made by Evonik, Inc.

(c) Two or more layers of unidirectional natural fiber at 50-300 grams per square meter each arranged perpendicularly to each other, in combination with a foam core such as a Polyethylene terephthalate (PET) foam core, e.g., the recycled PET foam core made by Armacell of Chapel Hill, N.C.

(d) Two or more layers of unidirectional natural fiber at 50-300 grams per square meter each arranged perpendicularly to each other, with an acrylic (PMMA) foam core.

(e) One or more layers of natural fiber in various orientations relative to the panel, and a urethane foam core.

(f) One or more layers of natural fiber in various orientations relative to the panel, and a non-woven natural fiber core.

(g) One or more layers of natural fiber in various orientations relative to the panel, and a non-woven fiberglass core.

(h) One or more layers of natural fiber in various orientations relative to the panel, and a non-woven carbon fiber core.

(i) One or more 100-1500 grams per square meter (gsm) of fiber, with 100-3000 gsm of a resin, and a resin foam core having a thickness range 1 mm-500 mm.

(j) One or more 100-1500 grams per square meter (gsm) of fiber, with 100-3000 gsm of resin on the top and bottom faces; the non-woven natural fiber core is in the middle having a thickness range 1 mm-200 mm.

(k) One or more 100-1500 grams per square meter (gsm) of fiber, with 100-3000 gsm of resin on the top and bottom faces; the non-woven synthetic fiber core is in the middle with a thickness range 1 mm-200 mm.

(L) One or more 100-1500 grams per square meter (gsm) of fiber, with 100-3000 gsm of resin on the top and bottom faces; the wood-based fiberboard is in the middle with a thickness range 1 mm-200 mm. Various fiberboard densities are including low density fiberboard (LDF).

(M) One or more 100-1500 grams per square meter (gsm) of fiber, with 100-3000 gsm of resin on the top and bottom faces; the wood-based particle board is in the middle with a thickness range 1 mm-200 mm.

Referring also to FIG. 10, panel 1000 can be produced with different fiber orientations to the unidirectional natural fiber skins. They may all be oriented in the zero degree direction with the fibers aligned with the long side of a panel. Another layer runs perpendicular to the zero degree layer. This may be equal parts of a 600 gsm of fiber and resin composite layer with 300 gsm of material in the zero direction and 300 gsm of fiber oriented at 90 degrees.

Resin can be a 10%-100% bio-based or a hybrid synthetic resin. The resin can also include post-consumer plastics.

In some applications, for example, a structural insulated panel (SIP) for residential construction, the lower density of the sandwich panel allows for much faster installation on site versus plywood. The natural fiber sandwich panels as described in the claims and of with a thickness range 0.25"-2" weighing as little as ¼ the weight of conventional plywood of equivalent thickness. In other applications such as the front and rear cover panel for an interior door, the lightweight sandwich panel of natural fiber and resin replaces much heavier low-density fiberboard commonly used in door applications.

Sandwich panels ranging from 3-10 feet in width and 3-10 feet in length can be used as room dividers. such as those made from 2 layers of natural fiber composite materials made from flax fibers and resins from NatUp! of France and Ingeo polylactic acid PLA made by Natureworks of Minn.

In some applications, natural fiber panels may be scored and folded to create three-dimensional structures in various forms. Alternatively, they may be cut and bonded or fastened together.

In another embodiment, a panel may be 'L' shaped or two sided with one-side perpendicular to the other. In another embodiment, the panels may be 'U' shaped with a bottom and two sides perpendicular to the bottom panel. In a further embodiment, the panels may be four sided with a top and bottom and sides perpendicular to the top and bottom. The orientation for the panels various sides is specified to be on the top and bottom but these folded, bonded or fastened panels may also be described as left and right if the orientation is vertical rather than horizontal relative to the ground.

Natural fiber panels fabricated into three-dimensional shapes may be used in a variety of structural and semi-structural applications. Similar to sheets of plywood, MDF, particle board, plastic and composite panels, there are many applications for natural fiber panels. One such application is cabinetry typically mounted on walls. This is called casework 1340 by cabinet makers for kitchens, retail, and office applications (see FIG. 13).

As discussed, other applications include flat panels and/or bent shapes such as room dividers (see exemplary divider 2000), partitions, built-ins, desks 1420, and other interior architecture such office dividers, cubical dividers 1410, meeting pods, and other interior panels.

Figure 14:
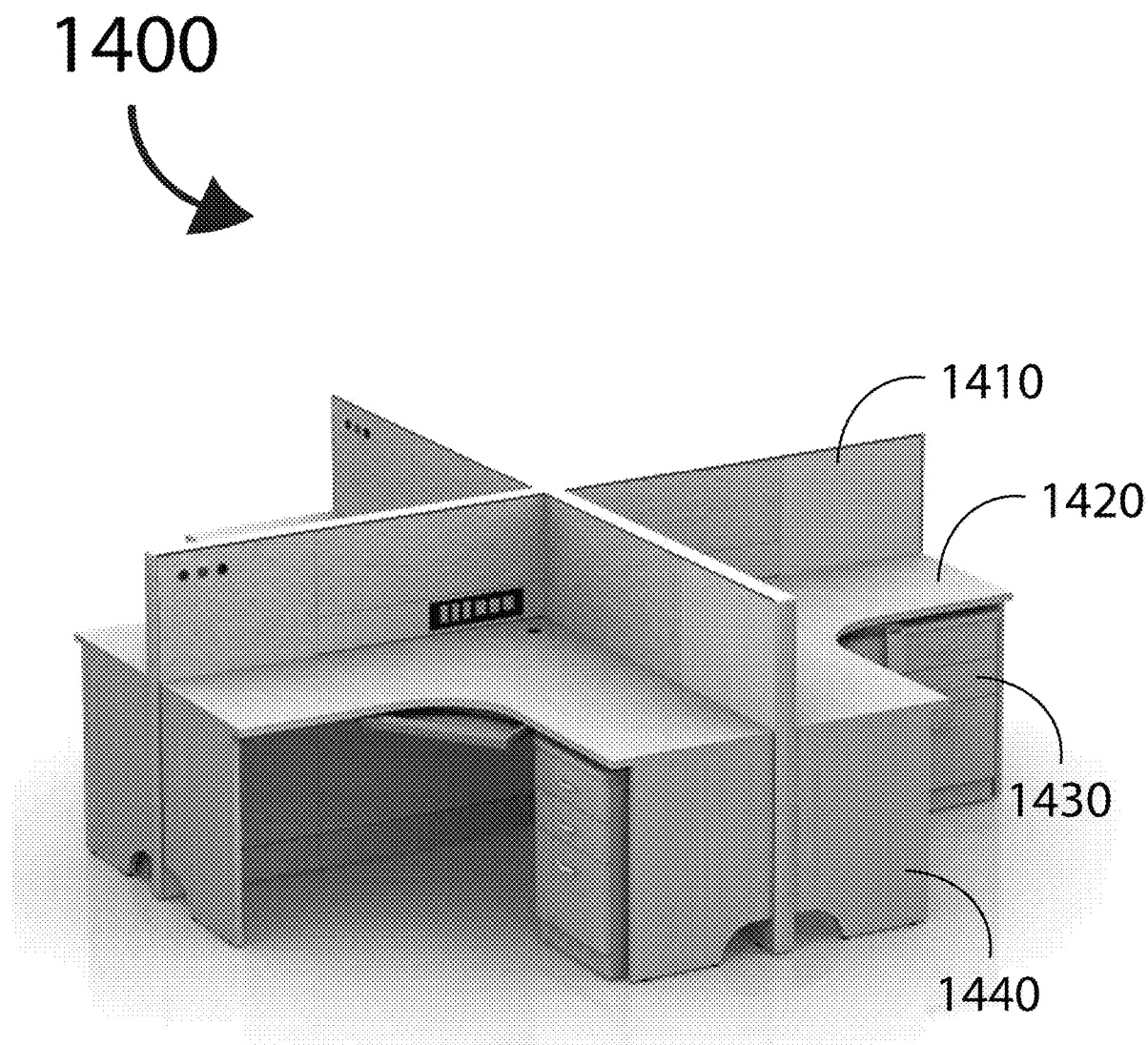
FIG. 14 is a perspective view illustrating cubicles and furniture for work/home space utilizing the exemplary panels of the present invention.
Figure 15:
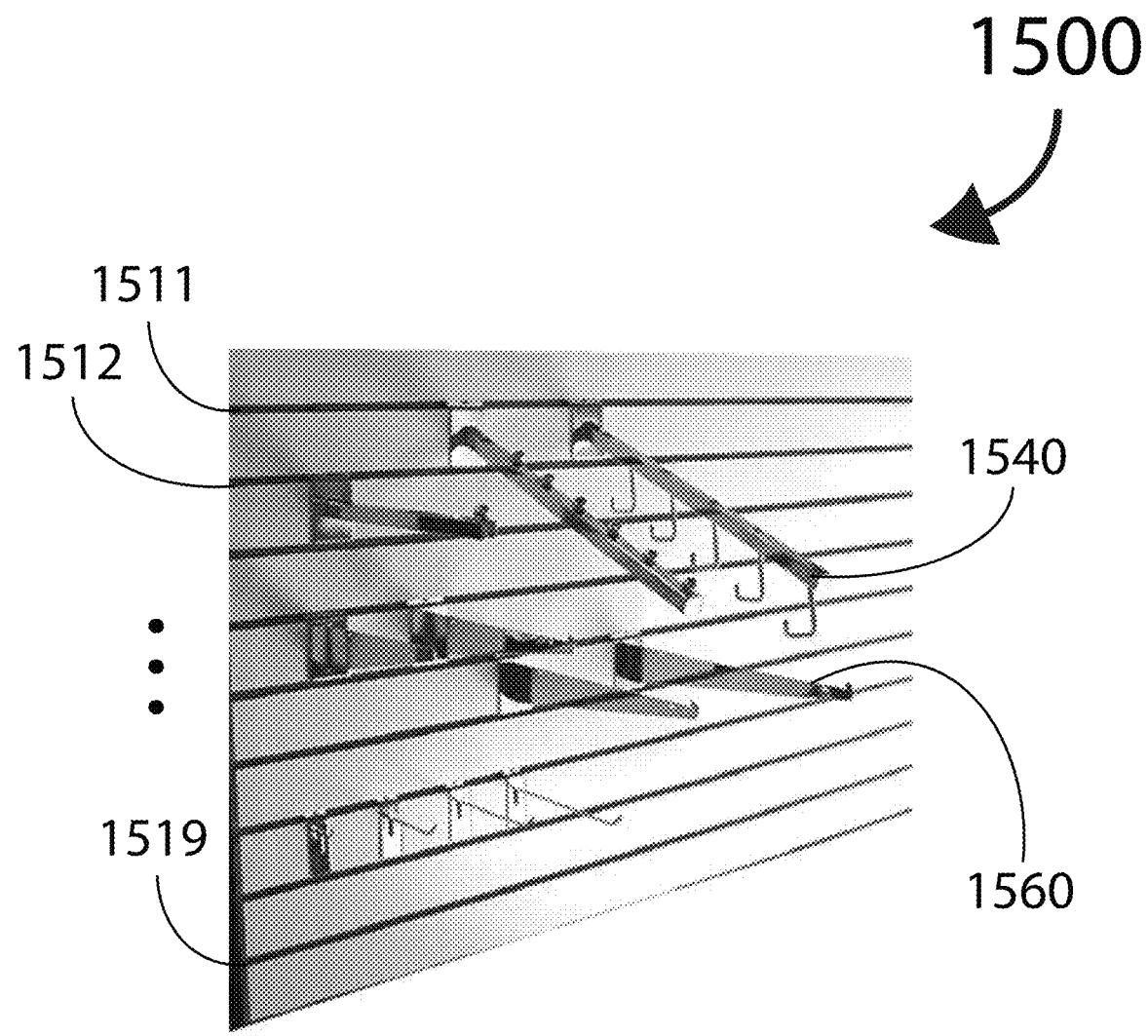
FIG. 15 is a perspective view depicting a slotted wall display utilizing the exemplary panels of the present invention.
Figure 16:
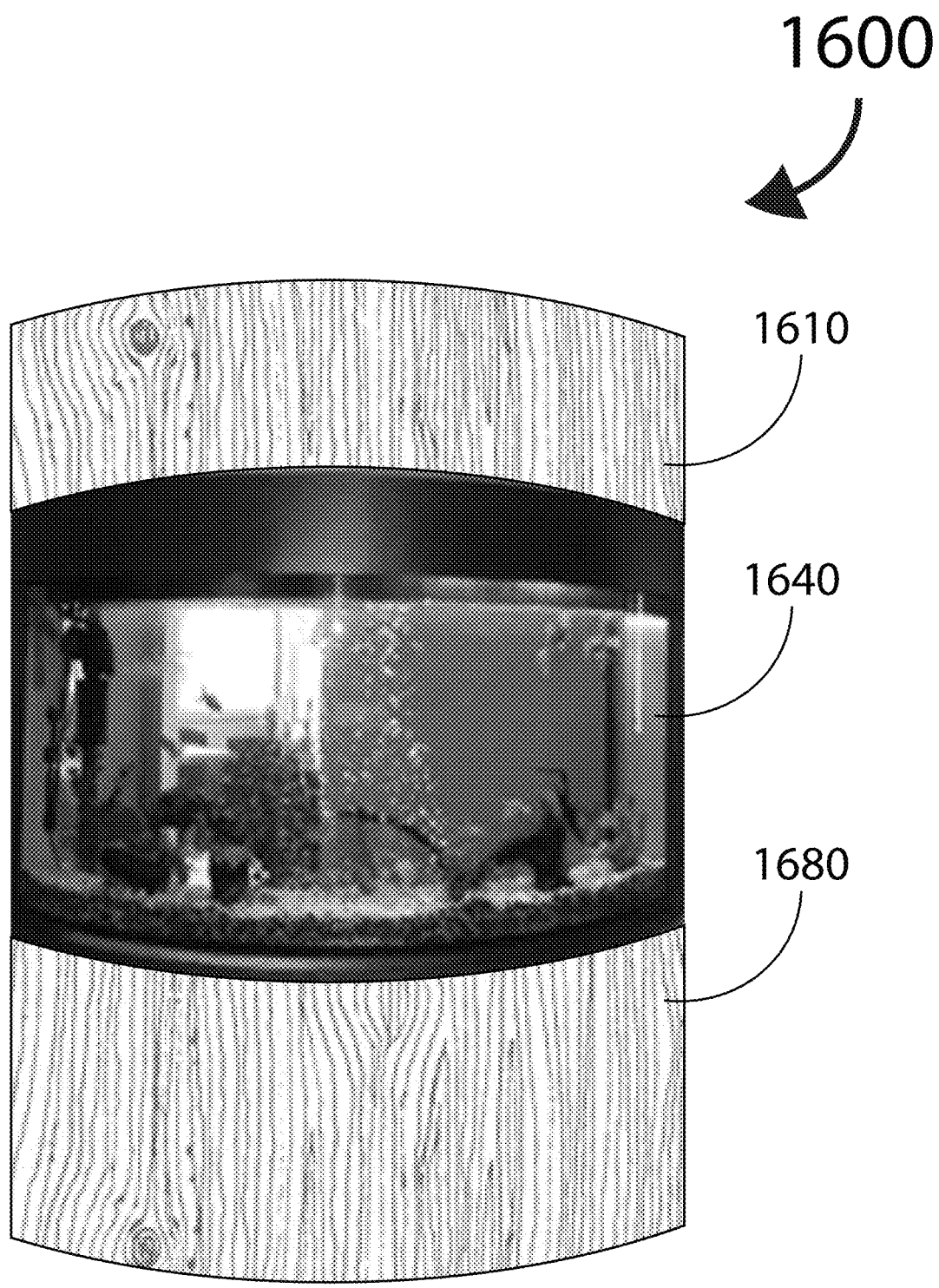
FIG. 16 is a perspective view depicting curved housing for an aquarium utilizing the exemplary panels of the present invention.
Figure 17:
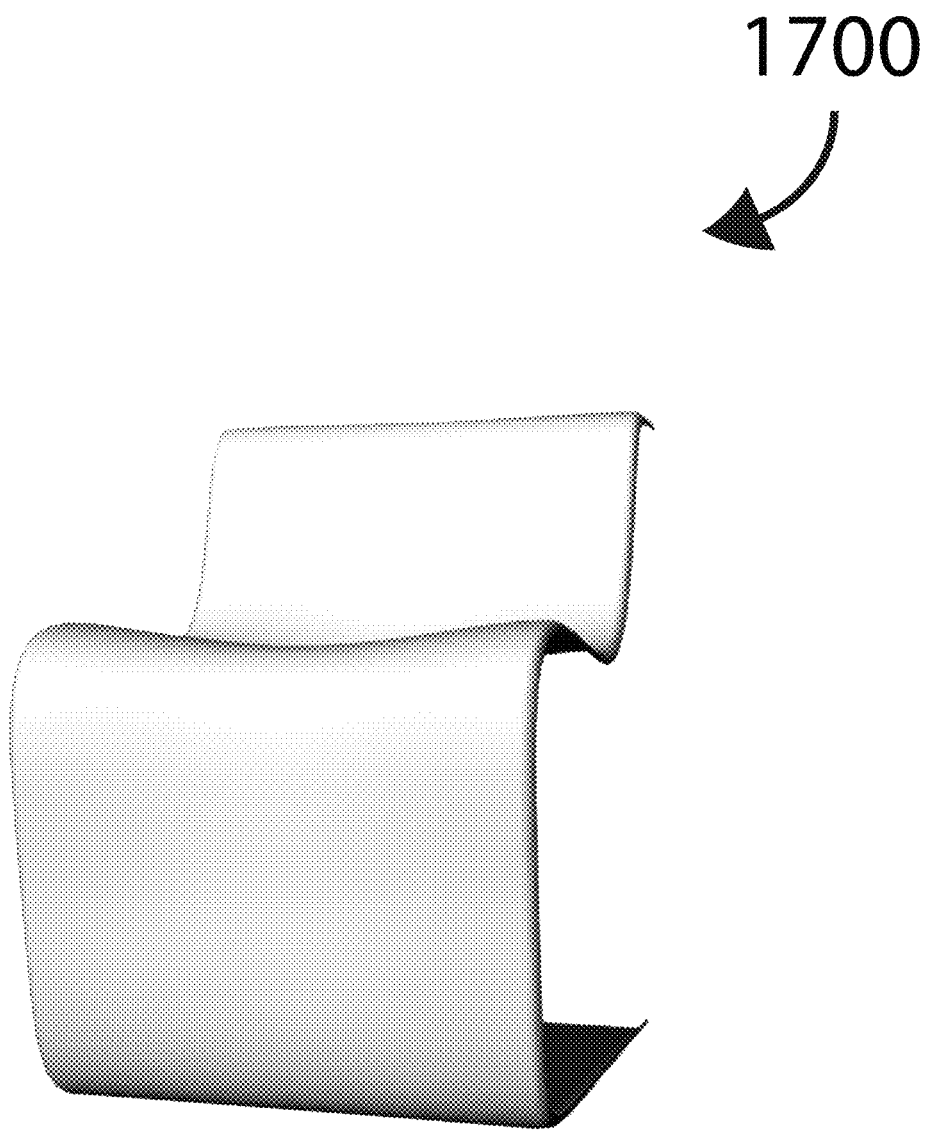
FIG. 17 is a perspective view depicting one embodiment of a chair with compound curves using the exemplary panels of the present invention.
Figure 18A:
FIGS. 18A-18D are perspective views depicting additional embodiments of chairs using the exemplary panels of the present invention.
Figure 18B:
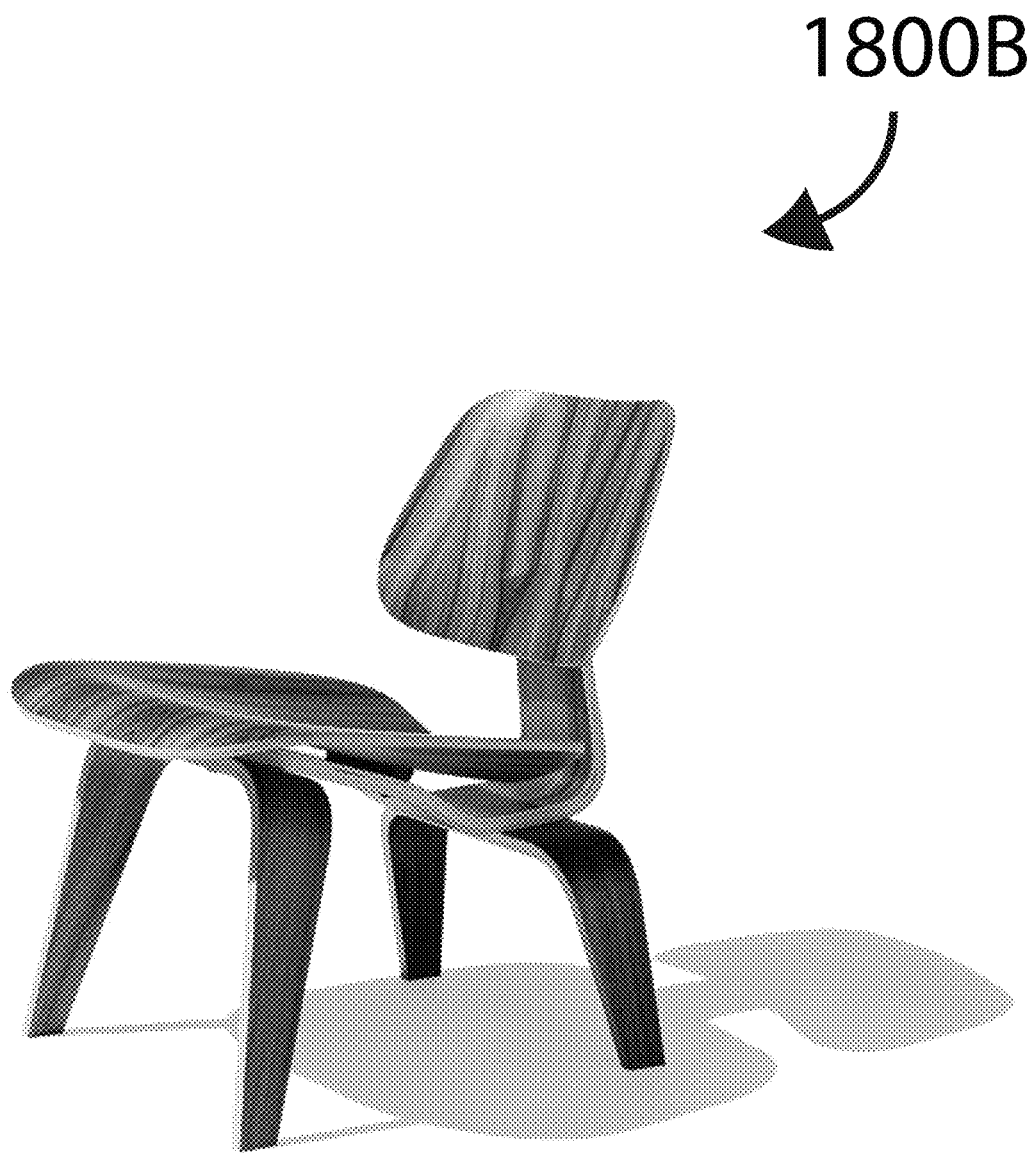
Figure 18C:
Figure 18D:
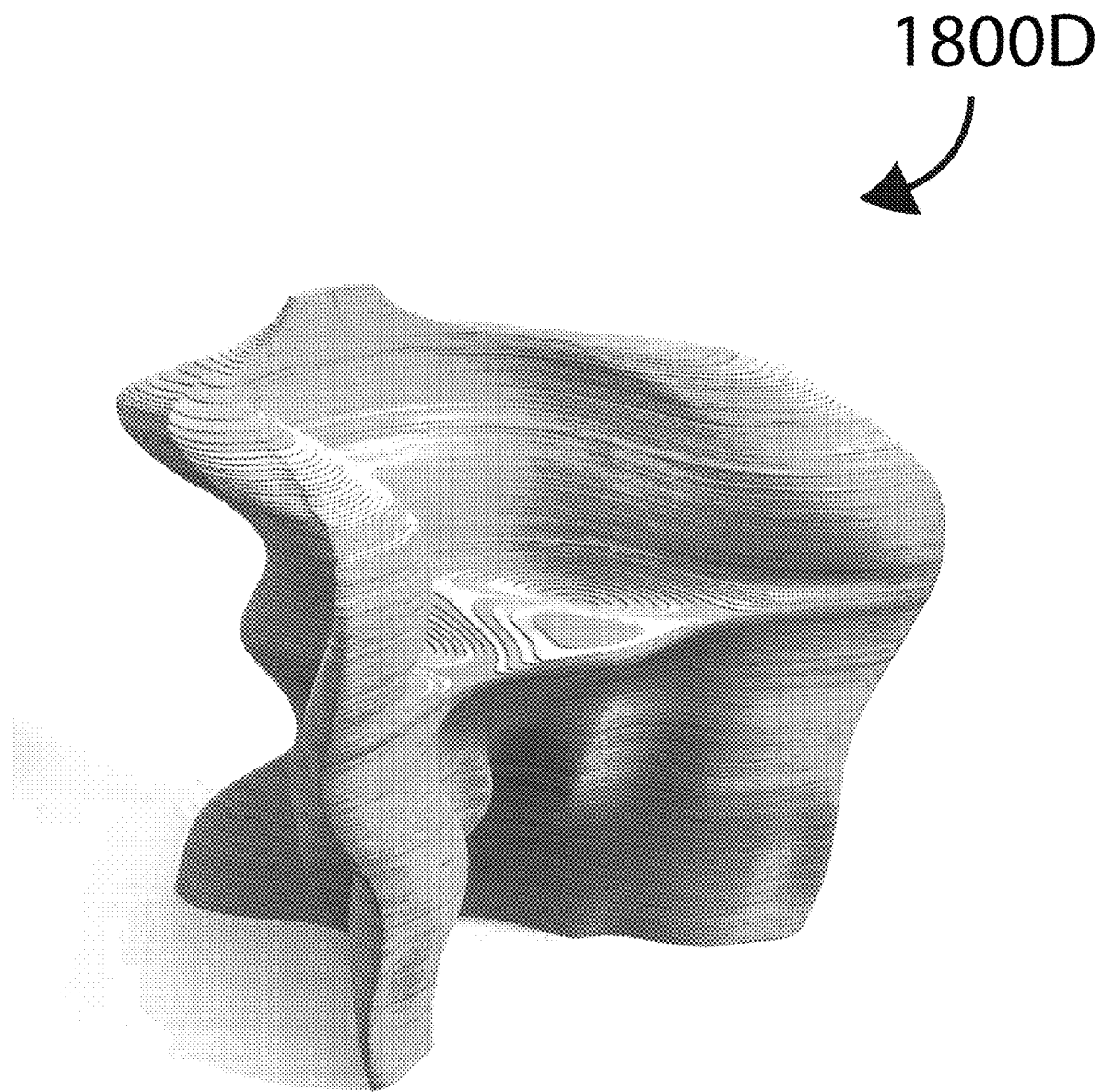
Figure 19:
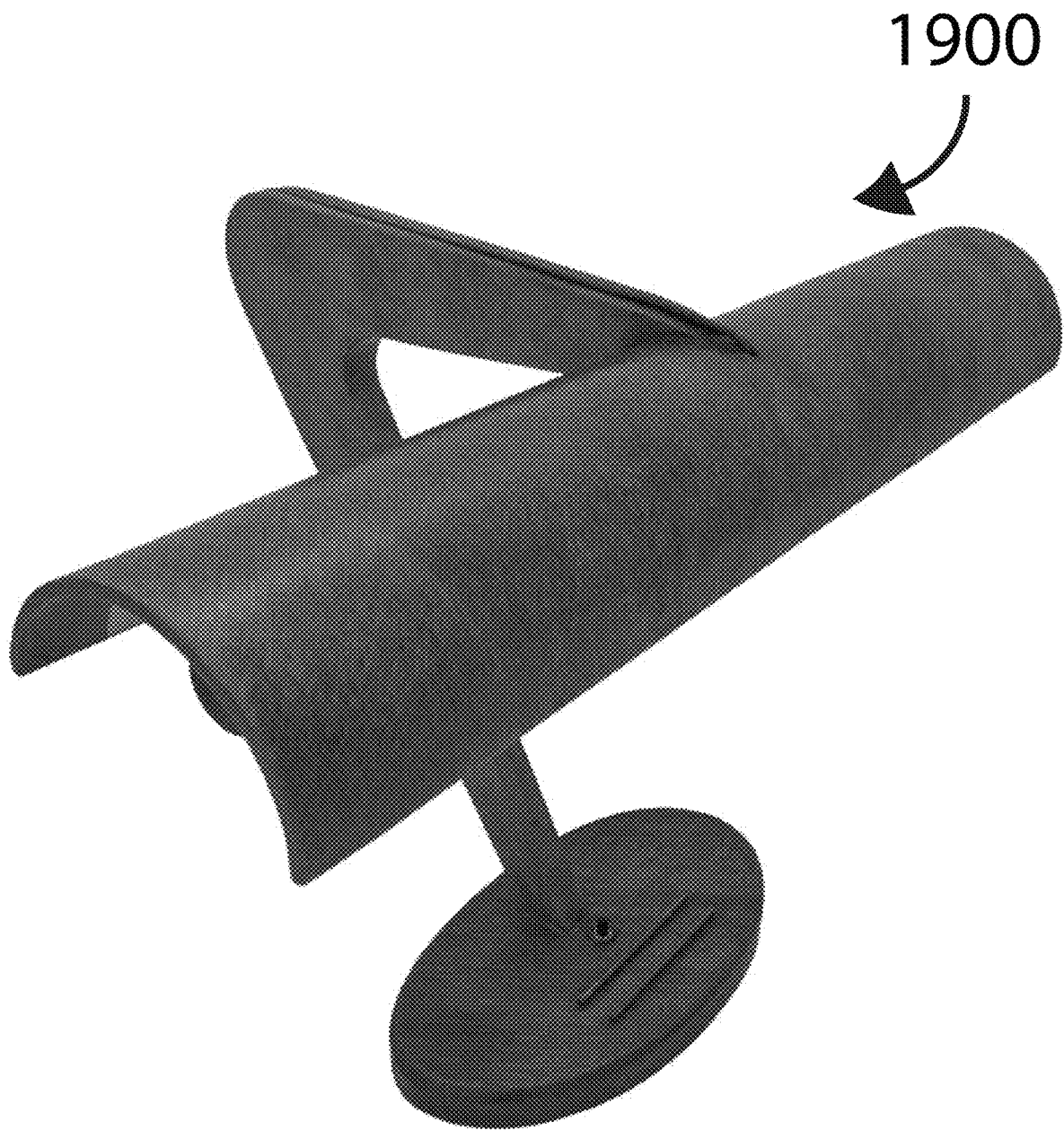
FIGS. 19-22 illustrate embodiments of a lamp, a divider, a table and a canopy in accordance with the present invention.
Figure 20:
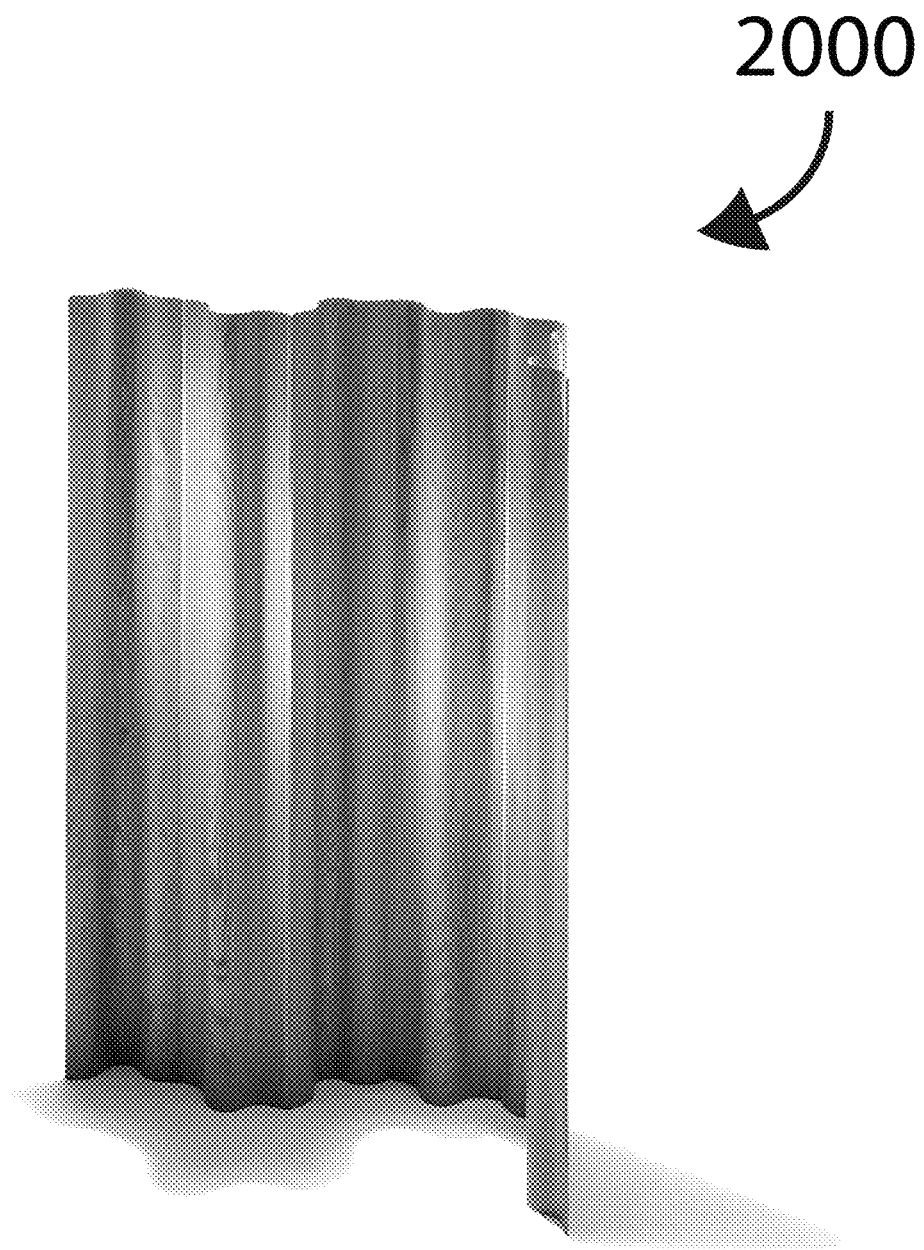
Figure 21:
Figure 22:
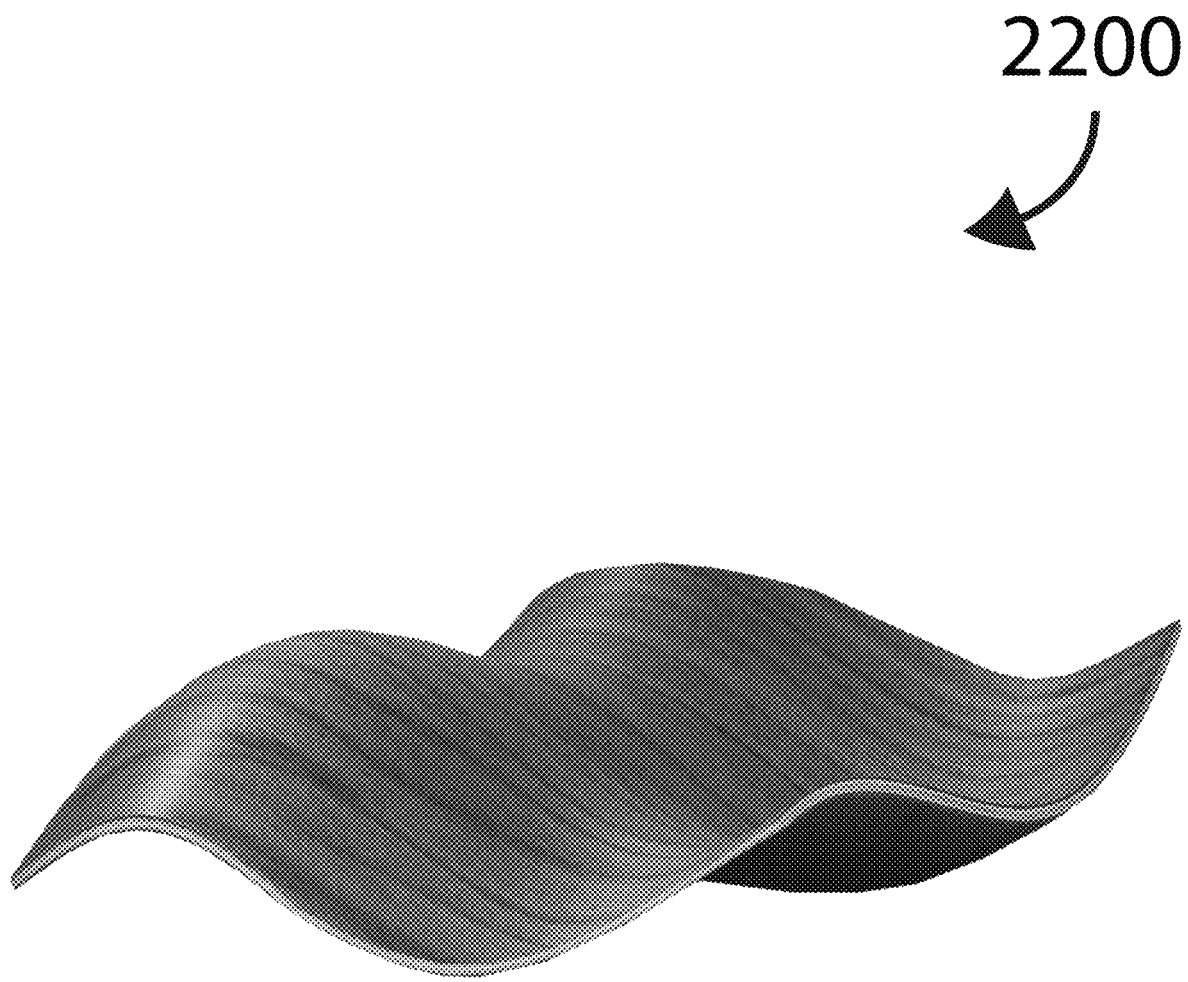
Figure 23A:
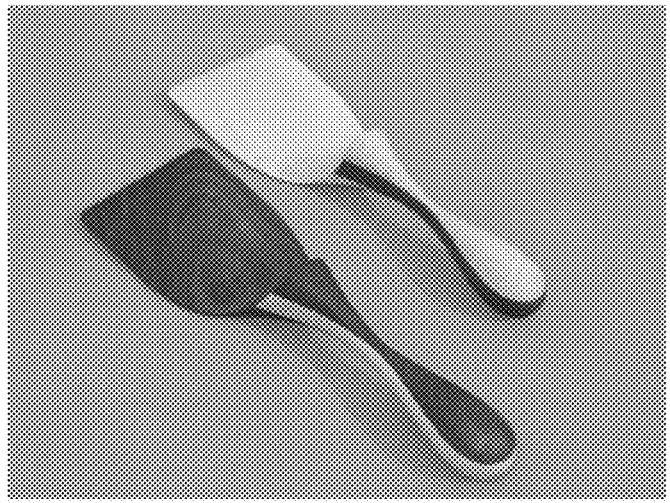
FIGS. 23A-23B illustrate embodiments of cookware in accordance with the present invention.
Figure 23B:
Figure 24A:
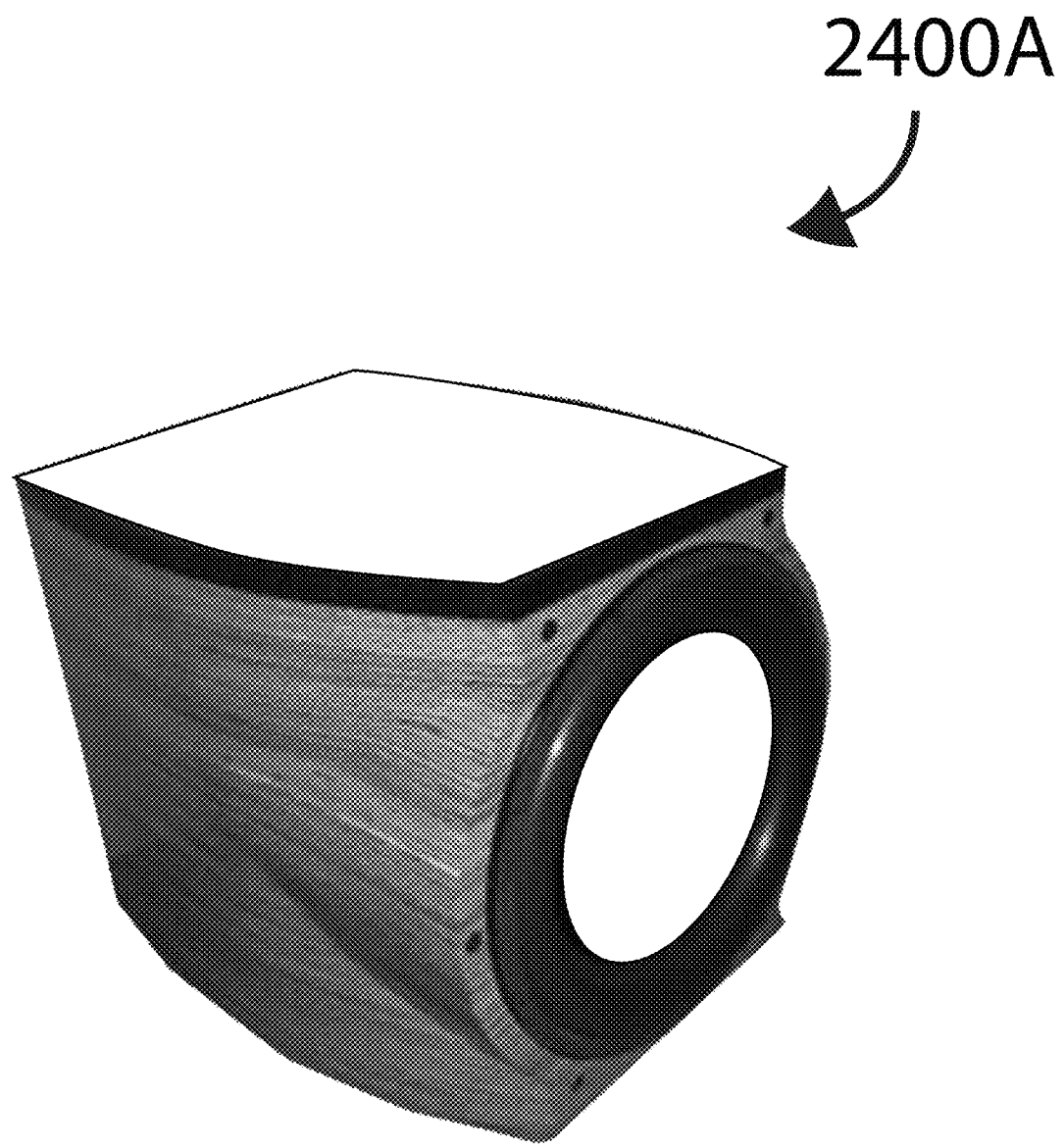
FIGS. 24A-24B illustrate embodiments of speaker enclosures with compound curves using the exemplary panels of the present invention.
Figure 24B:
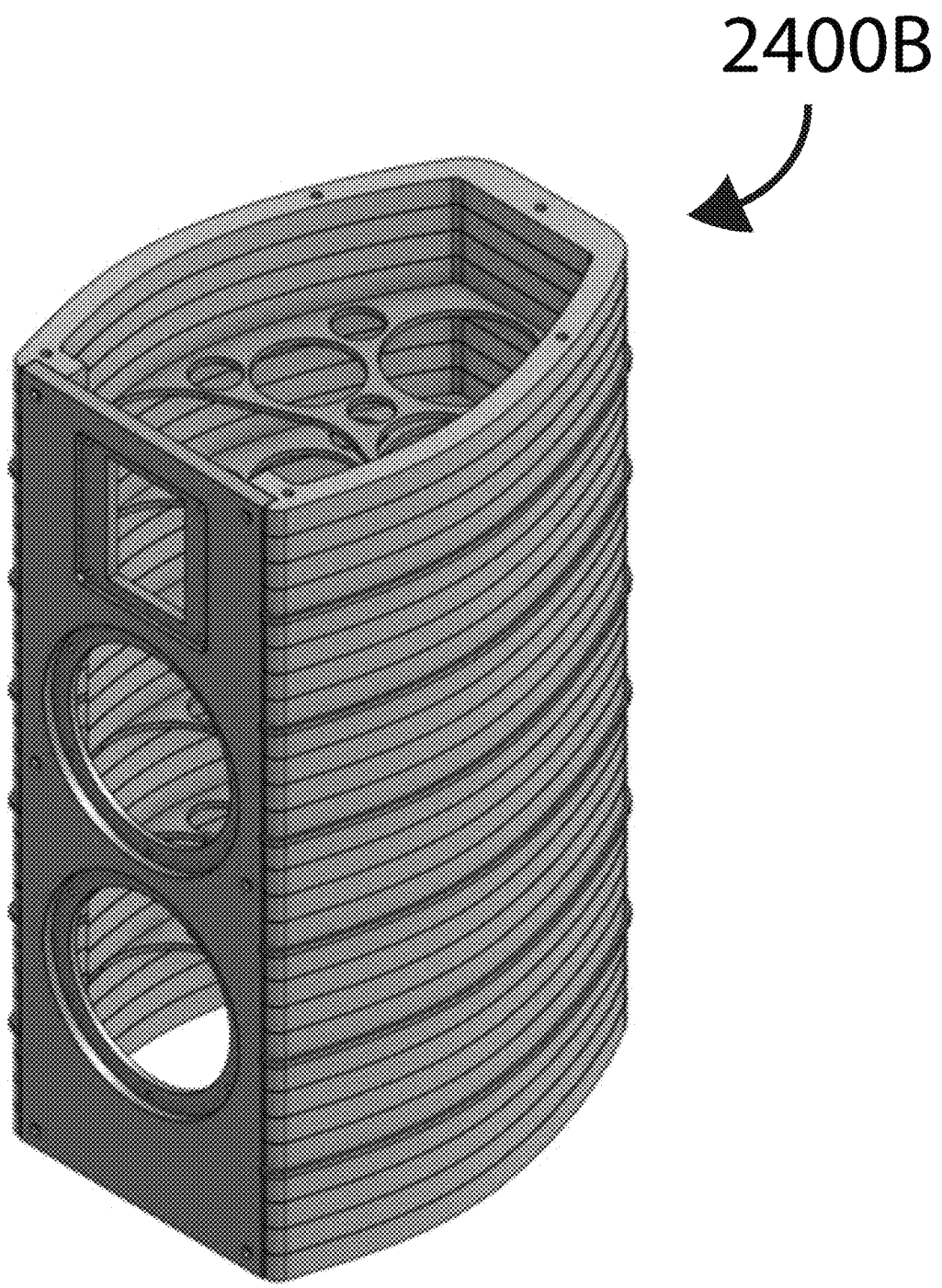

As shown in FIGS. 13, 14 and 15, other applications include furniture such as bookcases, drawer 1430 shelving units and other storage and/or display panels e.g. with slots 1511-1519.

FIG. 13 depicts a flooring panel 1380 with an exemplary tile pattern.

It is also possible to add channels embedded within the core layer for heating/cooling piping, electrical connections, as shown in the cross-sectional view of FIG. 12.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

While this invention has been described in terms of several embodiments, there are alterations, modifications, permutations, and substitute equivalents, which fall within the scope of this invention. Although subsection titles have been provided to aid in the description of the invention, these titles are merely illustrative and are not intended to limit the scope of the present invention.

What is claimed is:

1. A structure comprising:
    a translucent layer comprising a plurality of natural fibers impregnated by a plant-based thermoplastic, wherein the plurality of natural fibers comprises:
        a first layer of natural fibers, wherein the first layer of natural fibers has an areal weight of from about 50 gsm to about 200 gsm, and wherein the first layer of natural fibers is unidirectional; and
    a second layer adjacent to the translucent layer, wherein the plurality of natural fibers of the translucent layer and the second layer are visible through the translucent layer to provide separate visible dimensions.

2. The structure of claim 1 further comprising one or more of a pattern, a color, a texture, a pigment, a dye, a design, an image and a relief.

3. The structure of claim 1 wherein the second layer is a reinforcing backing layer providing additional structural integrity to structure.

4. The structure of claim 3 wherein the backing layer is a nonwoven layer.

5. The structure of claim 4 wherein the nonwoven layer includes cellulose.

6. The structure of claim 1 further comprising an adhesive layer between the translucent layer and the second layer.

7. The structure of claim 1 further comprising a transparent surface coat adjacent to and protecting the translucent layer.

8. The structure of claim 7 wherein the surface coat includes a polyolefin.

9. The structure of claim 1 further comprising a translucent surface coat adjacent to and protecting the translucent layer.

10. The structure of claim 9 wherein the surface coat includes a polyolefin.

11. The structure of claim 1 wherein the thermoplastic includes a polyolefin.

12. The structure of claim 1 wherein the natural fibers includes at least one of flax, hemp, agave, kenaf, nettle, ramie, abaca, sisal, switchgrass, bamboo, jute, and animal wool.

13. The structure of claim 1 wherein the natural fibers are nonwoven.

14. The structure of claim 1 wherein the second layer includes a bast-based fiber.

15. The structure of claim 1 wherein the structure is a panel, and the panel further comprises a core layer adjacent to the second layer.

16. The structure of claim 15 wherein the core layer is one of a foam, balsa, cork, plywood, gypsum, cardboard, paperboard, laminate bulker, aluminum honeycomb, aramid honeycomb, thermoplastic honeycomb, mineral fiber, straw filled board, felt, nonwoven, fleece, low density fiberboard (LDF), medium density fiberboard (MDF), high density fiberboard (HDL) particle board or oriented strand board (OSB).

17. The structure of claim 1 wherein the structure is a panel, and wherein the second layer is a core layer.

18. The structure of claim 17 wherein the core layer is one of a foam, balsa, cork, plywood, gypsum, cardboard, paperboard, laminate bulker, aluminum honeycomb, aramid honeycomb, thermoplastic honeycomb, mineral fiber, straw filled board, felt, nonwoven, fleece, low density fiberboard (LDF), medium density fiberboard (MDF), high density fiberboard (HDL) particle board or oriented strand board (OSB).

19. A structure comprising:
    a translucent layer with a plurality of natural fibers impregnated by a plant-based thermoplastic, wherein the plurality of natural fibers comprises:
        a first natural fiber layer, wherein the first natural fiber layer comprises unidirectional fibers; and
    a second layer adjacent to the translucent layer, wherein the plurality of natural fibers of the translucent layer and the second layer are visible through the translucent layer to provide separate visible dimensions wherein the structure provides a wood-esque property.

20. The structure of claim 19 further comprising:

a transparent or translucent surface coat, wherein the thermoplastic of the translucent layer is a transparent resin and wherein the translucent layer is affixed to the surface coat; and wherein the second layer is a backing layer affixed to the translucent layer;

wherein the surface coat, the translucent layer, and the backing layer provide three visible dimensions creating a wood-esque property.

21. The structure of claim 20 wherein when the backing is lighter in color the surface coat appears lighter in color.

22. The structure of claim 21 wherein the backing layer comprises a core having a first surface and a second surface and wherein the translucent layer is fixed to the first surface of the core and a second translucent layer is fixed to the second surface of the core and a second surface coat is applied to the second translucent layer and wherein the core is formed of a natural material.

23. A structure comprising:

a translucent layer with natural fibers impregnated by a plant-based thermoplastic, wherein the natural fibers are unidirectional; and a second layer adjacent to the translucent layer, wherein the translucent layer, the natural fibers, and the second layer provides separate dimensions visible through the translucent layer;

a transparent or translucent surface coat adjacent to and protecting the translucent layer;

wherein the second layer is a reinforcing backing layer providing additional structural integrity to the structure.

24. The structure of claim 23 wherein the transparent or translucent surface coat further comprises a texture.

25. The structure of claim 23 wherein the transparent or translucent surface coat has a higher melting point than the translucent layer.

26. A structure comprising:

a translucent layer with natural fibers impregnated by a thermoplastic comprised in part or entirely of a bio-based resin;

a backing layer adjacent to the translucent layer; and a transparent or translucent surface coat adjacent to and protecting the translucent layer, wherein the translucent layer, the natural fibers, and the backing layer are visible through the translucent layer and the transparent or translucent surface coat; wherein the transparent or translucent surface coat, the translucent layer and the backing layer provide separate visible dimensions.

27. The structure of claim 1, wherein the plurality of natural fibers further comprises a second layer of natural fibers, wherein the second layer of natural fibers has an areal weight of from about 50 gsm to about 110 gsm, wherein the second layer of natural fibers is unidirectional, and wherein the second layer of natural fibers is oriented perpendicular to the first layer of natural fibers such that the plurality of natural fibers comprises a multidirectional mix of fibers.

28. The structure of claim 19, wherein the plurality of natural fibers further comprises a second natural fiber layer, wherein the second natural fiber layer comprises unidirectional fibers, wherein the second natural fiber layer is oriented parallel to the first natural fiber layer such that the plurality of natural fibers is unidirectional, and wherein the first natural layer and the second natural fiber layer are configured to be oriented parallel to a planar surface of the structure.

* * * * *